Aug. 2, 1960 P. W. WARD 2,947,818

AUTOMATIC TELEPHONE AND LIKE SYSTEMS

Filed Oct. 18, 1955 21 Sheets-Sheet 1

INVENTOR
Peter William Ward

BY
[signature]
ATTORNEY

Aug. 2, 1960 P. W. WARD 2,947,818

AUTOMATIC TELEPHONE AND LIKE SYSTEMS

Filed Oct. 18, 1955 21 Sheets-Sheet 2

INVENTOR
PETER WILLIAM WARD
BY [signature]
ATTORNEY

Aug. 2, 1960 P. W. WARD 2,947,818

AUTOMATIC TELEPHONE AND LIKE SYSTEMS

Filed Oct. 18, 1955 21 Sheets-Sheet 3

INVENTOR
PETER WILLIAM WARD
BY
[signature]
ATTORNEY

INVENTOR
PETER WILLIAM WARD
BY
ATTORNEY

INVENTOR
PETER WILLIAM WARD
BY
[signature]
ATTORNEY

AUTOMATIC TELEPHONE AND LIKE SYSTEMS

Filed Oct. 18, 1955 21 Sheets-Sheet 6

INVENTOR
PETER WILLIAM WARD
BY
ATTORNEY

INVENTOR
PETER WILLIAM WARD
BY
ATTORNEY

Aug. 2, 1960 P. W. WARD 2,947,818

AUTOMATIC TELEPHONE AND LIKE SYSTEMS

Filed Oct. 18, 1955 21 Sheets-Sheet 8

INVENTOR
PETER WILLIAM WARD
BY
[signature]
ATTORNEY

AUTOMATIC TELEPHONE AND LIKE SYSTEMS

Filed Oct. 18, 1955

21 Sheets-Sheet 9

INVENTOR
PETER WILLIAM WARD
BY
ATTORNEY

Aug. 2, 1960 P. W. WARD 2,947,818

AUTOMATIC TELEPHONE AND LIKE SYSTEMS

Filed Oct. 18, 1955 21 Sheets-Sheet 10

INVENTOR
PETER WILLIAM WARD
BY
[signature]
ATTORNEY

INVENTOR
PETER WILLIAM WARD
BY
[signature]
ATTORNEY

INVENTOR
PETER WILLIAM WARD
BY
ATTORNEY

Aug. 2, 1960 P. W. WARD 2,947,818

AUTOMATIC TELEPHONE AND LIKE SYSTEMS

Filed Oct. 18, 1955 21 Sheets-Sheet 13

INVENTOR
PETER WILLIAM WARD
BY
[signature]
ATTORNEY

INVENTOR
PETER WILLIAM WARD
BY
[signature]
ATTORNEY

Aug. 2, 1960 P. W. WARD 2,947,818

AUTOMATIC TELEPHONE AND LIKE SYSTEMS

Filed Oct. 18, 1955 21 Sheets-Sheet 15

INVENTOR
PETER WILLIAM WARD
BY
[signature]
ATTORNEY

INVENTOR
PETER WILLIAM WARD
BY
[signature]
ATTORNEY

INVENTOR
PETER WILLIAM WARD
BY
ATTORNEY

Aug. 2, 1960 P. W. WARD 2,947,818

AUTOMATIC TELEPHONE AND LIKE SYSTEMS

Filed Oct. 18, 1955 21 Sheets-Sheet 18

INVENTOR
PETER WILLIAM WARD
BY
ATTORNEY

Aug. 2, 1960 P. W. WARD 2,947,818

AUTOMATIC TELEPHONE AND LIKE SYSTEMS

Filed Oct. 18, 1955 21 Sheets-Sheet 19

INVENTOR
PETER WILLIAM WARD
BY
[signature]
ATTORNEY

Aug. 2, 1960 P. W. WARD 2,947,818

AUTOMATIC TELEPHONE AND LIKE SYSTEMS

Filed Oct. 18, 1955 21 Sheets-Sheet 20

INVENTOR
PETER WILLIAM WARD
BY
[signature]
ATTORNEY

INVENTOR
PETER WILLIAM WARD
BY
ATTORNEY

United States Patent Office 2,947,818

Patented Aug. 2, 1960

2,947,818

AUTOMATIC TELEPHONE AND LIKE SYSTEMS

Peter William Ward, Wembley, England, assignor to The General Electric Company Limited, London, England Filed Oct. 18, 1955, Ser. No. 541,141

Claims priority, application Great Britain Oct. 19, 1954

5 Claims. (Cl. 179—18)

Figure 1A:
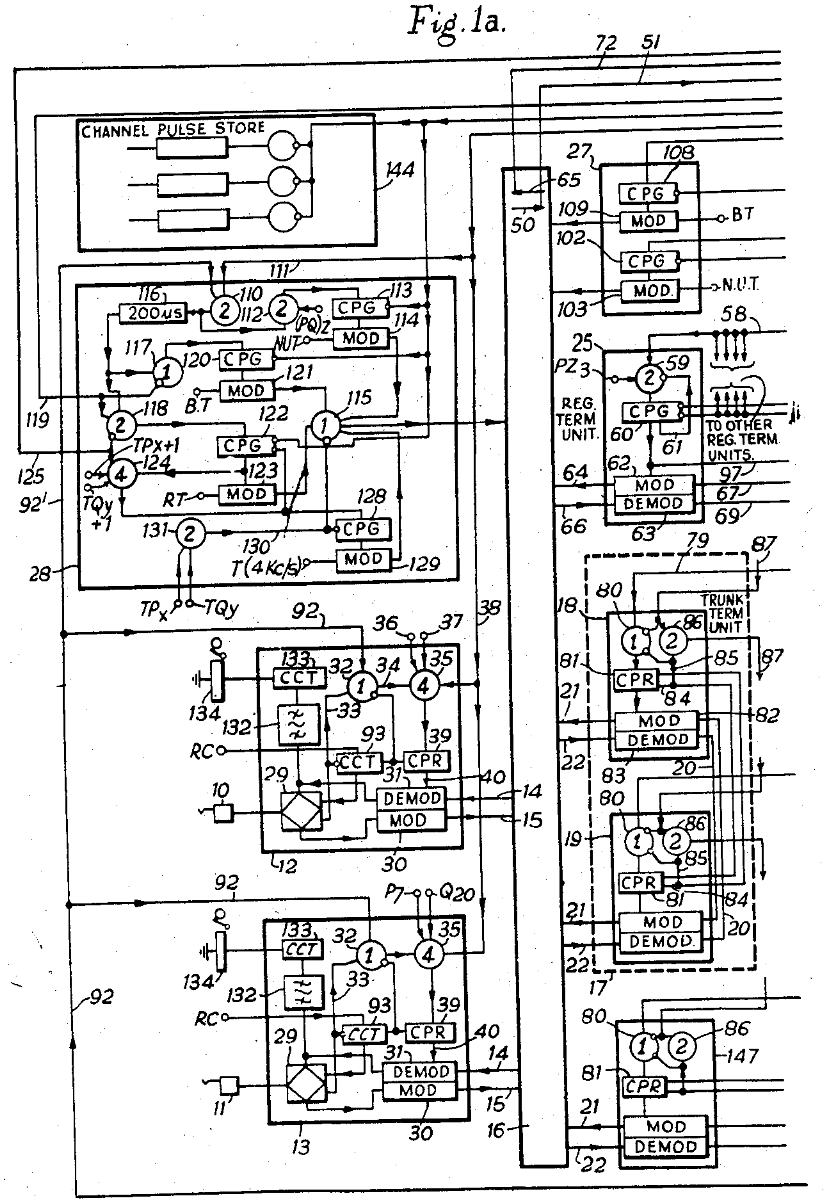

The present invention relates to automatic telephone and like systems employing multi-channel switching apparatus in which at least a large part of the switching effected in establishing speech paths or the like in the channels is carried out by electronic switches, that is to say, switches in which switching operations are performed by electronic discharge devices, metal rectifiers or the like instead of by mechanical means.

In co-pending United States patent application Serial No. 395,391, filed December 1, 1953, for Automatic Telephone Exchanges (issued into United States Letters Patent No. 2,802,057 on August 6, 1957), there is described such a system of the kind wherein a large plurality of subscribers' line terminating units are connected by means of a common transmission link to a relatively small plurality of trunk terminating units, each of the line and trunk terminating units incorporating a modulator and a receiver adjustable selectively to transmit to the link and receive from the link signals in any one of a plurality of different channels, the trunk terminating units being connected in pairs such that the output circuit of the receiver in each trunk terminating unit in a pair is connected to the input circuit of the modulator in the other trunk terminating unit in the pair, and wherein control apparatus is provided for adjusting the modulators and receivers so as to establish speech channel paths in the link between calling and called subscribers' line terminating units, the arrangement being such that in each path set up speech signals are transmitted in one of the channels between the calling subscriber's line terminating unit and one of a pair of trunk terminating units and in another of the channels between the called subscriber's line terminating unit and the other of the pair of trunk terminating units. The control apparatus described in the co-pending application includes means for initially adjusting the modulator in a calling subscriber's line terminating unit to transmit to the link signals in a further channel referred to as a service channel, whereby calling signals representative of the number of a called subscriber are transmitted to the link in the said service channel, and are received by a register incorporating a receiver preset to select signals in the said service channel from signals on the link. The register in response to received calling signals generates a control voltage for use in setting up a speech path between the calling and called subscriber as aforesaid.

It will readily be apparent that one register will usually to insufficient to meet the demands of a system serving a large number of subscribers, and in the embodiment described in the copending application five registers are provided, each being allotted a separate service channel. The allocation of channels in this way of course reduces the number of channels available for speech paths, and in the embodiment described in the copending application twenty of the hundred channels are allotted for service purposes and only eighty are available for speech.

It is one of the objects of the present invention to provide an automatic telephone system of the type specified in which the number of channels for service purposes can be substantially reduced.

According to one aspect of the present invention, in an automatic telephone system or the like of the kind specified the control apparatus provided comprises means by which calling signals from a calling subscriber's line terminating unit can be transmitted to and received by a receiver of a free register in any one of the channels not already in use, and means controlled by the register for establishing a speech path between the calling and called subscriber in which speech signals can be transmitted between the calling subscriber's line terminating unit and one of a pair of disengaged trunk terminating units in the same channel as that used in transmitting the calling signals, and between the called subscriber's line terminating unit and the other of the pair of trunk terminating units in another of the channels not already in use.

According to another aspect of the present invention, in an automatic telephone system of the type specified the control apparatus comprises means responsive to an initial calling signal from any one of the subscribers' lines to adjust the modulator and receiver in the calling subscriber's line terminating unit to transmit to and receive from the link signals in one of the channels not already in use, one or more registers each terminating in a register terminating unit incorporating a receiver adjustable selectively to receive signals in any one of the channels, means responsive to the seizure of a channel by the calling subscriber's line terminating unit to adjust the receiver in a register terminating unit not already in use to receive signals in the seized channel whereby further calling signals from the calling subscriber's line, subsequently transmitted to the link, are received by the register, the register being responsive to the received calling signals to generate a control signal identifying the called subscriber, and means responsive to the control signal to adjust the modulators and receivers in the called subscriber's line terminating unit and in a pair of disengaged trunk terminating units to establish a speech path between the calling and called subscriber in which speech signals are transmitted in the said one channel between the calling subscriber's line terminating unit and one of the pair of trunk terminating units and in a further channel between the called subscriber's line terminating unit and the other of the pair of trunk terminating units, and to render the register and the register terminating unit associated therewith free to be adjusted to receive further signals in another channel not already in use.

Figure 1B:
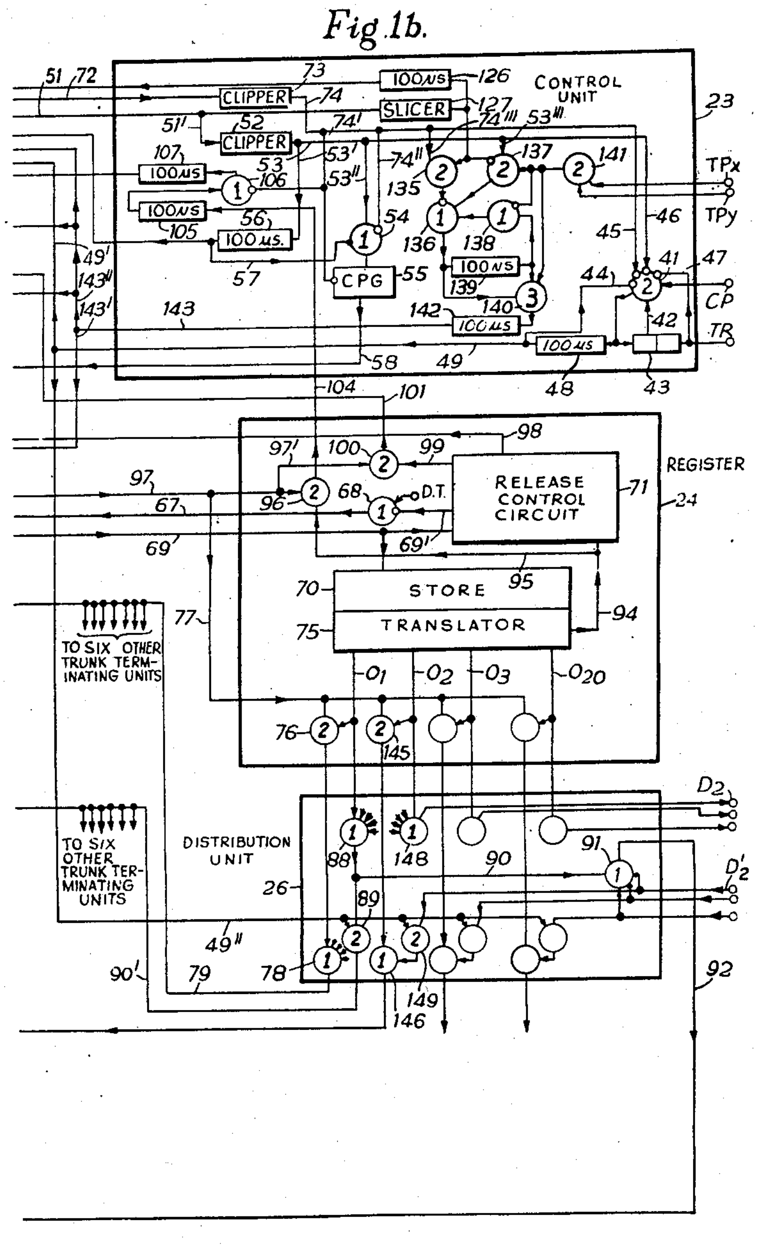
Figure 2:
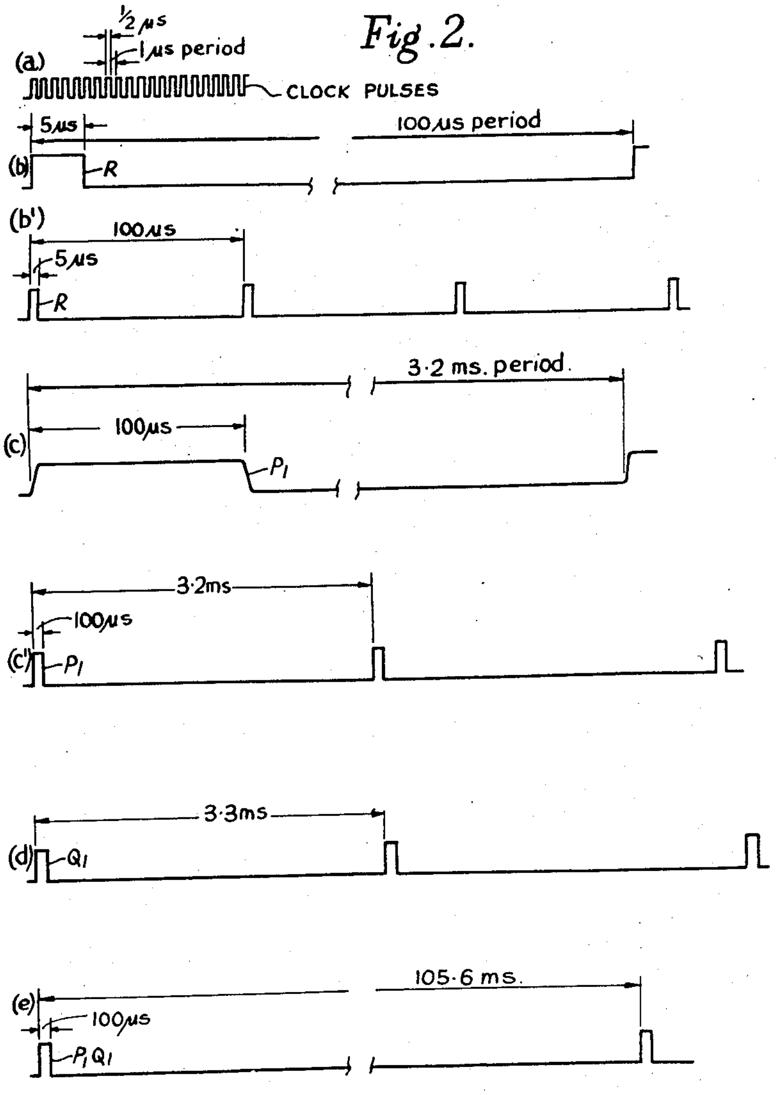
Figure 3A:
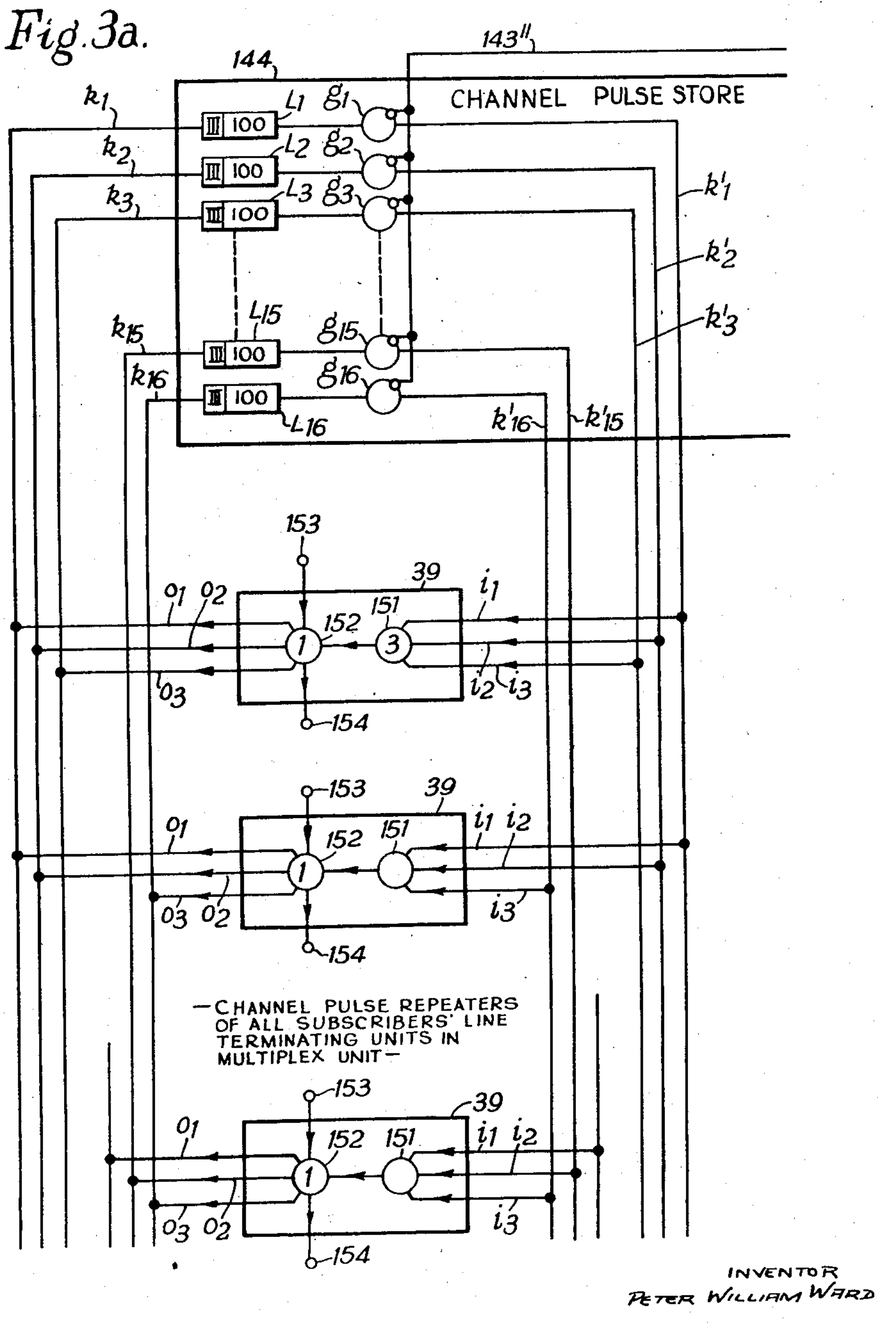
Figure 3B:
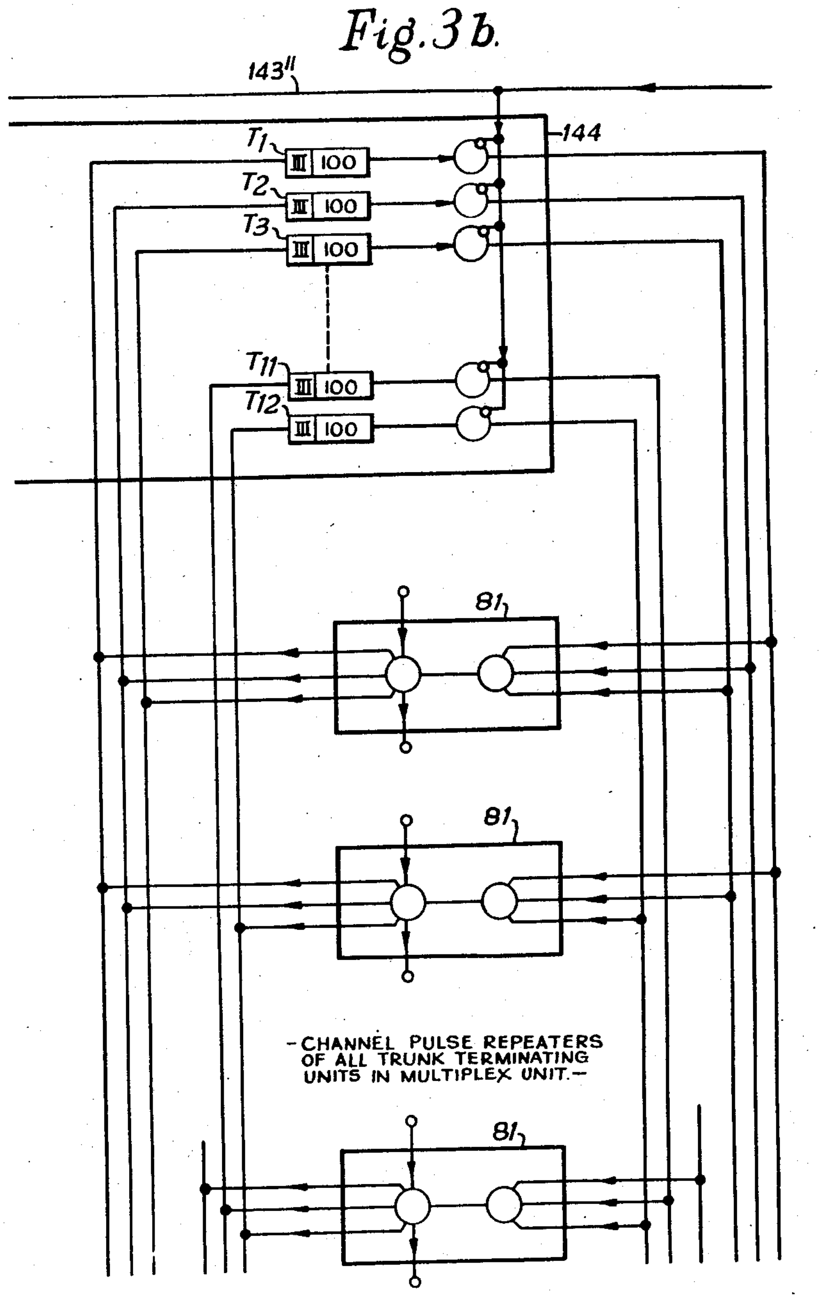
Figure 4:
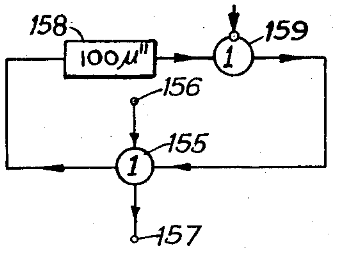
Figure 7:
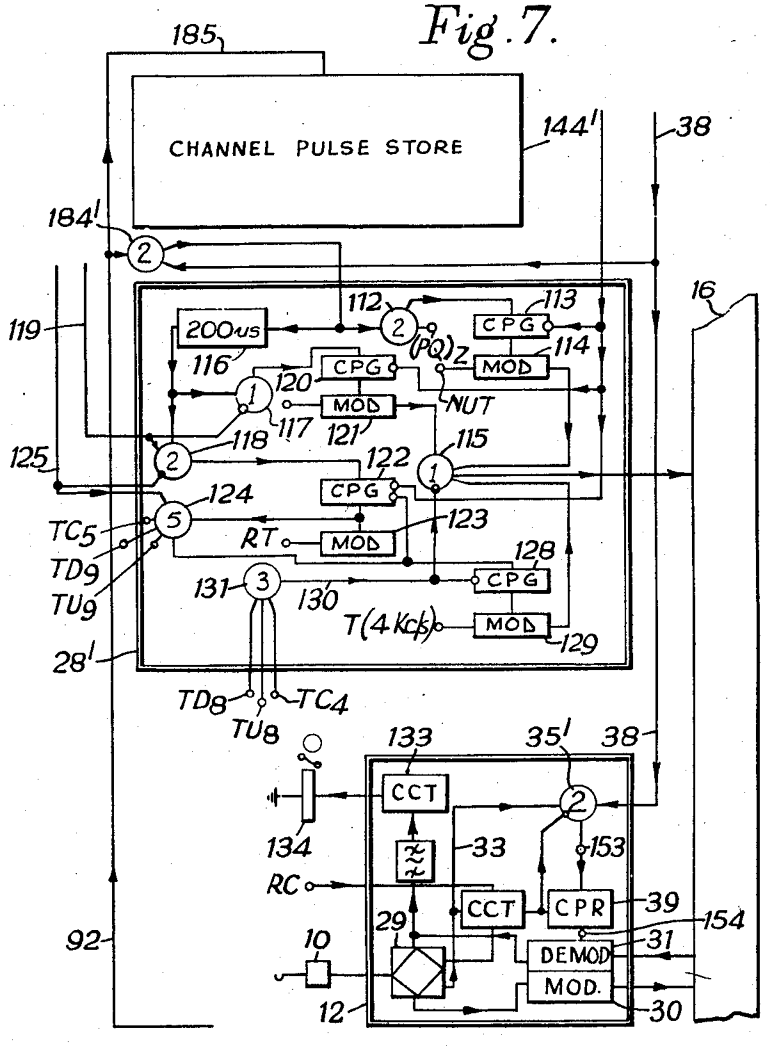
Figure 5:
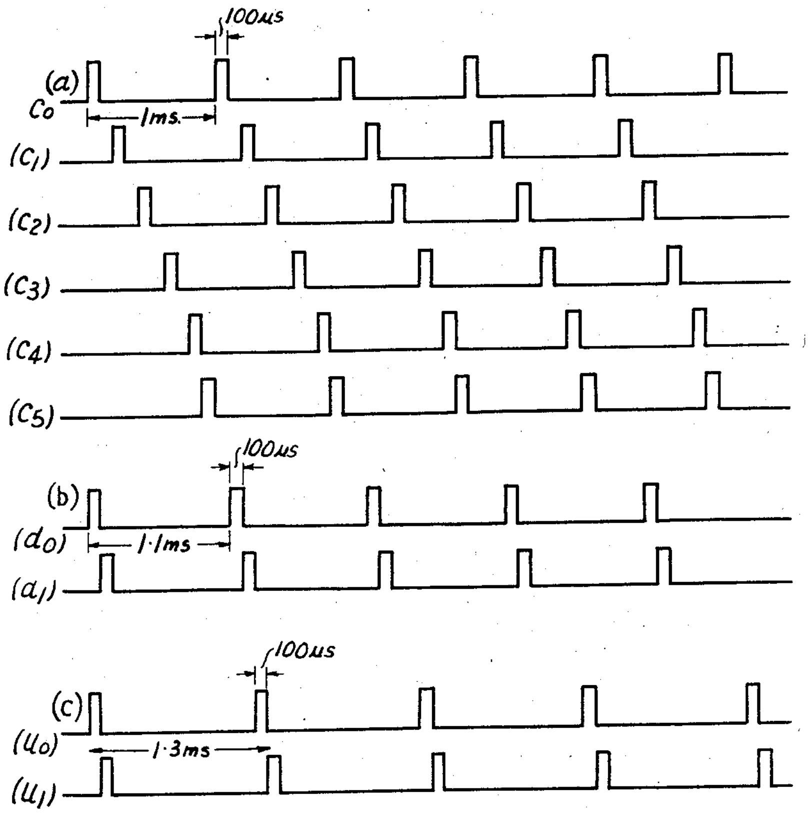
Figure 6:
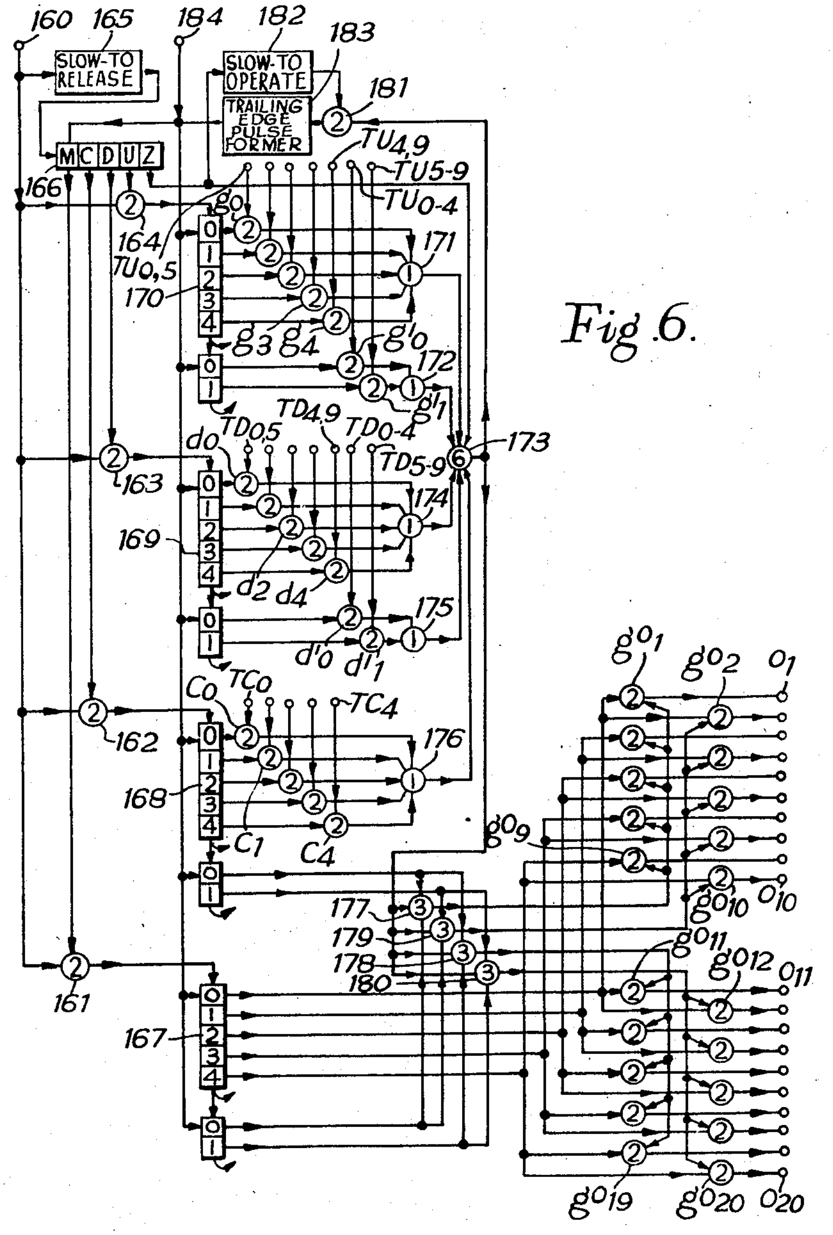
Figure 8:
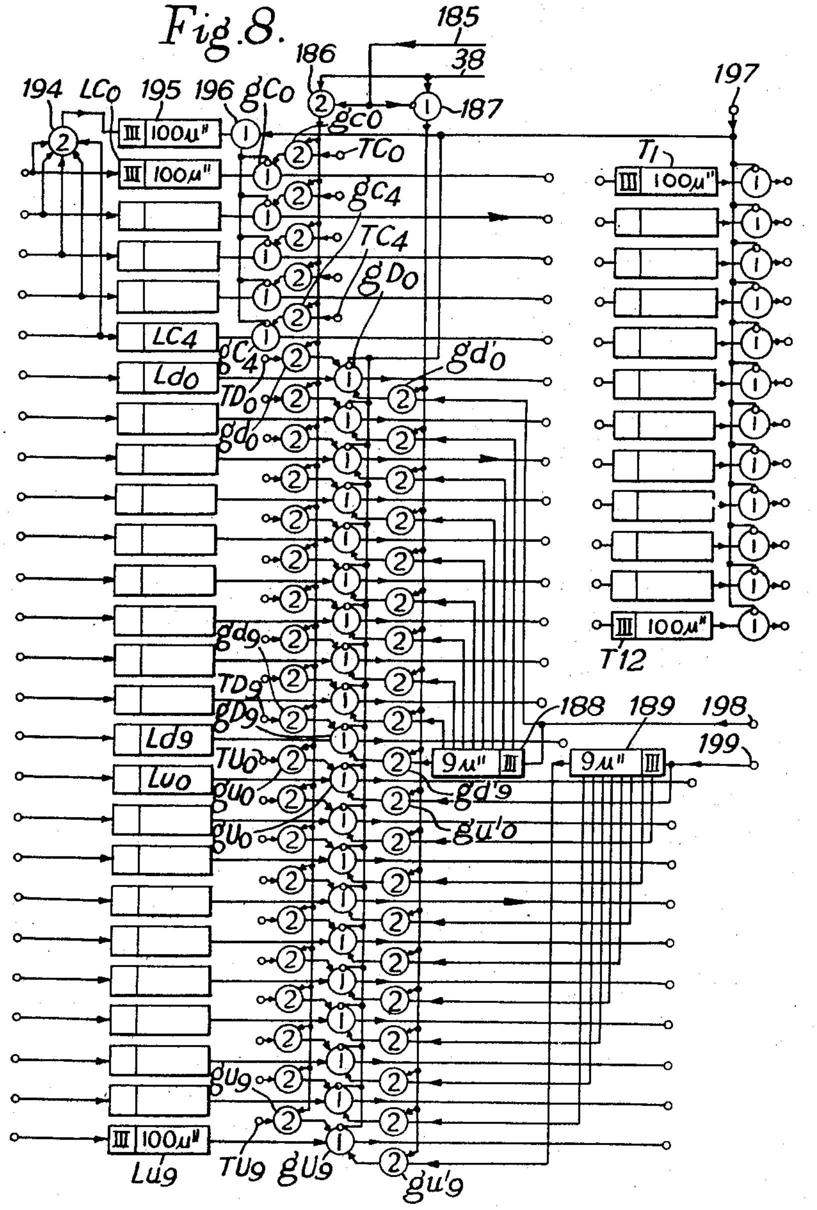
Figure 9:
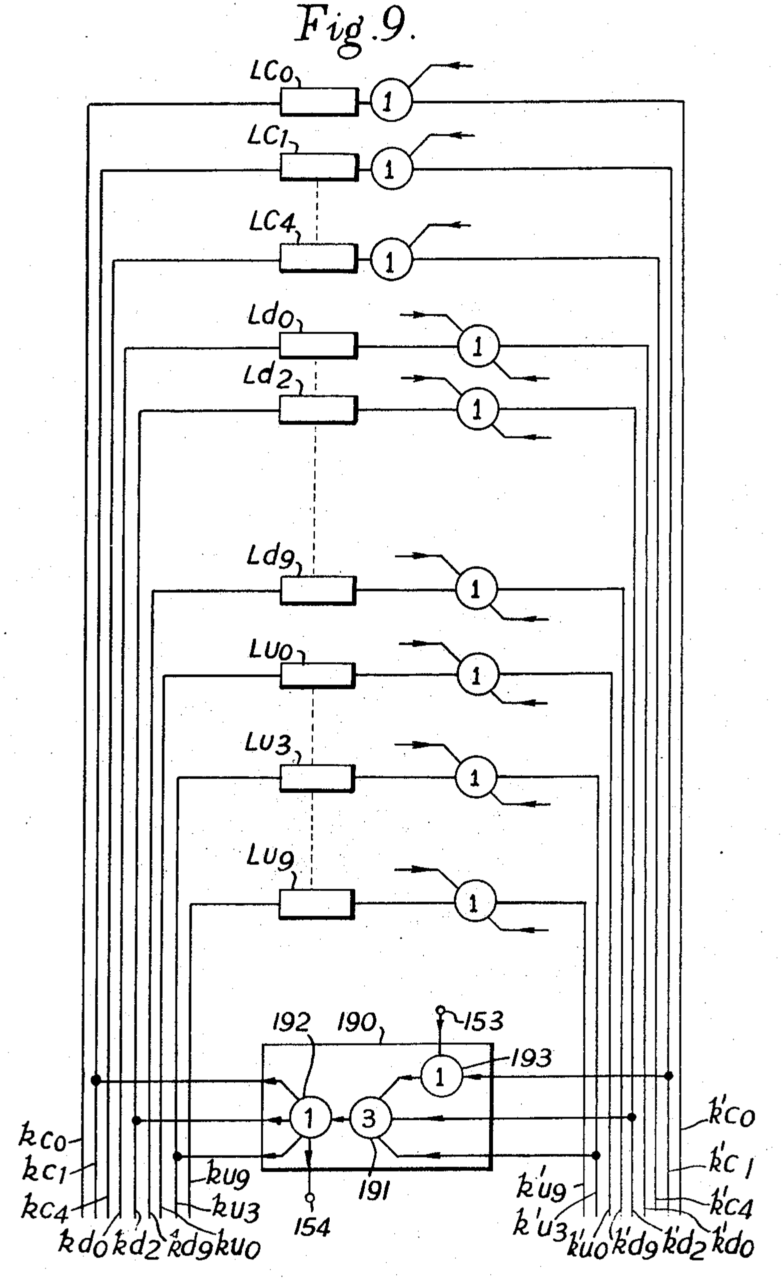
Figure 10:
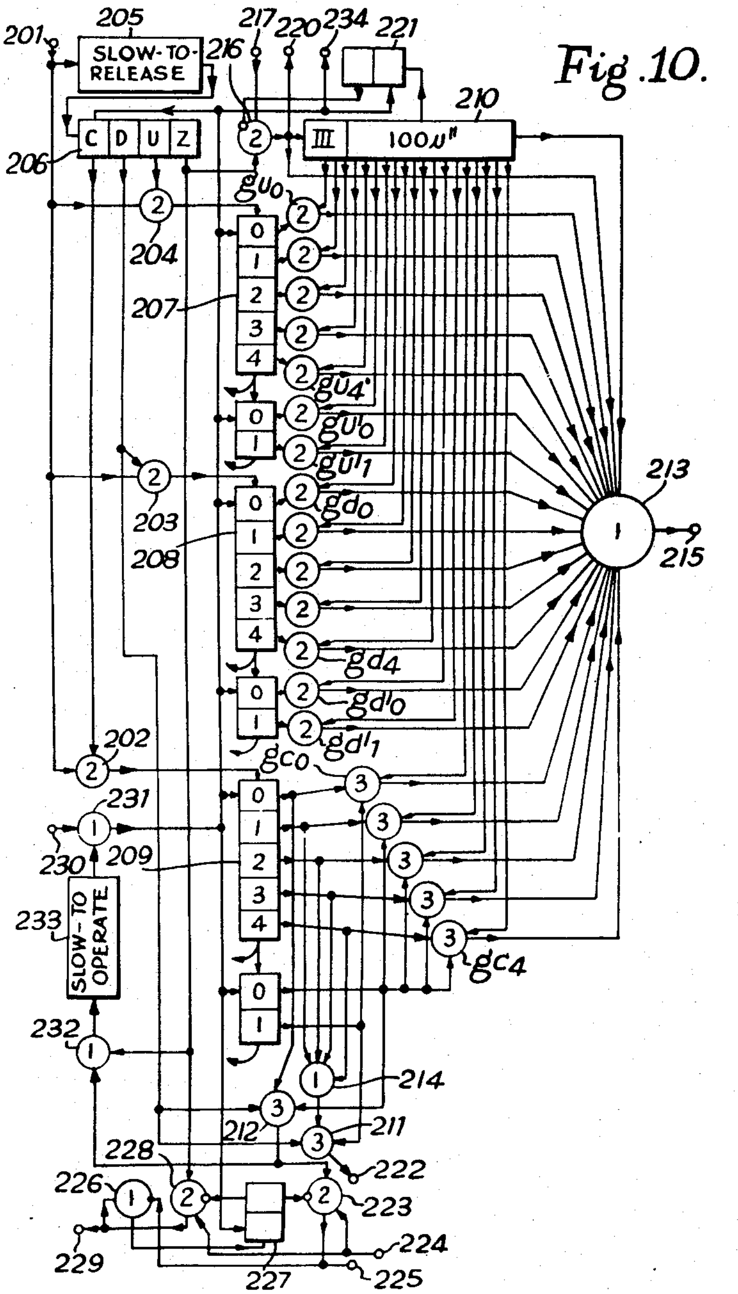
Figure 11:
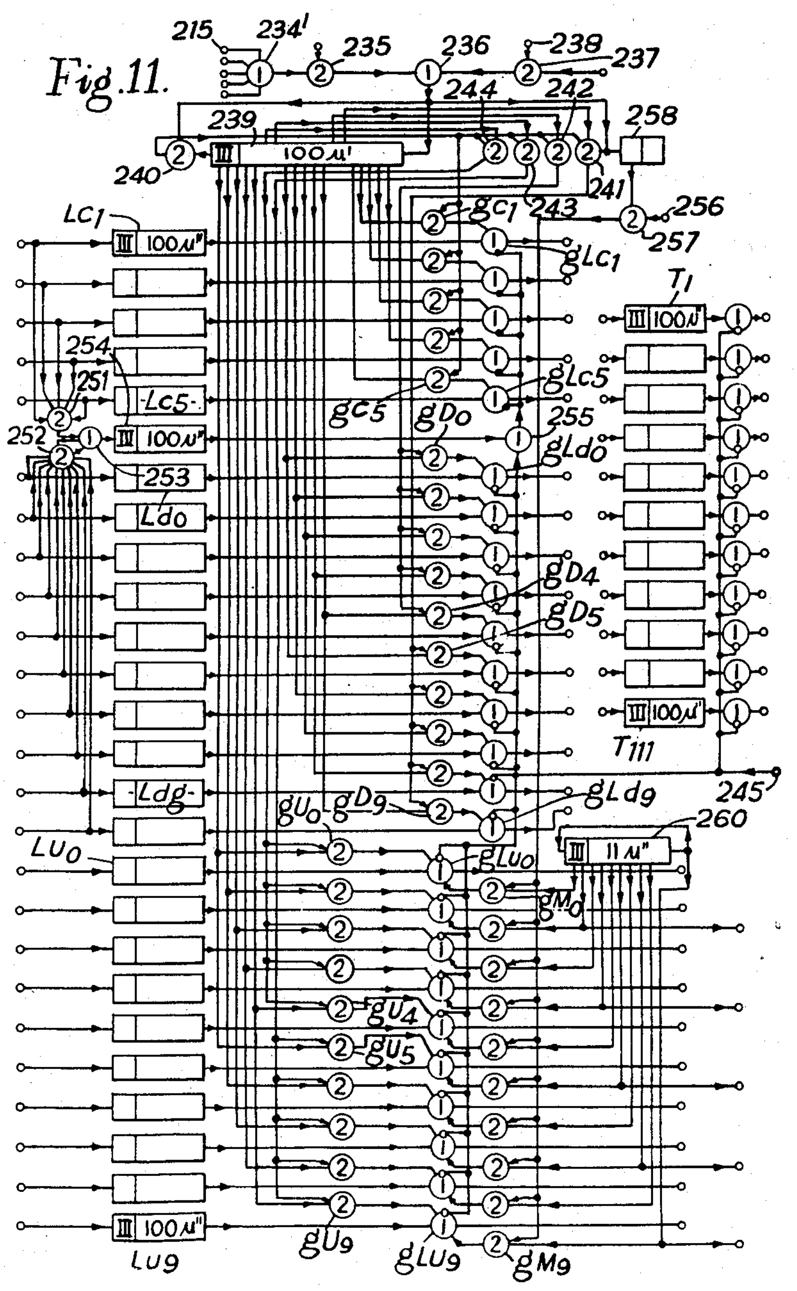
Figure 12:
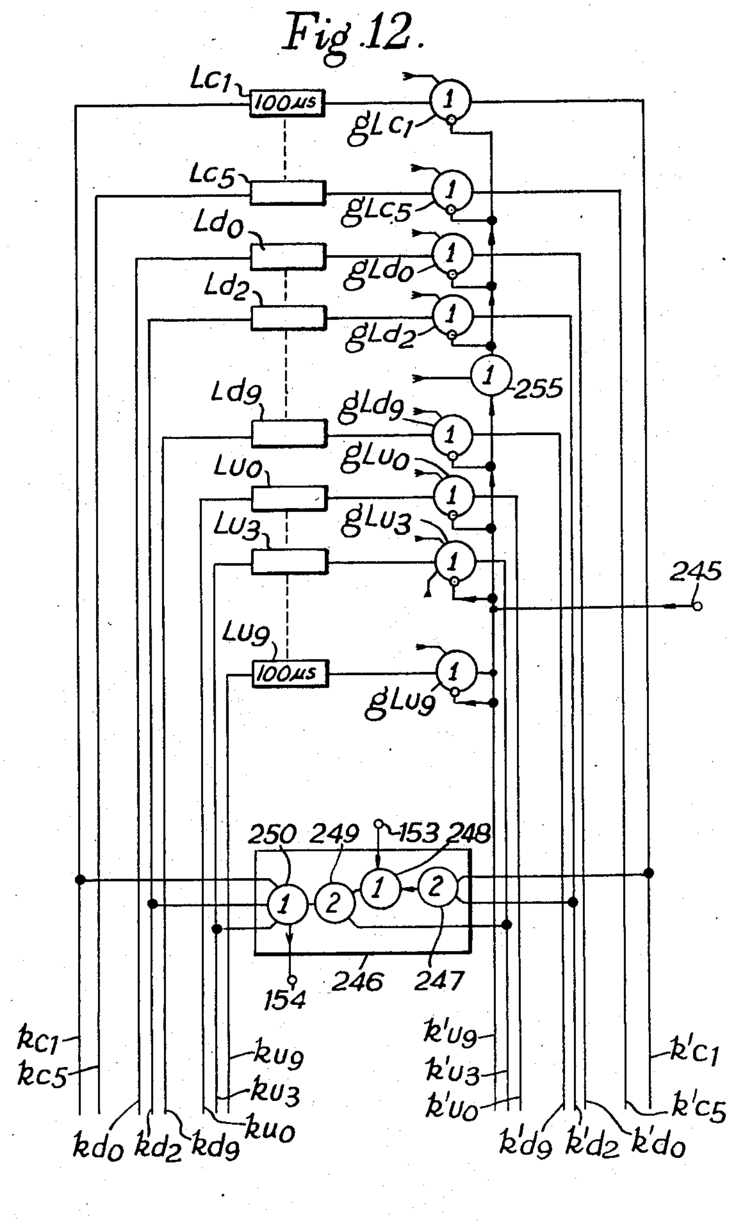
Figure 13:
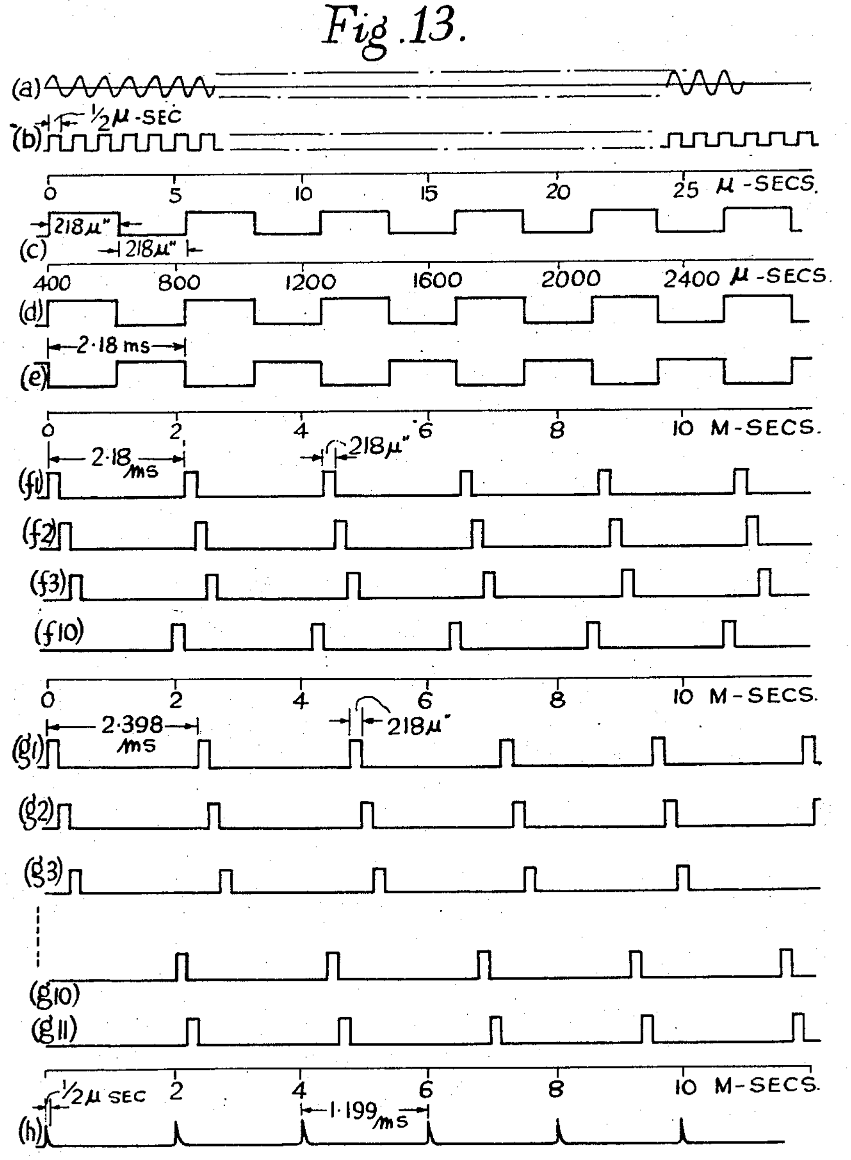
Figure 14:
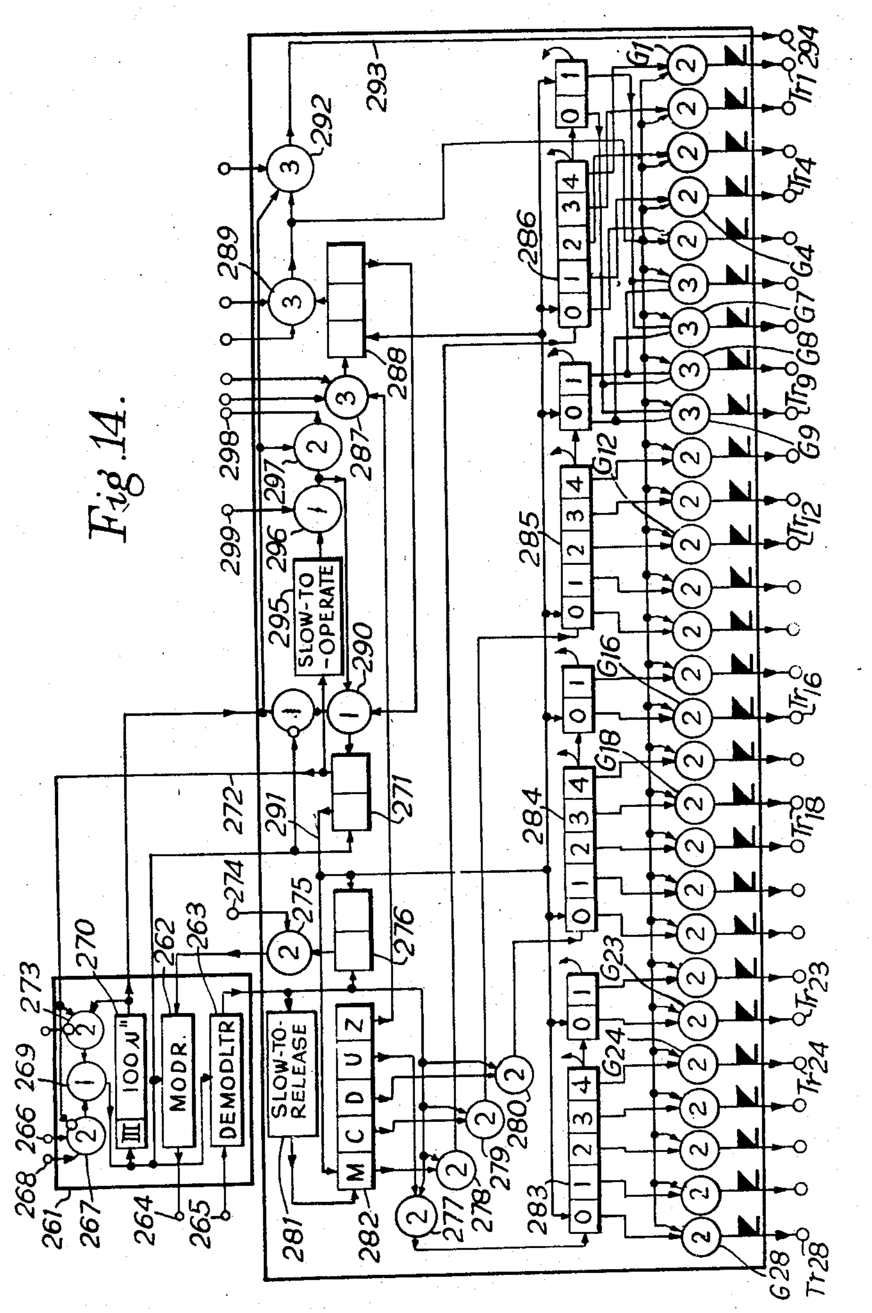
Figure 15:
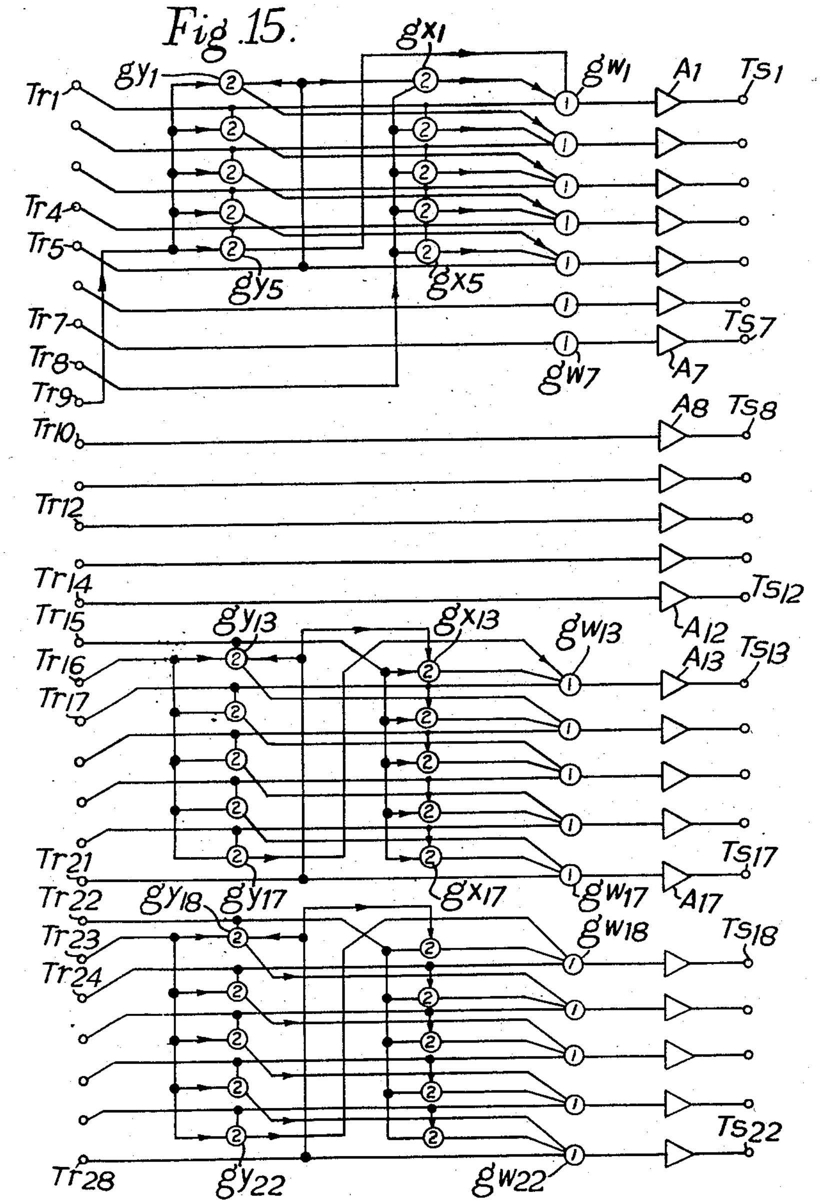
Figure 16:
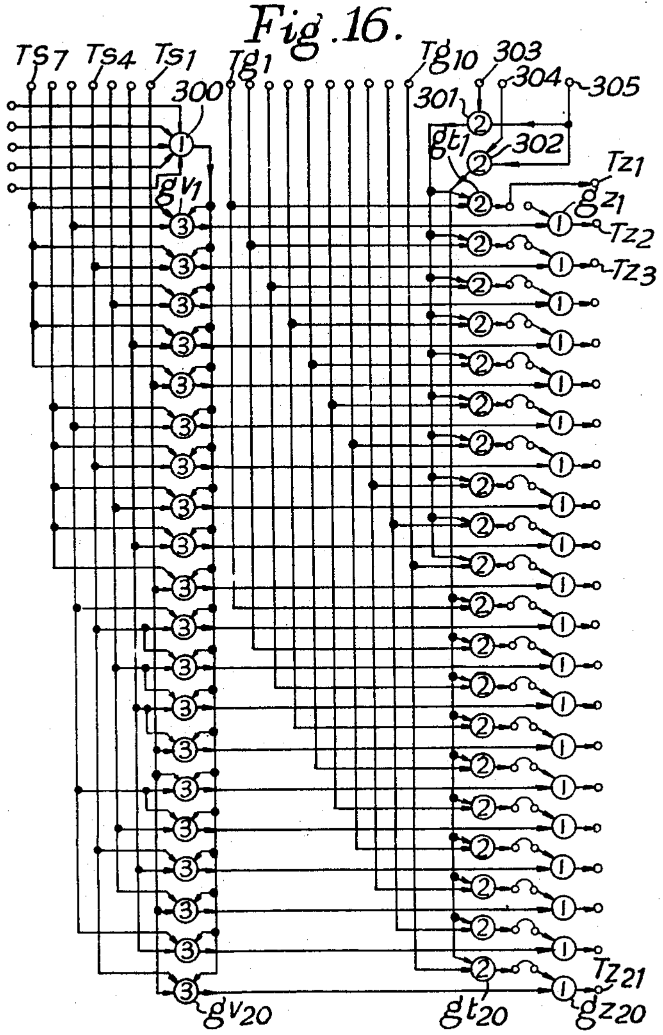
Figure 17:
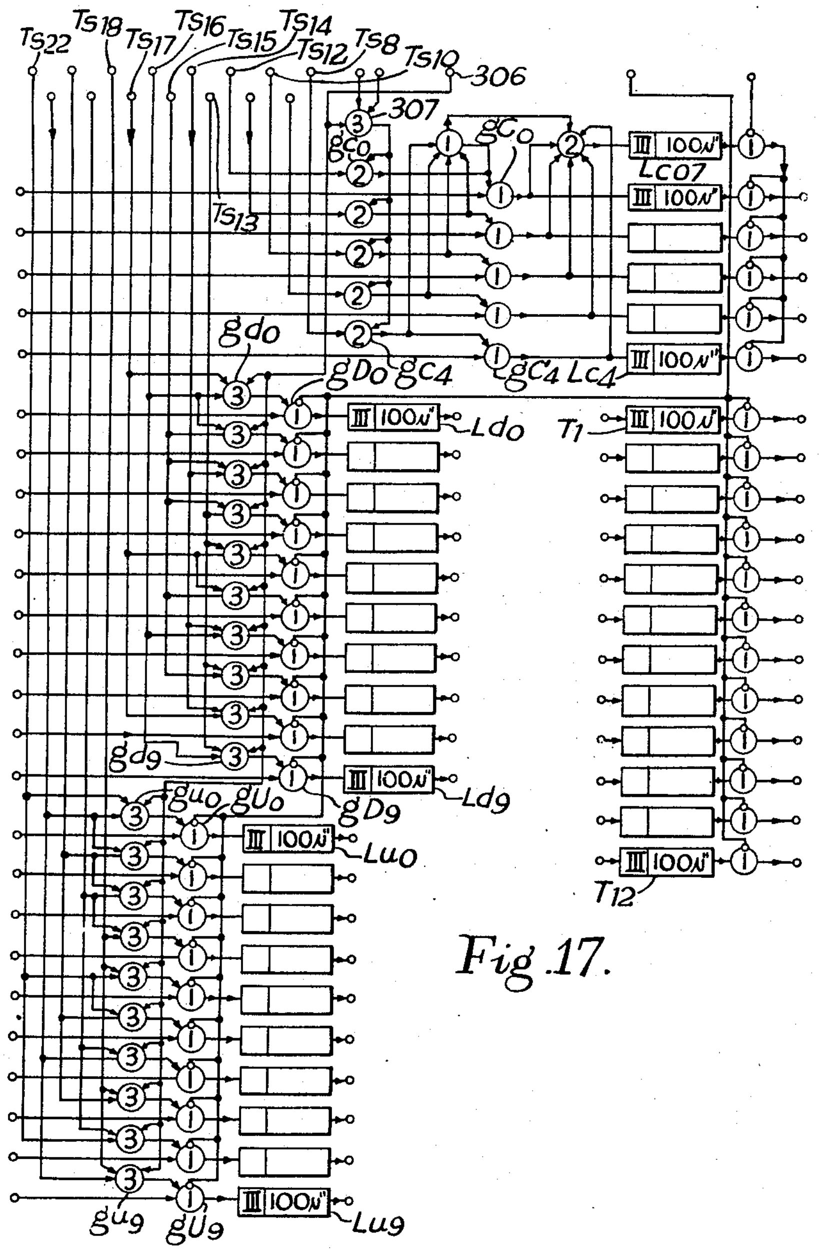
Figure 18:
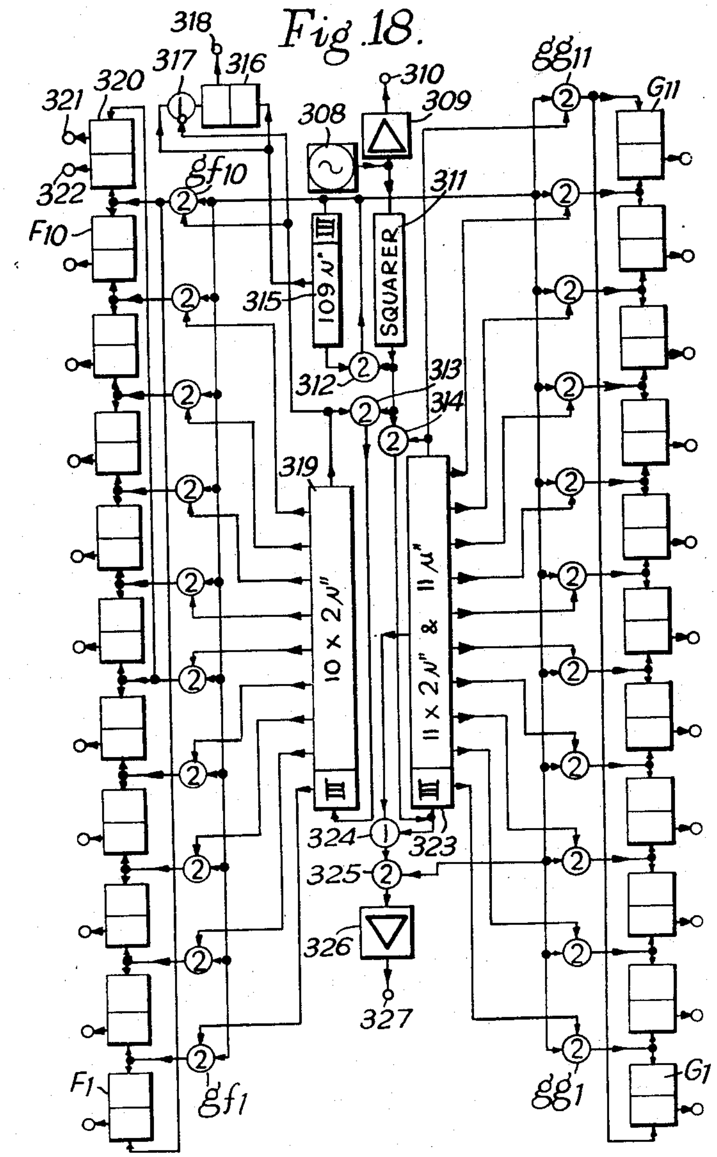
Figure 19:
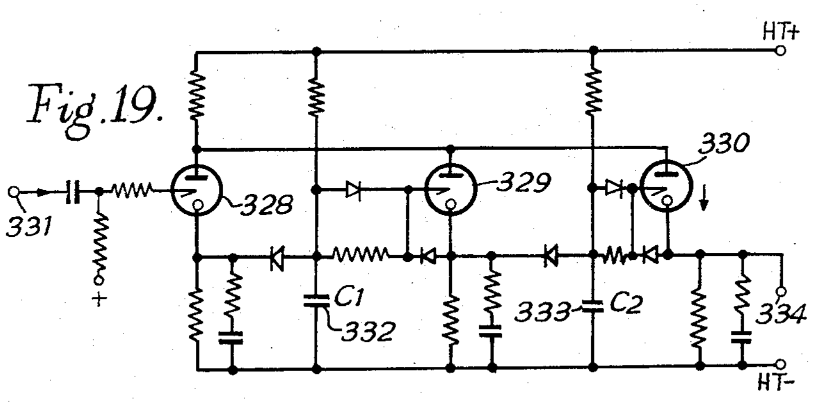
Figure 20:
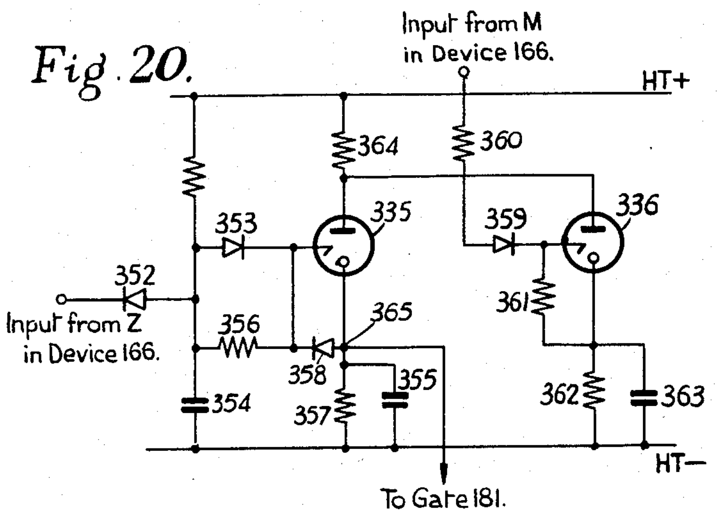
Figure 21:
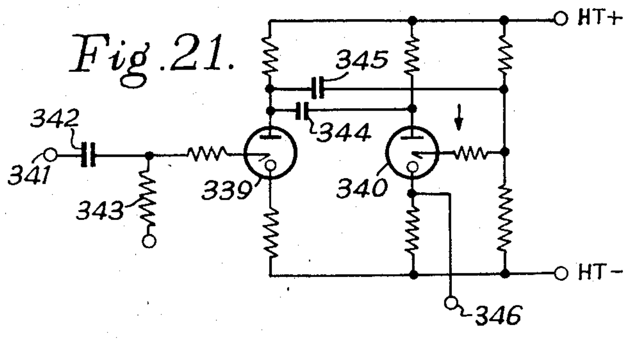
Figure 22:
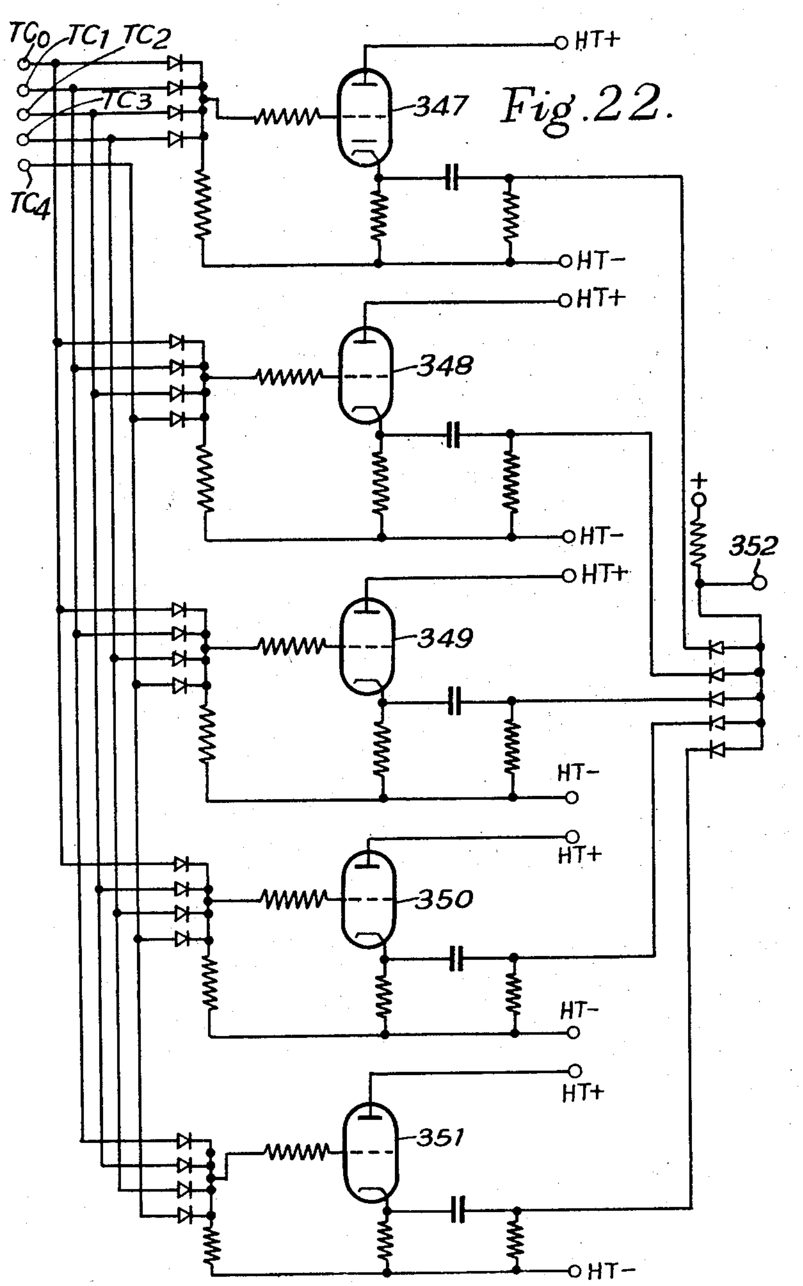

One embodiment of the invention will now be described my way of example with reference to the accompanying drawings in which:

Figure 1 (*a* and *b*) is a block schematic diagram of one of twenty substantially identical multichannel switching units of a 10,000 line automatic telephone system according to the present invention, Figure 2 is an explanatory diagram showing some of the trains of electric pulses employed in the operation of the unit shown in Figure 1, Figure 3 (*a* and *b*) is a block schematic diagram of the channel pulse store shown in Figure 1 in association with the channel pulse repeaters shown in Figure 1, Figure 4 is a schematic diagram of a channel pulse generator suitable for use in the system shown in Figure 1, Figure 5 is a schematic diagram of pulse trains employed in an alternative system of subscriber identification, Figure 6 is a schematic diagram of a register store and translator for use in the alternative system of subscriber identification, Figures 7, 8 and 9 are block schematic diagrams of an alternative arrangement for allotting free channels to a called subscriber, Figures 10 and 11 are block schematic diagrams of a register store and translator and a channel pulse store for use in yet another system of subscriber identification, Figure 12 is a block schematic diagram of a repeater suitable for use with the channel pulse store shown in Figure 11, Figure 13 is a schematic diagram of pulse trains employed in yet another system of subscriber identification to be described with reference to Figures 14–18, Figure 14 is a schematic diagram of a register for use in a further arrangement for subscriber identification, Figure 15 is a schematic diagram of a recoder for recoding signals from the register shown in Figure 14, Figure 16 is a schematic diagram of a trunk selector for use with the register and recoder shown in Figure 15, Figure 17 is a schematic diagram of a channel pulse store for use with the register shown in Figure 14, Figure 18 is a schematic diagram of a pulse generator for deriving the pulse trains shown in Figure 13, Figure 19 is a diagram of a circuit suitable for use as the slow-to-release device shown schematically in Figures 6, 10 and 14, Figure 20 is a diagram of a circuit suitable for use as the slow-to-operate device shown schematically in Figures 6 and 10, Figure 21 is a diagram of a circuit suitable for use as the trailing edge pulse former shown schematically in Figure 6, and Figure 22 is a diagram of a gate circuit.

In the descriptions which follow reference is frequently made to one-gates, two-gates, three-gates and so on. A one-gate is a circuit which produces an output voltage in response to the application of a voltage to any one of its inputs. A two-gate is a circuit which produces an output voltage in response to the simultaneous application of voltages to any two of its inputs. A three-gate is a circuit which produces an output voltage in response to the simultaneous application of voltages to any three of its inputs. In general, an $n$-gate is a gate which produces an output voltge in response to the simultaneous application of voltages to $n$ of its inputs. Such gates are shown in the drawings as a circle enclosing a numeral indicating whether it is a one-gate, two-gate and so on. A reference to the construction of such gates will be made in the detailed description which follows.

The switching unit shown in Figure 1 is a 100-channel time-division multiplex unit serving 500 of the 10,000 subscribers. Nineteen other identical multiplex units (not shown) are provided in this system. Provision is made in the control apparatus of each multiplex unit for setting up a speech path in selected channels between any two subscribers served by the same unit or between a subscriber served by the unit and a subscriber served by any other unit in the system. Each multiplex unit is adapted to enable speech to be transmitted in both directions in the speech paths set up.

The instruments of only two of the 500 subscribers served by the multiplex unit in Figure 1 have been shown in the drawing and these are indicated at 10 and 11 in the left hand lower corner of the figure. Each of the subscribers' lines terminates in a line terminating unit, the line terminating unit for the subscriber 10 being shown schematically within block 12 and the line terminating unit for the subscriber 11 being shown schematically within block 13. All the line terminating units have connections such as 14 and 15 connecting the line terminating units to a transmission link 16. At the other end of the link 16, twenty one groups of trunk terminating units are provided, each of a first and second of these groups comprising seven trunk terminating units and each of the other nineteen groups comprising ten trunk terminating units. The first and second group of the twenty one groups of trunk terminating units are employed for setting up speech paths between subscribers served by the multiplex unit shown, these two groups of trunk terminating units being connected together in such a way as to form 7 pairs of trunk terminating units, the first unit in the first group being connected to the first unit in the second group, the second in the first group being connected to the second in the second group, and similarly for the other units in these two groups. The third only of these identical pairs of trunk terminating units is shown at 17 in Figure 1, the units of the pair being indicated by numerals 18 and 19. Each of the pairs of trunk terminating units formed by the first and second groups of 7 are connected together by connections such as 20 which provide facilities for the transmission of speech in both directions and which will normally be a four-wire trunk.

The 19 other groups of trunk terminating units are employed for establishing speech paths between a subscriber served by the multiplex unit shown in Figure 1 and a subscriber served by one of the other 19 multiplex units (not shown). The first of these 19 groups is connected to a group of trunk terminating units in the second multiplex unit (not shown) to form 10 pairs of trunk terminating units, each pair serving to connect the first and second multiplex units, the second of the 19 groups being connected to a group in the third multiplex unit to form 10 pairs of trunk terminating units connecting the first and third multiplex units, and similarly for the others of the 19 groups of trunk terminating units.

All the trunk terminating units associated with one multiplex unit are connected to the link of that multiplex unit by connections such as 21 and 22 connecting the pair of trunk terminating units 18 and 19 to the link 16.

As will hereinafter be described speech paths are set up between a calling subscriber such as 10 and a called subscriber such as 11 in which the speech signals are transmitted through the link 16 in one of the channels between the line terminating unit 12 and one of a pair of disengaged trunk terminating units such as 18 and in another of the channels between the called subscriber's line terminating unit 13 and the trunk terminating unit 19.

The control apparatus for enabling the speech paths to be established comprises a control unit 23 in the top right hand corner of Figure 1, 5 registers, one of which is shown within block 24 and each of which has associated therewith a register terminating unit such as that indicated within the block 25, a distribution unit 26 for distributing control signals from each register to the line and trunk terminating units of the multiplex unit serving a called subscriber, and two tone-units 27 and 28. A pulse generator (not shown) is provided for generating trains of control pulses used in the multiplex units.

The 100 channels provided by the multiplex unit shown in Figure 1 take the form of 100 time-interlaced trains of ½ $\mu$-sec. pulses. The pulses in each train have a pulse repetition period of 100 $\mu$-secs. and the trains are interlaced in such a way that none of the pulses in the trains coincide.

The multiplex unit shown in Figure 1 will now be described in more detail. In the first instance it will be assumed that the subscriber 10 is to make a call to the subscriber 11 served by the same multiplex unit.

The subscriber's instrument 10 is connected through a hybrid unit 29 to the input of a modulator 30 and to the output of a demodulator 31. The output of the modulator 30 and the input of the demodulator 31 are connected to the transmission link 16 by connections 14 and 15. An output signal from the hybrid unit 29, representing a calling condition of the subscriber's line (line-looped) is fed to a gate 32 along a lead 33. The arrangement is such that an output signal is applied to the gate 32 from the hybrid unit 29 only when the subscriber's receiver is removed from its rest. The gate 32 is a so-called one-gate and an output signal from the hybrid unit 29 resulting from the subscriber 10 removing his receiver from its rest is passed from the output of the gate 32 along a lead 34 to a gate 35. The gate 35 is a so-called four-gate having four inputs. Two of the other three inputs of this gate are connected to terminals 36 and 37 to which subscriber identifying signals are applied as hereinafter described. The fourth input is connected to a lead 38 along which pulses in a free channel are fed from the control unit 23. The output of this gate 35 is connected to the input of a channel pulse repeater 39 the operation of which will hereinafter be described. For the present, it will be sufficient to say that in response to a free channel pulse applied thereto from the output of the gate 35 the channel pulse repeater delivers to an output lead 40 a continuous train of pulses of ½ μ-sec. duration and pulse repetition period of 100 μ-secs. The phase of the pulse train is set by the applied free channel pulse, and determines to which of the 100 channels the pulse train corresponds. The output of the repeater 39 is applied over a lead 40 to the modulator 30 and the demodulator 31 causing the modulator 30 to transmit pulses in this channel to the link and enabling the demodulator to demodulate pulses in this channel applied thereto from the link.

Reference is now made to the control unit 23 from which the free channel pulses on the lead 38 are transmitted. Clock pulses in the form of a continuous train of pulses of ½ μ-sec. duration and 1 μ-sec. repetition period are applied to terminal CP of the control unit 23. These pulses are generated by a pulse generator (not shown) and are shown schematically in Figure 2*a*. The clock pulses are applied to one input of a so-called two-gate 41 the other input of which is connected by a lead 42 to the output of a bi-stable multivibrator 43. Provision is made for preventing the transmission of pulses through this gate by the application thereto of pulses on any one of inhibiting leads 44, 45, 46 and 47 connected to the gate. To a terminal TR is applied a train of pulses R of 5 μ-sec. duration and 100 μ-sec. repetition period. The waveform of this pulse train is shown schematically in Figure 2*b* and its purpose is to ensure that the five clock pulses delivered to the gate 41 during the occurrence of each R pulse are not transmitted for a reason to be described later. It is arranged that only one clock pulse is passed through the gate 41 during each period commencing at the trailing edge of an R pulse and ending at the leading edge of the next succeeding R pulse. This condition is met by feeding the pulse train R from the terminal TR along the lead 47 to the gate 41 to inhibit the gate for the duration of each R pulse. The pulse train R is also applied to one of two inputs of the bistable multivibrator 43 which is switched over by the leading edge of each R pulse and delivers an output voltage on the lead 42 leading to the gate 41. The gate 41 is made operative by the voltage from the multivibrator to pass clock pulses when the multivibrator 43 switches over but is prevented by the action of the R pulse on lead 47 from transmitting the five clock pulses arriving at this gate during each R pulse. Following the five blocked pulses the first clock pulse not blocked by signals on the inhibiting leads 44, 45 and 46, is passed to the output of the gate 41 and is fed to a 100 μ-sec. delay line 48 and to the other input of the multivibrator 43 which is switched back thereby. The output voltage on the lead 42 is thus removed and no further applied clock pulses are transmitted by the gate 41 until the end of the next R pulse. The output of the delay line 48 is connected by the lead 44 to the gate 41. The feeding-back of the delayed clock pulse on inhibiting lead 44 prevents the transmission through the gate 41 of the corresponding clock pulse in the next 100 μ-sec. period. The delayed clock pulse appearing at the output of the delay line 48 is in addition fed along lead 49 and branch lead 49' to the input of the gate 35 in each subscriber's line terminating unit.

Thus, in operation, when the calling subscriber 10 removes his handset from its rest to make a call a D.C.

signal appears on the lead 33 from the output of the hybrid unit 29, and this signal is passed through the one-gate 32 to the lead 34 by which it is fed to one of the four inputs of the 4-gate 35. Subscriber identifying signals $P_1$ and $Q_1$ to be described later appear at the terminals 36 and 37 respectively and coincide every 105.6 milli-secs. for a duration of 100 μ-secs. Thus during this 100 μ-sec. period of coincidence of pulses $P_1$ and $Q_1$ the first free channel pulse to appear on the lead 38 passes through the gate 35 and is applied to the channel pulse repeater 39.

The "Go" section of the link 16, indicated schematically at the top of the link by an arrow 50 has its output connected by a lead 51 and a branch lead 51' to a clipper 52, which delivers a clipped output pulse in response to each and every pulse applied thereto. The output pulses from the clipper 52 are fed by a lead 53 to the inhibiting lead 46 connected to the gate 41. By this means transmission through the gate 41 of clock pulses in channels already being transmitted through the "Go" section of the link is prevented. The lead 53 from the output of the clipper 52 has branch leads 53', 53'' and 53''' leading to other apparatus in the control unit 23. The lead 53'' is connected to the input of a one-gate 54, the output of which is connected to a channel pulse generator 55. This generator is of a kind hereinafter to be described in which each pulse applied thereto from the gate 54 is regenerated to produce a continuous train of ½ μ-sec. pulses of 100 μ-sec repetition period set in the same phase as that of the applied pulse. The output of the clipper 52 is also connected through the lead 53' to a 100 μ-sec. delay line 56, the output of which is connected by a lead 57 to an inhibiting terminal on the gate 54.

The output of the generator 55 is connected by a lead 58 to five identical register terminating units, one only of which is shown in the Figure 1 at 25. The register terminating unit shown is assumed to be No. 3 in the group of five. The lead 58 is connected to the input of a two-gate 59 in this register terminating unit, the other input of the gate 59 being connected to a terminal $P_{z3}$ to which a continuous train of 100 μ-sec. pulses of 3.2 m-sec. repetition period is applied for a purpose to be described later. The output of the gate 59 is connected to a channel pulse generator 60, which is adapted to generate a continuous train of ½ μ-sec. pulses of 100 μ-sec. repetition period in the same phase as that of a setting pulse applied thereto. An auxiliary output of the generator 60 is connected by a lead 61 to an inhibiting terminal on the gate 59. The main output of the generator 60 is connected to a modulator 62 and demodulator 63. The output of the modulator 62 is connected by a lead 64 to the input end of the "Return" section of the link 16 shown schematically at the top of the link by an arrow 65. The input of the demodulator 63 is connected by a lead 66' to the output end of the "Go" section of the link 16. The input of the modulator 62 is connected by a lead 67 to the output of a one-gate 68 (in the register 24) to the input of which dialling tone is applied at terminal DT. The output of the demodulator 63 is connected by a lead 69 to the input of a register store 70 and to a release control circuit 71 hereinafter to be described.

As hereinbefore described, the calling subscriber 10 is allotted a free channel in the form of a carrier pulse train which is fed to the "Go" section 50 of the link 16. This allotted pulse train, together with other pulse trains already in use on the "Go" section of the link is fed along the lead 51 and branch lead 51' to the clipper 52. The pulse trains applied to the clipper 52 appear at the output thereof and are fed along branch lead 53'' to the gate 54. The first pulse in the newly allotted pulse train passes through the gate 54. This is however the only pulse in the train which the gate is allowed to pass, since subsequent pulses in the train are prevented from being transmitted by this gate by the pulse preceding it in the train and delayed by 100 μ-sec. in the delay line 56, and appears simultaneously therewith on the inhibiting lead 57. The pulse appearing at the output of the gate 54 is in the phase of the newly allotted pulse train, and is fed to the channel pulse generator 55 which in response to the application thereto of this pulse produces a train of ½ μ-sec. pulses of 100 μ-sec. repetition period in the same phase. It is to be noted that this pulse generator may simultaneously generate pulse trains in a number of different phases and thus may be said to serve as a store.

The pulse train appearing at the output of the generator 55 is applied to each of the five register terminating units. Pulses from the generator 55 are simultaneously applied to all five gates such as that shown at 59 but are blocked in engaged register terminating units by the voltage appearing on the inhibiting lead such as 61 connected to each gate. Control pulse trains $P_{z1}$ to $P_{z5}$ are applied to the five gates 59 respectively by means of which it is arranged to open these gates successively in a cyclic manner for periods of 100 μ-sec., sufficient time being allowed between the closing of one gate and the opening of the next to allow a pulse train accepted by a register terminating unit to be cancelled from the output of the generator 55. For the present description it will be assumed that the register terminating unit 25 as shown is free, that is to say, is not being employed to establish another call, that it is No. 3 in the group of five, that the register terminating units Nos. 1 and 2 are engaged, and that the first pulse in the train from the generator 55 occurs during the application of a control pulse $P_{z1}$ to the gate 59 in the register terminating unit No. 1 (not shown). Since the gate 59 of the register terminating unit No. 1 is blocked the first pulse from the generator 55 will be ineffective. Similarly since the gate 59 of the register terminating unit No. 2 is also blocked, the next pulse from the allotted pulse train which occurs during the application of control pulse $P_{z2}$ to the gate 59 in unit No. 2 is also ineffective. When however a pulse from the allotted train coincides with the application of control pulse $P_{z3}$ to the gate 59 in the unit No. 3, this pulse is passed to the output of the gate 59 from which it is fed to the input of the channel pulse generator 60. In response to the application of this pulse the generator 60 generates a continuous train of ½ μ-sec. pulses of 100 μ-sec. repetition period in the same phase as that of the applied pulse, that is to say, in the same phase as that of the newly allotted pulse train in the "Go" section of the link. An auxiliary output of the generator 60 delivers an engaged voltage on the lead 61 as already described to prevent the gate 59 from accepting further pulses from the generator 55 in the control unit 23. The pulse train from the output of the generator 60 is fed to the modulator 62 and the demodulator 63 and the allotted carrier pulse train appears at the output of the modulator 62 on the lead 64 by which it is fed to the "Return" section 65 of the link 16. The register terminating unit 25 is thus set up to transmit and receive signals in the channel allotted to the calling subscriber 10.

The "Return" section 65 of the link is connected by a lead 72 to a clipper 73 in the control unit 23. The output of the clipper 73 is connected by a lead 74 and branch leads 74′, 74″ and 74‴ to various points of the apparatus in the control unit 23. The branch lead 74′ is connected to an inhibiting terminal on the generator 55, and the branch lead 74″ to an inhibiting terminal on the gate 54.

The output pulse train from the clipper 73 fed to the inhibiting terminal on the generator 55 cuts off further generation of the allotted pulse train. The output from the clipper 73 fed to the inhibiting terminal on the gate 54 blocks the transmission of further pulses in the allotted pulse train from the "Go" section 50 of the link to the generator 55.

Dialling tone signals are applied to the terminal DT in the register 24 and pass through the one-gate 68 to the lead 67 by which they are fed to the input of the modulator 62. The allotted carrier pulse train is amplitude modulated by the dialling tone signals in the modulator 62 and the modulated pulse train is fed to the "Return" section of the link 16. The demodulator 31 in the calling subscriber's line terminating unit 12 demodulates the pulse train by which the dialling tone signals are transmitted and the output of the demodulator 31 is fed to the subscriber's instrument 10.

The calling subscriber at 10 proceeds to dial the number of the called subscriber at 11, which for the present description is assumed to have the number 0123. The dialling signals representing this number are fed through the hybrid unit 29 to the modulator 30 in the calling subscriber's line terminating unit 12, where they are applied to modulate the allotted pulse train. The amplitude-modulated pulse train appears on the "Go" section of the link and is demodulated by the demodulator 63 of the register terminating unit 25. The dialling signals appearing at the output of the demodulator 63 are negative-going impulses and are applied to the register store 70 and to the register release control circuits 71 in the register 24. It is arranged that the first of the dialling impulses received by the release control circuit 71 causes a voltage to appear in the lead 69′ which blocks the gate 68.

The register store 70 and a translator 75 associated therewith will be assumed to be of the kind described in copending application No. 395,391. For the present it will be sufficient to say that each group of dialling signals received by the register is first stored in the store 70 and then translated by the translator 75 into a called subscriber's identifying signal. This identifying signal is caused to appear on one of the output leads $O_1$ to $O_{20}$ depending upon the multiplex unit to which the called subscriber's instrument is connected. For the present description it is assumed that subscribers having numbers 0000 to 0499 are served by the multiplex unit No. 1 as shown in Figure 1, subscribers having numbers 0500 to 0999 are served by multiplex unit No. 2 (not shown), and so on, and finally the subscribers having numbers 9500 to 9999 are served by the last multiplex unit No. 20. The called subscriber in the present description is assumed to be subscriber 11 in Figure 1 and to have the number 0123. The signal identifying this subscriber thus appears on the output lead $O_1$ of the translator 75.

In the present description it will be assumed that the subscribers' identifying signals are in the form of P and Q pulses as described with reference to Figure 2 of copending patent application Serial No. 395,391. The signal identifying a subscriber is in the form of a train of 100 μ-sec. pulses of 105.6 millisecond repetition period, different subscribers being identified by trains of the same pulse duration and repetition period but of different phases. Thus, the 500 subscribers belonging to the same multiplex unit are identified by 500 such time-interlaced pulse trains. As described in the same copending application these 500 time interlaced pulse trains are derived by combining a series of 25 time-interlaced pulse trains of 100 μ-sec. pulse duration and 3.2 millisecond repetition period referred to as trains $P_1P_2 \ldots P_{25}$, with a series of 20 time-interlaced pulse trains of 100 μ-sec. duration and 3.3 millisecond repetition period referred to as trains $Q_1Q_2 \ldots Q_{20}$. The pulse train $P_1$ is shown schematically in Figures 2(*c*) and (*c′*) and the pulse train $Q_1$ is shown schematically in Figure 2(*d*). The pulse train resulting from combining the pulse trains $P_1$ and $Q_1$ is shown schematically in Figure 2(*e*) and forms the first of the 500 subscriber identifying pulse trains referred to above. The 500 subscriber identifying pulse trains are hereinafter referred to as pulse trains $(P_1Q_1)$, $(P_1Q_2) \ldots (P_{25}Q_{19})$, $(P_{25}Q_{20})$.

For the present description it is assumed that the subscriber 10 is identified by the pulse train $P_1Q_1$ and the subscriber 11 by the pulse train $P_7Q_{20}$. The signal appearing at the output $O_1$ of the translator 75 is therefore the pulse train $P_7Q_{20}$ which it will be remembered is a train of 100 $\mu$-sec. pulses of 105.6 millisecond repetition period.

The output lead $O_1$ is connected by a branch lead to the input of a two-gate 76. The other input of the two-gate 76 is connected by a lead 77 to the output of the channel pulse generator 60 in the register terminating unit 25. The output of the gate 76 is connected to one of five inputs of a one-gate 78 which serves to combine the outputs of the gates 76 from the five registers in this multiplex unit. The output of the one-gate 78 is connected by a lead 79 to one of the trunk terminating units in each of the 7 pairs of trunk terminating units in the multiplex unit shown. One only of the 7 pairs of trunk terminating units is shown at 17 in Figure 1. The lead 79 is connected to the input of a one-gate 80 in the trunk terminating unit 18, the output of which is connected to the input of a channel pulse repeater 81. The channel pulse repeater 81 is of the same kind as those incorporated in the subscribers' line terminating units and as will be described later in detail delivers at its output a continuous train of ½ $\mu$-sec. pulses of 100 $\mu$-sec. repetition period and in the same phase as that of the pulse applied to it. The output of this repeater 81 is connected to a modulator 82 and a demodulator 83. An auxiliary output of the channel pulse repeater 81 provides a voltage on lead 84 when the repeater is in use. The lead 84 is connected by branch lead 85 to an inhibiting terminal on the gate 80 and to a gate 86 which is open only in the absence of the voltage on the lead 85.

For the following description it will be assumed that the trunk terminating units 18 and 19 are the third pair in the group of the 7 pairs. A lead 87 is connected to an inhibiting terminal on the gate 80. The lead 87 is connected at its remote end (not shown) to the output of a gate identical to 86 in the trunk terminating unit which corresponds to 18 in the second pair (not shown). A lead corresponding to lead 87 likewise connects the output of the gate 86 in the trunk terminating unit corresponding to 18 in the first pair to the inhibiting terminal in the gate 80 in the trunk terminating unit corresponding to 18 in the second pair. The output of the gate 86 in the trunk terminating unit 18 shown is likewise connected to gate 80 in the unit corresponding to 18 in the fourth pair (not shown), and so on for the remaining pairs in the series of 7. The gate 86 is omitted from the last unit corresponding to 18 in the series. Each gate 86 is arranged in such a manner that it provides an inhibiting voltage in its output lead 87 whenever an inhibiting voltage is absent from the lead 85; that is when the repeater 81 associated therewith is free, and whenever a voltage is present in the lead 87 thereto from the next preceding gate 86.

The trunk terminating units corresponding to 19, as shown, are similarly connected together and are identical in all respects, except the input connection to the gate 80, to the units with which they form pairs.

The outputs of the modulators in all the trunk terminating units are connected by leads such as 21 to the input end of the "Return" section 65 of the link 16, and the inputs of the demodulators 83 are connected by leads such as 22 to the output end of the "Go" section 50. The output of the demodulator 83 in each unit in a pair is connected to the input of the modulator 82 in the other unit in the pair.

The output lead $O_1$ from the translator 75 is also connected to a one-gate 88 in the distribution unit 26. This gate 88 serves to combine pulse trains from the outputs such as $O_1$ of the translators of all five registers associated with the multiplex unit shown in Figure 1. The output of the gate 88 is connected to the input of a two-gate 89 the other input of which is connected by a lead 49", forming a branch of the lead 49, to the output of the delay line 48 in the control unit 23. The output of the gate 88 is also connected by a lead 90 to the input of a one-gate 91. The output of the gate 91 is connected by a lead 92 to the input of the one-gate 32 in each subscriber's line terminating unit.

In operation, the first pulse in the pulse train $P_7Q_{20}$ appearing at the output $O_1$ of the translator 75 opens the gate 76 for 100 $\mu$-secs. The train of ½ $\mu$-sec. pulses generated in the register terminating unit 25 by the channel pulse generator 60 appears on the lead 77 connected to the gate 76 and the ½ $\mu$-sec. pulse in this train, which occurs in the 100 $\mu$-sec. interval during which the gate 76 is open, passes through the gate. The ½ $\mu$-sec. pulse thus passed through the gate 76 is fed through the gate 78 to each of the seven trunk terminating units corresponding to 18 shown in the Figure.

For the purpose of this description it will be assumed that the first and second pairs of trunk terminating units (not shown) are already in use and that the third, which is shown, and all the other pairs are free. In these circumstances, the channel pulse repeaters in the trunk terminating units in the first and second pairs produce an inhibiting voltage on the leads 85 which inhibit the gates 80 in these units. No inhibiting voltage appears, therefore, in the output leads 87 of the gates 86 in these units. The third pair of units 18 and 19 are assumed to be free and thus the gates 80 in this pair of units are not inhibited and inhibiting voltages appear at the output of the gates 86 and are applied to the fourth pair of trunk terminating units to inhibit the gates 80 therein. Similarly, the gates 80 in the other pairs of free trunk terminating units are inhibited by voltages from the gates 86 of the next preceding unit. The only pair of gates 80 which are open is thus the pair in the third pair of trunk terminating units 18 and 19 shown in the figure.

The ½ $\mu$-sec. pulse appearing on the lead 79 passes through the gate 80 in the unit 18 to the input of the channel pulse repeater 81 which in a manner to be described later generates a continuous train of ½ $\mu$-sec. pulses of 100 $\mu$-sec. repetition period in the phase of the applied pulse. The output pulse train of repeater 81 is applied to the modulator 82 and demodulator 83 and a pulse train appears at the output of the modulator 82.

The pulse train $P_7Q_{20}$ appearing at the output $O_1$ of the translator 75 is fed through the one-gate 88 and the first pulse in this train opens the gate 89 for 100 $\mu$-secs. The other input of the gate 89 is fed with pulses from the delay line 48 in the control unit 23. The pulses produced at the output of the delay line 48 are in phases corresponding to channels not already in use in the link, since any pulses corresponding to pulse trains already in use on the "Go" or "Return" sections of the link are prevented from passing through the gate 41. Furthermore, by the action of the delayed pulse on the lead 44, it is ensured that a pulse appearing at the output of the delay line 48 has not appeared at this output 100 $\mu$-secs previously. The ½ $\mu$-sec. pulse appearing at the input to the gate 89 in the distribution unit 26 during the 100 $\mu$-sec. period when the gate 89 is open passes through the gate 89 and is fed to the inputs of the gates 80 in the group of 7 trunk terminating units 19. The units in this group are connected together in the same manner as the group of 7 units 18 paired therewith and operate in the same manner. Thus, only one of the units 19 is rendered responsive to the applied pulse, and since the first and second pairs of trunk terminating units are assumed to be in use, and third (shown in the drawing) to be free, the gate 80 of this unit is open and the ½ $\mu$-sec. pulse passes through the gate 80 to the channel pulse repeater 81. In response to the applied pulse the channel pulse repeater 81 delivers a continuous train of ½ $\mu$-sec. pulses of 100 $\mu$-sec. repetition period in the same phase as that of the applied pulse. The output pulse train from the repeater 81 is fed to the modulator and demodulator of the unit 19, and the modulator 82 feeds to the input of the "Return" section 65 of the link 16 a carrier pulse train in the same phase as that of the pulse from the control unit 23. This further pulse train appearing in the "Return" section 65 is fed along the lead 72 to the clipper 73 and appears in the output of this clipper, from which it is fed along lead 74 and branch lead 45 to inhibit transmission of the corresponding clock pulse through the gate 41. This pulse train appearing at the output of the clipper 73, of course in addition to others which may be present, is fed along branch lead 74'' to inhibit transmission of pulses through the gate 54, and along branch lead 74' and stops the generation of pulses in this phase by the generator 55.

The pulse train ($P_7Q_{10}$) representing the called subscriber's number and appearing at the output of the gate 88 in the distribution unit 26, is also fed to one of the inputs of the one-gate 91. This pulse train is fed along the lead 92 to each of the line terminating units of the 500 subscribers served by the multiplex unit, the pulse train in each case being fed to the input of the one-gate 32. The pulse train ($P_7Q_{20}$) is passed through the gate 32 in each unit and appears at the input of the gate 35. Pulse trains $P_7$ and $Q_{20}$ from which the pulse train ($P_7Q_{20}$) is derived are permanently applied to terminals $P_7$ and $Q_{20}$ in the line terminating unit 13 and appear at separate inputs to the gate 35 in this unit when the pulse train ($P_7Q_{20}$) appears at the third input to the gate 35. The fourth input to the gate 35 is fed with free channel pulses from the control unit 23 and the first one appearing at the input to the gate 35 during the 100 $\mu$-sec. period when the pulses $P_7$ and $Q_{20}$ and ($P_7Q_{20}$) coincide with one another passes through the gate and is fed to the channel pulse repeater 39. Since the gate 35 in the unit 13 is the only one of the 500 units to which pulses $P_7$ and $Q_{20}$ are applied this unit will be the only unit of the 500 which will accept a free channel pulse during the 100 $\mu$-sec. period. Furthermore, since the gate 35 is opened simultaneously with the gate 89 in the distribution unit 26, both these gates pass the same pulse. Hence the pulse repeater 39 in the called subscriber's line terminating unit 13 generates a train of ½ $\mu$-sec. pulses in the same phase as that of the train generated by the trunk terminating unit 19. The output pulse train from the channel pulse repeater 39 in the unit 13 is fed to the modulator 30 and demodulator 31. The pulse train corresponding to the further allotted channel appears at the output of the modulator 30 but it is arranged that the output pulse train is only 10% of the nominal mean amplitude until the called subscriber 11 lifts his receiver when a bias voltage applied to the modulator is removed and the pulse amplitude is increased. The pulse train of reduced amplitude is fed to the input of the "Go" section of the link, from which it is fed along the lead 51 to the clipper 52 and appears in the output of this clipper to prevent transmission of clock pulses corresponding to this phase from passing through the gate 41.

An auxiliary output of the repeater 39 in the called subscriber's unit 13 is connected to an inhibiting terminal on the gate 32 to prevent transmission of further pulses through this gate. The same auxiliary output is connected to a cold cathode tube shown in block form at 93 to which ringing current is applied from a terminal R.C. The output of the tube 93 is connected to the hybrid unit 29, and in response to the inhibiting voltage appearing at the auxiliary output of the repeater 39 the cold cathode tube 93 is switched on and ringing current is applied therethrough to the called subscriber's line.

Reference will now be made to the release control circuits 71 and the associated gates in the register 24. The main function of this circuit is to render the register and the register terminating unit free to accept calling signals in another channel from another calling subscriber. An auxiliary output of the translator 75 is connected by a lead 94 to an input of the control circuit 71 and by a branch lead 95 to one of the inputs of a two-gate 96. The other input of the gate 96 is connected by a lead 97 to the output of the generator 60 in the register terminating unit 25. The control circuit is provided with two further outputs in addition to the output connected to the gate 68. The first of these outputs is connected by lead 98 to an inhibiting terminal in the channel pulse generator 60. The other output is connected by lead 99 to one of the two inputs of a gate 100. The other input of the gate 100 is connected by branch lead 97' to the output of the generator 60. The output of the gate 100 is connected by a lead 101 to the input of a channel pulse generator 102 in the tone unit 27, the output of the generator 102 being connected to a modulator 103 to which a tone indicating that a number is unobtainable is applied. The output of the modulator 103 is connected to the input end of the "Return" section of the link 16. The output of the gate 96 is connected by a lead 104 to the input of a 100 $\mu$-sec. delay line 105 in the control unit 23. The output of the delay line 105 is connected to the input of a one-gate 106, the output of this gate being connected to a further 100 $\mu$-sec. delay line 107. The output of this delay line 107 is connected to the input of a channel pulse generator 108 whose output is connected to a modulator 109. The input of the modulator 109 is connected to a terminal BT to which busy tone signals are continuously applied and the output of the modulator 109 is connected to the "Return" section of the link 16.

Simultaneously with the appearance of the 100 $\mu$-sec. pulse ($P_7Q_{20}$) on the output lead $O_1$ of the translator 75 a 100 $\mu$-sec. control pulse is delivered to the auxiliary output of the translator and appears on the lead 94. In response to the application of this 100 $\mu$-sec. control pulse to the control circuit 71, the circuit 71 delivers to the output lead 98 a 100 $\mu$-sec. pulse delayed by 100 $\mu$-secs. which is fed to the inhibiting terminal in the channel pulse generator 60 and prevents the further generation of the pulse train representing the channel allotted to the register terminating unit 25.

The 100 $\mu$-sec. pulse appearing on the lead 94 is fed along the lead 95 to the two-gate 96. The ½ $\mu$-sec. pulse train from the channel pulse generator 60 is also fed to the gate 96 and the first pulse in the train that occurs during the application of the 100 $\mu$-sec. pulse fed to the gate passes through the gate and appears on the lead 104 by which it is fed to the delay line 105 in the control unit 23. The ½ $\mu$-sec. pulse is delayed by 100 $\mu$-sec. in the delay line 105 and is then passed to a one-gate 106. The gate 106 is provided with an inhibiting terminal which is fed with pulses from the output of the clipper 73 which it will be remembered passes all pulse trains present on the "Return" section 65 of the link. It has been assumed in the foregoing description that the call has so far been successful and that a pair of trunk terminating units have been selected. The trunk terminating unit in the pair corresponding to 18 is then delivering to the "Return" section 65 of the link a pulse train corresponding to that generated in the register terminating unit 25. This pulse train passes through the clipper 73 and inhibits the transmission of the corresponding pulse through the gate 106. If, however, no pair of trunk terminating units is selected, as in the case when all are busy, the pulse train in the phase corresponding to that of the pulse applied to the gate 106 is no longer present on the "Return" section of the link since the generator 60 in the register terminating unit 25 is stopped by the pulse from lead 98. The pulse applied to the gate 106 then passes through the gate and through the delay line 107 where it is further delayed by 100 $\mu$-secs., and is then fed to the channel pulse generator 108. In response to the applied pulse, the channel pulse generator 108 generates a train of ½

$\mu$-sec. pulses of 100 $\mu$-sec. repetition period in the same phase as that of the applied pulse. The pulse train thus generated is fed to the modulator 109 where it is amplitude-modulated by busy-tone signals applied to terminal BT and the modulated pulse train is fed to the "Return" section of the link 16. The pulse train carrying the busy tone signals is in the phase corresponding to the channel allotted to the calling subscriber 10 and hence is demodulated by the demodulator 31 and fed to the calling subscriber's line.

Provision is also made in the register for sending to the calling subscriber signals, hereinafter referred to as N.U. tone signals, which indicate that the called subscriber is unobtainable. The fact that a called subscriber is unobtainable is indicated by the absence of the 100 $\mu$-sec. pulse from the auxiliary output of the translator 75 as will be described later. It is arranged that pulses appearing in the output of the demodulator 63 and applied to the control circuit 71 along the lead 69 are fed to a forced release timing circuit (not shown) in the control circuits 71. This forced release timing circuit is started by the first positive-going pulse applied to it from the output of the demodulator 63 in the register terminating unit 25, the positive-going pulse appearing when the register is seized. After a predetermined interval determined by this forced release timing circuit, 100 $\mu$-sec. pulses appear simultaneously in the leads 98 and 99 if no pulse has appeared at the auxiliary output of the translator 75. The 100 $\mu$-sec. pulse appearing in the lead 98 cuts off the generator 60 in the register terminating unit 25 and the 100 $\mu$-sec. pulse appearing in the lead 99 allows the last ½ $\mu$-sec. pulse from the generator 60 to pass through the gate 100 to the lead 101 by which it is fed to the channel pulse generator 102. The generator 102 is started by this pulse and delivers to the modulator 103 a train of ½ $\mu$-sec. pulses of 100 $\mu$-sec. repetition period in the same phase as the train generated in the register terminating unit 25. This pulse train is amplitude-modulated by N.U. tone signals applied to the terminal NUT and the modulated pulse train is fed to the "Return" section of the link 16. The modulated pulse train is received by the demodulator 31 in the calling subscriber's line terminating unit 12, where it is demodulated. The N.U. tone signals from the output of the demodulator 31 are fed to the calling subscriber's ilne.

In all circumstances, the forced release timing circuit (not shown) which forms part of the release control circuit 71 and which is referred to above operates after the predetermined interval to remove the signal applied to the inhibiting terminal in the gate 68 if the register has not already been released.

The tone unit 28 will now be described in detail.

The output of the one-gate 91 in the distributor 26 is, as previously described, connected by the lead 92 to the inputs of each gate such as 32 in the 500 subscribers' line terminating units and as previously described carries the called subscriber's identifying signals such as $(P_7Q_{20})$. The lead 92 is further connected by a branch lead 92' to one of the inputs of a two-gate 110, to the other input of which is connected a branch lead 111 from the lead 38 connected as previously described by the branch leads 49' and 49 to the output of the delay line 48, which it will be remembered is fed with ½ $\mu$-sec. pulses corresponding in phase with pulse trains representing free channels. The output of the gate 110 is connected to the input of a two-gate 112, to the other input of which is permanently applied from terminal $(PQ)_z$ pulse trains of the subscriber identifying type (PQ) which correspond to any of the subscribers' lines which are out of service. The output of this gate is connected to the input of a channel pulse generator 113 and the output of this generator is connected to a modulator 114 to which tone signals, hereinafter referred to as N.U. signals indicating that the called subscriber is unobtainable, are applied from terminal NUT. The output of the modulator 114 is connected to one of the inputs of a one-gate 115 whose output is connected to the input of the "Go" section of the link 16. The output of the gate 110 is further connected through a 200 $\mu$-sec. delay line 116 to the input of a one-gate 117 and to one of the inputs of a two-gate 118. The other input to the gate 118 and an inhibiting terminal on the gate 117 is connected by a common lead 119 to the output of the delay line 56 in the control unit 23. It will be remembered that the delay line 56 is fed with pulses from the "Go" section 50 via the lead 51 clipper 52 and the branch lead 53'. The output of the gate 117 is connected to a channel pulse generator 120 which is adapted to generate a train of ½ $\mu$-sec. pulses of 100 $\mu$-sec. repetition period in the same phase as that of the applied pulse. The output of the generator 120 is connected to a modulator 121 to which are applied from terminal BT busy tone signals. The output of the modulator 121 is connected to another of the inputs of the combining gate 115. The output of the gate 118 is connected to a channel pulse generator 122 which functions in the same manner as the generator 120 and the output of the generator 122 is connected to a modulator 123 to which are applied from terminal RT signals hereinafter referred to as ringing-tone signals indicating that the called subscriber is being called. The output of the modulator 123 is connected to another of the inputs of the combining gate 115. The output of the channel pulse generator 122 is also connected to one of the inputs of a four-gate 124. One of the other inputs to the gate 124 and an inhibiting terminal on the gate 118 are connected by a common lead 125 to the output of a 100 $\mu$-sec. delay line 126 in the control unit 23 which is fed with pulses from the output of a slicer 127 connected at its input by the lead 51 to the "Go" section 50 of the link 16. The slicer 127 is adapted to produce output pulses in response to the application thereto of pulse trains from the "Go" section 50 of the link only when such pulses are of an amplitude above a predetermined level. It will be recalled that the modulator 30 of a called subscriber's line terminating unit delivers to the "Go" section of the link a pulse train which is of reduced amplitude, and it is arranged that the amplitude is set at its full value only when the called subscriber removes his receiver from its rest. The pulses of the reduced amplitude are not passed by the slicer 127. The remaining two inputs to the gate 124 are connected to terminal $TP_{x+1}$ and $TQ_{y+1}$ respectively. To these terminals are applied pulse trains $P_{x+1}$ and $Q_{y+1}$ respectively. The pulse train $P_{x+1}$ is any one of the pulse trains P hereinbefore referred to and the pulse train $Q_{y+1}$ is any one of the pulse trains Q. The output of the gate 124 is connected to an inhibiting terminal in the generator 122 and to the input of a channel pulse generator 128. The generator 128 is of the same kind as the other generators in the tone unit 28 and generates a continuous train of ½ $\mu$-sec. pulses of 100 $\mu$-sec. repetition period in the same phase as that of a pulse applied thereto. The output of the generator 128 is connected to a modulator 129 to which a 4 kc./s. oscillation is applied at an input terminal T (4 kc./s.). The output of the modulator 129 is connected to the remaining input of the one-gate 115. The generator 128 and the gate 115 each have an inhibiting terminal which is connected by a common lead 130 to the output of a two-gate 131. The two inputs to this gate 131 are connected to terminals $TP_x$ and $TQ_y$ respectively. To the terminal $TP_x$ is applied the pulse train $P_x$ whose phase is that next preceding the pulse train $P_{x+1}$ hereinbefore referred to and to the terminal $TQ_y$ is applied the pulse train $Q_y$ whose phase is that next preceding the pulse train $Q_{y+1}$.

The operation of the tone unit 28 will now be described. It will be recalled that the pulse train $(P_7Q_{20})$ identifying the called subscriber 11 appears at the output $O_1$ of the translator 75 in the register 24 and that during the occurrence of this pulse a free pair of trunk terminating units 18 and 19 are selected, and one of the units (the unit 18) in the selected pair is set to generate a pulse train in the same phase as that generated in the line terminating unit 12 of the calling subscriber 10. In the same period the called subscriber 11 is identified, and the line terminating unit 13 of the called subscriber 11 is set to generate a pulse train in a phase corresponding to a further free channel, and the other of the trunk terminating units (the unit 19) in the selected pair is set to generate a pulse train in the same phase as that generated in the called subscriber's line terminating unit 13. It will also be recalled that for the purpose of identifying the called subscriber 11 the pulse $(P_7Q_{20})$ is fed to each subscriber's line terminating unit along the lead 92. The operation of the tone unit 28 is controlled by the pulse $(P_7Q_{20})$ which is fed along the leads 92 and 92' to the input of the two-gate 110 in the tone unit 28. Free channel pulses are applied to the other input of the gate 110 from the lead 111 connected to the output of the delay line 48 in the control unit 23. The first of these pulses is the one which is also applied to start the channel pulse repeater 39 in the called subscriber's line terminating unit 13 and to start the repeater 81 in the trunk terminating unit 19. This pulse appearing at the input of the gate 110 during the application of the pulse $(P_7Q_{20})$ passes through the gate 110 and is fed to the gate 112. Since it has been assumed that the call will be successful no pulse corresponding to $(P_7Q_{20})$ appears at the input $(PQ)_z$ to the gate 112 and hence no pulse is applied to the generator 113. If, however, the called subscriber 11, identified by the pulse $(P_7Q_{20})$, is unobtainable, for example if the line is out of service, then it is arranged to apply to the terminal $(PQ)_z$ a pulse train $(P_7O_{20})$ so that the free channel pulse passes through the gate 112 to the generator 113 which is set thereby to generate a train of ½ $\mu$-sec. carrier pulses in the same phase as that of the free channel pulse. The train of carrier pulses thus generated is fed to the modulator 114 where it is modulated by N.U. tone signals from the terminal NUT. The modulated pulse train is fed through the combining gate 115 to the "Go" section of the link 16. As previously described the repeater 81 in the trunk terminating unit 19 is set by the same free channel pulse to generate a train of carrier pulses in the same phase and hence the modulated pulse train fed to the incoming highway is received by the unit 19 and demodulated by the demodulator 83. The output of this demodulator is fed along lead 20 to the modulator 83 in the trunk terminating unit 18. The train of carrier pulses in the phase representing the channel allotted to the calling subscriber 10 is modulated by the N.U. tone signals and fed to the "Return" section of the link and is received and demodulated by the demodulator 31 in the line terminating unit 12 of the calling subscriber 10. N.U. tone signals from the output of this demodulator are fed to the calling subscriber's line.

The pulse appearing at the output of the gate 110 is delayed by 200 $\mu$-secs. in the delay line 116 and is then fed to the gates 117 and 118. The gate 117 is blocked by pulses appearing on the lead 119 fed from the delay line 56 in the control unit 23. The pulses from the delay line 56, it will be remembered, are pulses from the "Go" section of the link and passed by the clipper 52, delayed 100 $\mu$-secs. in the delay line 56 and fed to block the gate 117. In these circumstances therefore the pulse applied to the gate 117 is blocked by a pulse in the train fed along the lead 119. If, however, the called subscriber 11 is busy no such pulse train appears in the lead 119 and the pulse from the delay line 116 passes through the gate 117 to the generator 120 which responds to the pulse to generate a train of carrier pulses in the same phase as that of the applied pulse. The train of carrier pulses is then modulated in the modulator 121 by busy-tone signals applied thereto and the modulated pulse train fed to the "Go" section of the link through the one-gate 115. Busy-tone signals are transmitted to the calling subscriber 10 in the same way as the N.U. tone signals.

Assuming that the called subscriber 11 is not busy, the pulse train corresponding in phase to the free channel pulse applied to the gate 118 is present in the lead 119 and this pulse is passed through this gate if there is no pulse present in the lead 125. The lead 125 is fed with pulses delayed by 100 $\mu$-secs. in the delay line 126 and fed from the output of the slicer 127. It will be remembered that only those pulse trains of full amplitude in the "Go" section of the link are passed by the slicer 127. It is assumed that the called subscriber 11 has been allotted a pulse train in the phase of the free channel pulse accepted by the tone unit 28 but that he has not yet removed his receiver from its rest. It will be remembered that in these circumstances the pulse train on the "Go" section of the link in this phase from the called subscriber's line terminating unit 13 is of reduced amplitude and will not therefore be passed by the slicer 127. Hence no corresponding pulse train appears on the lead 125. In these circumstances the pulse applied to the gate 118 passes through the gate 118 and is fed to the generator 122 which is set thereby to generate a train of carrier pulses in the same phase as that of the pulse applied to it. The train of pulses thus generated is fed to the modulator 123 where it is modulated by ringing tone signals applied to the terminal RT. The modulated pulse train is fed to the combining gate 115 and from there to the link where the signals are transmitted in the same manner previously described with reference to the transmission of N.U. tone signals from the tone unit 28.

It will be apparent that the train of pulses carrying the ringing tone signals on the "Go" section will be passed by the slicer 127 since the pulses in this train will be of full amplitude. Thus, this train of pulses will produce the same effect on the slicer 127 as that produced when the called subscriber removes his receiver and restores to its full amplitude the train of pulses which his line terminating unit feeds to the link. In order that the effect of the change in amplitude produced by the called subscriber's carrier pulse train may be detected in the tone unit 28 the following provisions are made. Pulse trains $P_x$ and $Q_y$ each of 100 $\mu$-sec. pulse duration and of 3.2 and 3.3 milliseconds repetition periods respectively are applied to the terminals $TP_x$ and $TQ_y$ and are fed to the inputs of the two-gate 131. The output pulses from the gate 131 are in the form of a train of 100 $\mu$-sec. pulses of 105.6 millisecond repetition period. This pulse train is similar to or is one of the 500 time-interlaced pulse trains (PQ) previously referred to as subscriber identifying pulse trains. The pulse train $(P_xQ_y)$ is fed to the inhibiting terminal on the gate 115 and operates the gate to suppress one pulse every 105.6 milliseconds from the train of pulses carrying the ringing tone signals. The carrier pulse train thus modified and the carrier pulse train from the called subscriber's line terminating unit 13 are together passed by the slicer 127, are delayed by 100 $\mu$-secs. in the delay line 126 and are then fed to one of the inputs of the gate 124. To the terminals $TP_{x+1}$ and $TQ_{y+1}$ are fed pulse trains $P_{x+1}$ and $Q_{y+1}$ respectively, these pulse trains being similar to pulse trains $P_x$ and $Q_y$ but the pulses in each are delayed in phase by 100 $\mu$-secs. from the corresponding pulses in the trains $P_x$ and $Q_y$ to compensate for the delay introduced in the trains $P_x$ and $P_y$ by the 100 $\mu$-sec. delay line 126. Thus, the gate 124 is rendered responsive to pass a pulse from the channel pulse generator 122 when, and only when, a pulse is received on the lead 125 during a 100 $\mu$-sec. period when a pulse is suppressed from the pulse train carrying the ringing tone signals. In this arrangement, no pulse appears in the lead 125 during the 100 $\mu$-sec. pulse suppression periods until the called subscriber 11 removes his receiver and restores the amplitude of the pulses in carrier pulse train from his line terminating unit to the full amplitude. When this happens a pulse from the generator 122 passes through the gate 124 and is fed to the pulse generator 128 which is set thereby to generate a train of carrier pulses in the same phase as that generated by the generator 122. The output pulse train fed to the pulse generator 128 is also applied to an inhibiting terminal on the generator 122 to prevent further transmission of ringing tone signals in this phase. The output pulse train from the generator 128 is fed to the modulator 129 where it is modulated by a 4 kc./s. oscillation applied to the terminal T(4 kc./s.). The generator 128 is cut out after 105.6 milliseconds by the next pulse in the pulse train $P_xQ_y$ applied to the inhibiting terminal thereon from the gate 131. The pulse train thus modulated with the burst of 4 kc./s. oscillations is fed to the one-gate 115 and in the same manner as previously described in connection with the transmission of N.U. tone signals is transmitted to the calling subscriber's line terminating unit 12.

At the calling subscriber's line terminating unit the carrier pulse train is demodulated by the demodulator 31 and the burst of 4 kc./s. oscillation is fed to a band pass filter 132 through which it passes to strike a cold cathode tube 133. The output voltage of this tube 133 is applied to operate a meter 134 recording the call for charging purposes.

When the called subscriber 11 lifts his receiver from its rest the hybrid unit 29 delivers an output voltage in the lead 33, and this voltage is fed to the inhibiting terminal on the cold cathode tube 93. The voltage applied to the inhibiting terminal causes the tube 93 to become extinguished thereby cutting off the supply of ringing current to the called subscriber's line.

Communication has now been established between the calling subscriber 10 and the called subscriber 11. Speech signals from the calling subscriber's line are applied to the modulator 30 in his line terminating unit 12 to modulate the carrier pulse train generated therein and are transmitted over the "Go" section of the link as amplitude modulations of the carrier pulse train. The modulated carrier pulse train is demodulated by the demodulator 83 in the trunk terminating unit 18 and the speech signals are carried by the trunk wire 20 to the modulator 82 of the trunk terminating unit 19, where they are caused to modulate the carrier pulse train generated in this unit. The pulse train generated in this unit, it will be remembered, is in a different phase from that of the carrier pulse train allotted to the calling subscriber 10. The speech signals are transmitted over the "Return" section of the link 16 as modulations of this further carrier pulse train which is demodulated by the demodulator 31 in the called subscriber's line terminating unit 12. The speech signals are received on the called subscriber's line. Speech signals from the called subscriber are transmitted to the calling subscriber in like manner.

Once communication has been established between a calling subscriber and a called subscriber there is no evidence present in the system to distinguish between the called and the calling subscriber. In the system hereinbefore described the first subscriber to replace his receiver causes the release of the used pair of trunk terminating units and his own line terminating unit but not the other subscriber's line terminating unit. The channel engaged in establishing communication between the line terminating unit of the subscriber terminating the call and the associated trunk terminating unit is cleared from the "Go" and "Return" sections of the link 16, but the channel engaged in establishing communication between the other subscriber's line terminating unit and its associated trunk terminating unit is cleared from only the "Return" section and is not cleared from the "Go" section until the other subscriber replaces his receiver.

The apparatus for clearing a call will now be described, and the description is followed by an explanation of its operation when the subscriber 11 is first to replace his receiver.

The output of the slicer 127 is connected to the input of a two-gate 135, to the other input of which is connected the output of the clipper 73. The output of the gate 135 is connected to an inhibiting terminal in a one-gate 136 which has two inputs connected to the outputs respectively of a two-gate 137 and a one-gate 138. The output of the gate 136 is connected to the input of a 100 $\mu$-sec. delay line 139 and to one of the inputs of a three-gate 140. The output of the delay line is connected to another of the inputs of the three-gate 140 and to the input of the gate 138. The output of the slicer 127 is connected to an inhibiting terminal on the two-gate 137 one input of which is connected to the output of a further two-gate 141 fed with pulses from terminals $TP_x$ and $TP_y$. The output of the gate 141 is connected to an inhibiting terminal on the gate 138 and to the remaining input of the gate 140. The output of the gate 140 is connected to a 100 $\mu$-sec. delay line 142 and the output of this delay line is connected by a lead 143 and branch lead 143' to an inhibiting terminal on each of the channel pulse generators such as 60 in the five register terminating units. The output of the delay line 142 is connected by branch lead 143'' to inhibiting terminals on gates in a channel pulse store 144 associated with the channel pulse repeaters and hereinafter to be described, to inhibiting terminals in the channel pulse generators 113, 120 and 122 in the tone unit 28 and to inhibiting terminals in the channel pulse generators 108 and 102 in the tone unit 27.

In operation, while the call between the subscribers 10 and 11 is in progress their line terminating units 12 and 13 are transmitting carrier pulse trains of full amplitude to the "Go" section 50 of the link 16. These pulse trains together with any other pairs of carrier pulse trains being employed for other calls are detected by the slicer 127 and appear in its output circuit from which they are fed to the input of the gate 135 and the inhibiting terminal in the gate 137. While the call is in progress the two pulse trains appear on the "Return" section 65 of the link 16 and are passed by the clipper 73. The two pulse trains are fed from the clipper 73 by lead 74 and branch lead 74''' to the other input of the two-gate 135 and hence the two carrier pulse trains pass through this gate and are applied to the inhibiting terminal on the two-gate 136. The carrier pulse trains on the "Go" section 50 are passed by the clipper 52 and hence the two pulse trains employed for the call which is in progress appear on the lead 53 and are fed along the branch lead 53''' to one of the inputs of the gate 137. To the other input of the gate 137 is applied the pulse train $P_xQ_y$ from the combining gate 141 which is fed with pulse trains $P_x$ and $P_y$ hereinbefore referred to. While the call is in progress the two carrier pulse trains being employed appear at the inhibiting terminal of the gate 137 and prevent pulses in corresponding phases which appear on the lead 53''' from passing through the gate 137 even during the application of a pulse in the train $P_xQ_y$.

When the subscriber 11 replaces his receiver the amplitude of carrier pulse trains transmitted to the "Go" section of the link 16 from his line terminating unit 13 is reduced and consequently this pulse train disappears from the output of the slicer 127. The same pulse train is nevertheless passed by the clipper 52 and is fed to the input of the gate 137 and since the transmission of this pulse is no longer inhibited the next ½ $\mu$-sec. pulse in the train to coincide with a 100 $\mu$-sec. pulse in the train $P_xQ_y$ passes through the gate 137 and is fed to the gate 136. Transmission of this pulse through the gate 136 is not inhibited since the pulse train in the phase of this pulse no longer appears at the input to the gate 135 from the slicer 127 and hence no longer appears at the inhibiting terminal on the gate 136. The ½ $\mu$-sec. pulse therefore passes through the gate 136 and is fed to the input of the three-gate 140 and to the 100 μ-sec. delay line 139. The ½ μ-sec. pulse delayed by 100 μ-secs. in the delay line 139 is fed to another input of the gate 140 and to the gate 138. The ½ μ-sec. pulse passes through the gate 138 and through the gate 136 and is fed back into the delay line 139, and is recirculated in this manner until the next pulse in the pulse train $P_xQ_y$, which it will be remembered has a pulse repetition period of 105.6 milliseconds, is applied to the inhibiting terminal on the gate 138. Each ½ μ-sec. pulse fed to the gate 140 from the gate 136 coincides with the next preceding (delayed) pulse from the gate 136 fed to the gate 140 from the output of the delay line 139. The coincident ½ μ-sec. pulses applied to the gate 140 are blocked thereby until the next 100 μ-sec. pulse in the train $P_xQ_y$ appears at the other input to the gate 140. The gate 140 then passes a ½ μ-sec. pulse and this pulse is fed to the delay line 142 where it is delayed by 100 μ-secs. The ½ μ-sec. pulse thus delayed is fed by the lead 143 and branch lead 143″ to the inhibiting terminals on the gates in the channel pulse store 144, which in a manner to be described later causes the channel pulse repeater 39 in the line terminating unit 13 of the subscriber 11 and the channel pulse repeater 81 in the trunk terminating unit 19 to stop generation of the carrier pulse trains in these units.

As shown in Fig. 1 the channel pulse repeaters 81 in the pair of trunk terminating units 18 and 19 are interconnected by the leads 84. As soon as the repeater 81 in the unit 19 is stopped the output signal in the lead 84 disappears. It is arranged that the absence of this signal in the lead 84 causes the repeater 81 in the unit 18 also to stop.

Thus, when the subscriber 11 replaces his receiver the carrier pulse train employed in the transmission of speech between the subscriber 11 and the trunk terminating unit 19 disappears from the "Go" and "Return" sections of the link 16, but the carrier pulse train employed in transmitting speech between the subscriber 10 and the trunk terminating unit 18 disappears from only the "Return" section of the link.

Until the subscriber 10 replaces his receiver, the carrier pulse train generated in his terminating unit 12 appears at the output of the slicer 127 and prevents the pulse train in the same phase from passing through the gate 137 from the lead 53‴ which it will be remembered carries the pulse trains passed by the clipper 52 and fed from the "Go" section 50. The carrier pulse train has disappeared from the "Return" section of the link 16 and does therefore not appear on the lead 74‴ and hence no pulse in this phase is passed by the gate 135.

When the subscriber 10 replaces his receiver the amplitude of the carrier pulse train generated in his line terminating unit 12 and fed to the "Go" section of the link becomes reduced and the pulse train in this phase disappears from the output of the slicer 127. The carrier pulse train is nevertheless, passed by the clipper 52 and is fed to the gate 137 which now passes the pulse which coincides with the next 100 μ-sec. pulse in the train $P_xQ_y$ applied to the gate 137 from the gate 141. As previously described, there is now no pulse train appearing at the inhibiting terminal on the gate 136 which corresponds in phase to that of the ½ μ-sec. pulse passed by the gate 137 and the ½ μ-sec. pulse is therefore passed through the gate 136. The progress of the pulse appearing at the output of the gate 136 is the same as that of the ½ μ-sec. pulse appearing at this output when the subscriber 11 replaced his receiver. The ½ μ-sec. pulse now referred to finally appears at the output of the delay line 142 and is fed along the leads 143 and 143″ to inhibiting terminals on the gates in the channel pulse store and in manner to be described later causes the channel pulse repeater 39 in the line terminating unit 12 of the subscriber 10 to stop generating the carrier pulse train. The call is thus finally cleared.

The operation of the system in setting up a speech path between a calling subscriber served by one multiplex unit and a called subscriber served by another multiplex unit will now be described. It will be assumed that the calling subscriber is the subscriber 10 in the first multiplex unit as shown in Fig. 1 and the called subscriber is one such as the subscriber 11 in the second multiplex unit (not shown), the called subscriber having a number in the range 0500 to 0999.

The setting up of the call between the subscriber 10 in the multiplex unit shown in Fig. 1 and the subscriber 11 in the second multiplex unit (not shown) proceeds in the same manner as that between subscribers in the same multiplex unit as hereinbefore described up to the time when the calling signals are received by the register store 70. The register store 70 passes the stored signals to the translator 75 which in response thereto delivers to the output lead $O_2$ of the translator a 100 μ-sec. pulse which identifies the called subscriber 11 in the second multiplex. For convenience, it is assumed that the subscriber 11 in the second multiplex unit is identified by the same 100 μ-sec. pulse as that which identified the subscriber 11 in the first multiplex unit. Thus, the 100 μ-sec. pulse appearing at the output lead $O_2$ of the translator 75 is that previously referred to as pulse $[P_7Q_{20}]$.

The pulse $[P_7Q_{20}]$ is fed to a gate 145 identical with the gate 76 associated with the output $O_1$ of the translator 75. In like manner to that previously described, a ½ μ-sec. pulse from the generator 60 of the register terminating unit 25 is passed through the gate 145 and through the one-gate 146 to the input of the gate 80 in a free one of the ten trunk terminating units in the third group of trunk terminating units associated with the multiplex unit shown. It will be remembered that the third group of ten trunk terminating units in the first multiplex unit are connected to the third group of ten trunk terminating units respectively in the second multiplex unit and hence the selected free trunk terminating unit which for the present description will be that shown in Fig. 1 at 147, is paired with a corresponding one in the ten trunk terminating units associated with the second multiplex unit. The trunk terminating unit 147 is identical with the unit 18 except that it is fed with a pulse from the gate 146 instead of from the gate 78. The channel pulse repeater 81 is set by the pulse from the gate 146 to generate a carrier pulse train in the same phase as that generated in the calling subscriber's line terminating unit 12.

The pulse $(P_7Q_{20})$ from the output $O_2$ of the translator 75 is also fed to a one-gate 148 and from there is fed by a lead $D_2$ to one of the inputs of a one-gate such as 91 in the distribution unit not shown, of the second multiplex unit. For the present description it is now assumed that the distribution unit 26 shown in Fig. 1 is the distribution unit in the second multiplex unit. The pulse $(P_7Q_{20})$ then appears on a lead such as $D'_2$ and is fed to the one-gate 91 and in the manner hereinbefore described is fed to each subscriber's line terminating unit and to the tone unit 28. The pulse $(P_7Q_{20})$ in the lead $D'_2$ is also fed to one of the inputs of a two-gate 149 which is fed with ½ μ-sec. free channel pulses in lead 49″. The free channel pulse appearing at the input of the gate 149 during the application of the pulse $[P_7Q_{20}]$ passes through the gate 149 and is fed to the one-gate 146. It will be remembered that the multiplex unit shown is now for the purpose of description assumed to be the second multiplex unit and the ½ μ-sec. pulses appearing at the output of the gate 146 are fed to the group of trunk terminating units paired with the third group in the first multiplex unit. The unit paired with that selected in the first multiplex unit is now assumed to be the unit 147 and as shown the ½ μ-sec. pulse is fed to the gate 80 and through the gate 80 to set the channel pulse repeater 81 to generate a carrier pulse train in the same phase as the carrier pulse train allotted to the called subscriber 11. The other operations for setting up and clearing the call are identical to those hereinbefore described for a call between subscribers served by the same multiplex unit.

The channel pulse repeaters used in the line and trunk terminating units and the way in which they are connected to the delay lines in the channel pulse store 144 will now be described with reference to Fig. 3. Fig. 3 shows the first two and the last one of the 500 repeaters 39 associated with the subscribers' line terminating units in the multiplex unit and the first two and the last one of the 204 repeaters 81 associated with the trunk terminating units in the multiplex unit. The repeaters 39 and 81 are identical with one another and each one comprises a three-gate 151 with inputs $i_1$, $i_2$ and $i_3$ and a distributing gate 152 with three outputs $o_1$, $o_2$ and $o_3$. The output of the gate 151 is connected to the input of the gate 152. The gate 152 is provided with an auxiliary input and an auxiliary output connected to input and output terminals 153 and 154 respectively.

The channel pulse store 144 comprises twenty-eight 100 $\mu$-sec. delay lines, sixteen of which are associated with the repeaters 39 and are referred to as the delay lines $L_1$ to $L_{16}$, and twelve of which are associated with the repeaters 81 and are hereinafter referred to as the delay lines $T_1$ to $T_{12}$. The first three and the last two of the delay lines $L_1$ to $L_{16}$ are shown to the left in the channel pulse store 144 in Fig. 3 and the first three and the last two of the delay lines $T_1$ to $T_{12}$ are shown to the right in Fig. 3.

The inputs of the delay lines $L_1$ to $L_{16}$ are connected to leads $k_1$ to $k_{16}$ respectively. The outputs of the delay lines $L_1$ to $L_{16}$ are connected to the inputs respectively of one-gates $g_1$ to $g_{16}$ and the outputs of these gates are connected to leads $k_1'$ to $k_{16}'$ respectively. The gates $g_1$ to $g_{16}$ each have an inhibiting terminal connected to the common lead 143'' which also appears in Fig. 1.

The inputs $i_1$, $i_2$ and $i_3$ of the gate 151 in the first repeater 39 are connected to the leads $k_1'$, $k_2'$ and $k_3'$ respectively, and the outputs $o_1$, $o_2$, $o_3$ of the gate 152 in this repeater are connected to the leads $k_1$, $k_2$ and $k_3$ respectively. The inputs $i_1$, $i_2$ and $i_3$ of the gate 151 in the second repeater 39 are connected to the leads $k_1'$, $k_2'$ and $k_{16}'$ respectively and the outputs $o_1$, $o_2$ and $o_3$ of the gate 152 in this repeater are connected to the leads $k_1$, $k_2$ and $k_{16}$ respectively. The inputs $i_1$, $i_2$ and $i_3$ and the outputs $o_1$, $o_2$ and $o_3$ of each of the repeaters (not shown) are connected in the same manner to other combinations of the leads $k$. Finally, the inputs $i_1$, $i_2$ and $i_3$ and the outputs $o_1$, $o_2$ and $o_3$ in the last repeater 39 are connected to the leads $k_{14}'$, $k_{15}'$, $k_{16}'$ and $k_{14}$, $k_{15}$ and $k_{16}$ respectively. It is seen that no two repeaters 39 are connected to the same combination of three delay lines.

Each repeater 39 may be set in operation by a pulse applied to the terminal 153. As previously described with reference to Fig. 1 a ½ $\mu$-sec. free channel pulse is fed to the repeater 39 in the subscriber's line terminating unit 12 for example when the subscriber 10 lifts his receiver to make a call. For the present description it will be assumed that the first repeater 39 in Fig. 3 is that in the subscriber's line terminating unit 12 and that the pulse applied to the terminal 153 is the free channel pulse from the gate 35 in line terminating unit 12. The pulse appearing at the terminal 153 is fed to the gate 152 and appears at the outputs $o_1$, $o_2$ and $o_3$ and at the output terminal 154. The ½ $\mu$-sec. pulses appearing simultaneously at the outputs $o_1$, $o_2$ and $o_3$ are fed by leads $k_1$, $k_2$ and $k_3$ respectively to the delay lines $L_1$ $L_2$ and $L_3$. The pulses are delayed by 100 $\mu$-secs. in the delay lines $L_1$, $L_2$ and $L_3$, pass through the gates $g_1$, $g_2$ and $g_3$ and appear on the leads $k_1'$, $k_2'$, and $k_3'$. Since the gate 151 in the first repeater is the only gate connected to the combination of leads $k_1'$, $k_2'$ and $k_3'$ it is the only gate which receives these three pulses. Since the pulses are delayed by the same period (100 $\mu$-sec.) they appear simultaneously at the inputs $i_1$, $i_2$ and $i_3$ and operate the gate 151 allowing a ½ $\mu$-sec. pulse to pass through the gate to the input of the gate 152. The pulse fed back to the gate 152 appears at the outputs $o_1$, $o_2$ and $o_3$ and at the output terminal 154. The pulses appearing at the outputs $o_1$, $o_2$ and $o_3$ are recirculated to the delay lines $L_1$, $L_2$ and $L_3$ and the operation of the repeater 39 is repeated continuously and a continuous train of ½ $\mu$-sec. pulses of 100 $\mu$-sec. repetition period is generated at the output terminal 154 and as shown in Fig. 1 is fed by lead 40 to the modulator 30 and the demodulator 31 in line terminating unit 12 of which it is assumed this repeater forms part.

It is to be noted that in the system described with reference to Fig. 1 once a repeater 39 has been set to generate a pulse train in one phase, the pulse in this phase is prevented from being applied to the other repeaters 39 as previously described and thus no two repeaters 39 generate pulse trains in the same phase.

When a ½ $\mu$-sec. pulse in a different phase from that of the pulse applied to the first repeater is applied to the terminal 153 in the second repeater 39 in the second line terminating unit, ½ $\mu$-sec. pulses in the phase of the applied pulse are circulated repeatedly through the second repeater and the delay lines $L_1$, $L_2$ and $L_{16}$ associated therewith. A continuous train of ½ $\mu$-sec. pulses of 100 $\mu$-sec. repetition period in another phase is thus generated at the terminal 154 in the second repeater. It is to be noted that the delay lines $L_1$ and $L_2$ are delaying two ½ $\mu$-sec. pulses in different phases.

It will readily be appreciated that the sixteen delay lines $L_1$ to $L_{16}$ are sufficient to serve more than 500 repeaters by combining them in this manner.

When it is required to stop the circulation of a pulse in a repeater, say the first repeater, a pulse in corresponding phase is applied to the lead 143''. The pulse so applied prevents all the gates $g_1$ to $g_{16}$ from passing pulses in this phase and in particular blocks the gates $g_1$, $g_2$ and $g_3$ which would normally pass the three coincident pulses circulating in the delay line $L_1$, $L_2$ and $L_3$ and through the first repeater 39.

The connections between the delay lines $T_1$ to $T_{12}$ and the repeaters 81 are similar to those between the delay lines $L_1$ to $L_{16}$ and repeaters 39 and will not be described. It is to be noted that a pulse applied to the lead 143'' serves to stop circulation of pulses in a corresponding phase in a repeater 81 as well as in a repeater 39.

Reference will now be made to the construction of the various parts of the system shown in block form in Fig. 1.

The signal transmission link 16 may be as described in copending patent application Serial No. 395,391, with reference to Fig. 6 of the drawings accompanying that application.

The register store 70 and the translator 75 shown in Fig. 1 may be as described in copending patent application Serial No. 395,391, with reference to Fig. 8 of the drawings accompanying that application.

The register release control circuits 71 may comprise an electromechanical timing device or a transitron Miller circuit operating as the forced release timing circuit hereinbefore referred to in the description of the operation of the circuits 71. It will be remembered that the first positive going signal to appear in the lead 69 sets the forced release timing circuit into operation. The circuits 71 may further comprise a cold cathode tube bistable multivibrator to provide an output signal on the lead 69' to cut off dialling tone signals in response to the application of the first negative-going dialling signal received on the lead 69. The pulse applied to the circuits 71 on the lead 94 may be fed to a mono-stable multivibrator which in response thereto will deliver an output pulse delayed by 100 $\mu$-secs. to the lead 98 and at the same time switch back the bistable multivibrator. The forced release timing circuit is arranged to operate the monostable multivibrator at the end of the release timing period if no pulse has appeared on the lead 94 and hence causes a pulse to appear in the lead 98 and at the same time to produce a pulse on the output lead 99 and switch back the bistable multivibrator to remove the signal on the lead 69'.

The construction of the various gate circuits shown in Figure 1 will be readily understood by those skilled in the art. Reference may however be made to sections 4–3–3 and 4–3–4 of "High Speed Computing Devices" by the Staff of Engineering Research Associates Inc., published by McGraw-Hill Book Company in 1950. The circuits shown in Figures 4–1*a*, 1*b*, and 1*c* of this reference may be employed as the two-gates hereinbefore referred to. Figure 4–2*b* shows a circuit suitable for use as a two-gate and which may readily be modified, as indicated in the reference, to serve as an *n*-gate, where *n* is 2, 3, 4, 5 or 6.

Reference may also be made to volume 19 (Waveforms), of the Massachusetts Institute of Technology Radiation Laboratories Series, sections and 10–3, 10–4, also published by McGraw-Hill Book Company. The circuit shown in Fig. 10.6 of this reference may serve as a two-gate, and the circuits shown in Figs. 10.18 and 10.19 may be employed as three- and four-gates respectively.

Reference may also be made to a paper by E. A. R. Peddle in October and November 1952 issues of Wireless World, published by Iliffe & Sons Ltd., the article being entitled Electronic Switching, parts I and II. The gate circuit shown in Fig. 7*a* of this paper and referred to therein as a coincidence gate may serve as a two-gate.

The delay lines shown in Figs. 1 and 3 are all 100 μ-secs. delay lines, with one exception (116) which has a delay of 200 μ-secs. but which for uniformity may be formed of two 100 μ-sec. delay units connected in series with one another. All the delay lines are preferably magnetostrictive delay lines and a reference to delay lines of this kind may be found in a paper entitled "Magnetostrictive Delay Line," by E. M. Bradburd in March 1951 (issue) of Electrical Communication published by International Telephone & Telegraph Corporation. The delay lines shown in the drawing include a blocking oscillator or cathode follower as an input stage and a single amplifier output stage. The output pulses from the delay lines may be re-shaped by clock pulses applied to a shaping gate of known kind connected in the output circuit of the delay line.

The channel pulse generator shown in Figure 1 may be of the kind shown in Figure 4. The generator shown in Figure 4 comprises a one-gate 155 provided with input and output terminals 156 and 157, a 100 μ-sec. delay line 158 connected at its input end to the output of the gate 155, and a further one-gate 159 provided with an inhibiting terminal and having its input connected to the output end of the delay line 158 and its output connected to the input of the gate 155. The generator is set in operation by a pulse of ½ μ-sec. duration applied to the input terminal 156. The pulse passes through the gate 155 to the input of the delay line 158, where it is delayed by 100 μ-secs., and to the output terminal 157. The delayed pulse passes through the gate 159 in the absence of a pulse at the inhibiting terminal thereof and is fed back to the input of gate 155. The delayed pulse passes through the gate 155 and appears at the output terminal 157. The delayed pulse is applied to the delay line 158 and is recirculated in the loop comprising the delay line 158 and the gates 159 and 157. A continuous train of ½ μ-sec. pulses of 100 μ-sec. repetition period appears therefore at the output terminal 157. It will be appreciated that trains of ½ μ-sec. pulses of 100 μ-sec. repetition period may be generated in other phases at the same time, the pulses circulating in the loop being time-interlaced with one another. All the generators shown in Fig. 1 except those such as 60 in the register terminating unit 25 must be of this kind which is capable of generating more than one pulse train, since at any time the control unit 23 and tone units 27 and 28 may be required to deal with a plurality of simultaneous calls.

The modulators shown in Figure 1 may be of the kind described by T. H. Flowers in a paper entitled "Electronic Telephone Exchanges," in the I.E.E. Radio Section, paper No. R1266 of the Proceedings of the I.E.E., vol. 99, part 1, No. 119, September 1952. All modulators except those for applying tone modulations are provided with a limiting diode to prevent the amplitude of the output current pulse train from being reduced to less than 10% of its mean amplitude. The amplitude of carrier pulse trains from the modulator 129 supplying tone for metering purposes in tone unit 28 is to be greater than that from the other modulators.

The demodulators are substantially as described in the article by T. H. Flowers above referred to, and each includes an amplifying and impedance matching valve and a low pass filter.

The band-pass filters 132 in each subscriber's line terminating unit are arranged to select the 4 kc./s. burst of oscillation from the demodulator 31. Although shown separately in the drawing each band-pass filter may form part of a filter circuit including the low-pass filter in the demodulator. This filter circuit in addition suppresses the 4 kc./s. oscillation from the subscriber's line. The pass-bands of the low-pass filters of the demodulators in the trunk terminating units include the 4 kc./s. frequency of the metering tone signals.

The hybrid units 29 shown in Figure 1 incorporate the transformers of the modulators and demodulators shown in Figure 6 of the paper by T. H. Flowers above referred to. If sufficient power is available, pads may be included to reduce effects of variations in line impedances. Each hybrid unit has means by which ringing current may be passed to the subscriber's line and means differentiating between open and closed circuit line conditions. The signal representing line conditions may be obtained from the transmission bridge.

The cold cathode tubes (CCT) in the subscriber's line terminating units operate in the same manner as those shown in Figure 7 of the paper by T. H. Flowers hereinbefore referred to. The circuit arrangement shown in Figure 1 by which the ringing current is applied to the subscriber's line may give rise to ringing current being applied to a subscriber's line during a period of a fraction of a second after he has replaced his receiver at the end of a call. This difficulty may however be overcome by arranging that the cold cathode tube 93 be extinguished by interruption of the anode supply potential, the signal on the lead from the repeater 39 supplying the condition necessary for triggering, and to delay by about ¼ second the removal of the signal which prevents the operation of the cold cathode tube when the subscriber's line circuit is closed. Alternatively the method of applying ringing current to a subscriber's line as described with reference to Figure 7 in the paper by T. H. Flowers may be used.

The clippers in the control unit 23 in Figure 1 are saturable valve amplifiers which give an output pulse when a pulse irrespective of its magnitude appears on the highway to which their inputs are connected.

The slicers shown in Figure 1 may comprise an amplifier similar to that employed for a clipper, but so biased that no output pulse appears unless the amplitude of the input pulse exceeds approximately 15% of the nominal mean amplitude of the pulses applied thereto.

An alternative arrangement for subscriber identification will now be described with reference to Figures 5 and 6.

In this alternative arrangement the subscriber identifying pulse trains are derived from the coincidence of pulses in a combination of three pulse trains of 1, 1.1 and 1.3 millisecond repetition periods respectively instead of from the coincidence of pulses in a combination of two trains P and Q hereinbefore referred to.

Three series of time-interlaced pulse trains of a common pulse duration of 100 $\mu$-sec. are generated in place of the two series of pulse trains P and Q. In Figure 5 the first of the three series comprises six time-interlaced trains $C_0$ to $C_5$ having a common pulse repetition period of 1 millisecond. The second series comprises ten time-interlaced pulse trains $D_0$ to $D_9$ having a common pulse repetition period of 1.1 milliseconds and the third series comprises a further ten time-interlaced pulse trains $U_0$ to $U_9$ of a pulse repetition period of 1.3 milliseconds. The pulse trains $C_0$ to $C_5$ are shown diagrammatically in Figure 5 at (*a*), pulse trains $D_0$ and $D_1$ at (*b*) and pulse trains $U_0$ and $U_1$ at (*c*). Only the first five trains $C_0$ to $C_4$ of the pulse trains C are employed for combining with the pulse trains D and U for deriving the subscriber identifying pulse trains. Five hundred identifying pulse trains can be derived from the three series of pulse trains C, D, and U. The interlacing of the six pulse trains $C_0$ to $C_5$ is such that the pulses in the trains $C_1$ to $C_5$ follow a pulse in the train $C_0$ after intervals of 200, 400, 600, 800 and 900 $\mu$-secs. respectively. The interlacing of the pulse trains in each of the other two series D and U is such that no pulse in a series overlap.

A register store for storing dialling signals and a translator for deriving subscriber identifying pulse trains of the type above referred to will now be described with reference to Figure 6. An input terminal 160 to which dialling signals from the demodulator 63 of the register terminating unit 25 are applied is connected to the inputs of four two-gates 161, 162, 163 and 164 which are normally closed. The input terminal 160 is also connected to the input of a slow-to-release device 165, hereinafter to be described with reference to Figure 19. For the present it will be sufficient to say that the device 165 is adapted to become operated by a pulse applied thereto and to return to its unoperated condition 250 milliseconds after the removal of the pulse. The output of the device 165 is connected in the input circuit of a digital chain counter device 166 and the circuit arrangement is such that the counter device 166 is operated by a pulse produced in its input circuit when the device 165 returns to its unoperated condition. The device 166 comprises five units M, C, D, U and Z, each comprising a cold cathode gas discharge tube. The cold cathode tube in the unit M is initially in a switched-one condition and the cold cathode tubes in the units C, D, U and Z are switched off. The connections between the tubes are such that in response to an operating pulse applied to the input of the device 166, the tube in the unit M is switched off and the tube in the unit C switched on. A further pulse applied to the input of the device 166 switches off the tube in the unit C and switches on the tube in the unit D and similarly for further applied pulses. The units M, C, D, U and Z are each provided with an output, the outputs of the units M to D being connected to the inputs of the gates 161 to 164 respectively. The units M, C, D, U and Z are such as to deliver an output voltage when the tube in the unit is switched on.

The outputs of the gates 161 to 164 are connected to the inputs respectively of bi-quinary ring counters 167, 168, 169 and 170. Each ring counter has seven stages, the first five being represented by the numerals 0, 1, 2, 3 and 4 respectively and the last two by numerals 0 and 1. The seven stages in each bi-quinary counter may be of a well known kind, each comprising a cold cathode tube, the first five tubes being connected in known manner as a five stage ring counter and the last two being connected as a two stage ring counter fed with pulses from the last stage in the five stage ring counter. The mode of operation of such counters is generally known in the art and will not be described further. The outputs of the five stages in the counter 170 are connected to the inputs of five two-gates $g_0$, $g_1$ . . . $g_4$ to the other inputs of which are connected terminals $TU_{0,5}$, $TU_{1,6}$, $TU_{2,7}$, $TU_{3,8}$, $TU_{4,9}$. The outputs of the last two stages of the counter 170 are connected to the inputs of two further two-gates $g_0'$, $g_1'$, to the other inputs of which are connected terminals $TU_{0\text{-}4}$ and $TU_{5\text{-}9}$. The outputs of the gates $g_0$ to $g_4$ are connected to the inputs of a one-gate 171 and the outputs of the gates $g_0'$, $g_1'$ are connected to the input of a one-gate 172. The outputs of the gates 171 and 172 are connected to two inputs respectively of a six-gate 173. The outputs of the first five stages in the counter 169 are similarly connected to inputs respectively of further gates $d_0$ to $d_4$ which have their other inputs connected to terminals $TD_{0,5}$, $TD_{1,6}$, $TD_{2,7}$, $TD_{3,8}$ and $TD_{4,9}$. The outputs of the last two stages in the counter 169 are connected to gates $d_0'$ and $d_1'$, the other inputs of these gates being connected to terminal $TD_{0\text{-}4}$ and $TD_{5\text{-}9}$. The outputs of the gates $d_0$ to $d_4$ are connected to the input of a one-gate 174, the output of which is connected to an input of the six-gate 173, and the outputs of the gates $d_0'$ and $d_1'$ are connected to a combining gate 175 whose output is connected to another of the inputs of the gate 173. The outputs of the first five stages of the counter 168 are similarly connected to gates $c_0$ to $c_4$ to which terminals $TC_0$, $TC_1$, $TC_2$, $TC_3$ and $TC_4$ are connected and the outputs of the gates $c_0$ to $c_4$ are connected to the inputs of a combining gate 176. The output of the combining gate 176 is connected to another input of the six-gate 173. The output of the sixth stage in the counter 168 is connected to inputs of three-gates 177 and 178 and the output of the last stage in the counter 168 is connected to inputs of three-gates 179 and 180. The output of the six-gate 173 is connected to an input of each of the gates 177 to 180. The output of the sixth stage in the counter 167 is connected to the remaining input of each of the gates 177 and 179 and the last stage in this counter 167 is connected to the remaining input of each of the gates 178 and 180.

The output of the first stage in the counter 167 is connected to the inputs of the pairs of two-gates $gO_1$, $gO_2$ and $gO_{11}$, $gO_{12}$, the output of the second stage is connected to the inputs of the pairs of two-gates $gO_3$, $gO_4$ and $gO_{13}$, $gO_{14}$, the output of the third stage is connected to the inputs of the pairs of two-gates $gO_5$, $gO_6$ and $gO_{15}$, $gO_{16}$, the output of the fourth stage is connected to inputs of the pairs of gates $gO_7$, $gO_8$ and $gO_{17}$, $gO_{18}$ and finally the output of the fifth stage in the counter 167 is connected to inputs of the pairs of two-gates $gO_9$, $gO_{10}$ and $gO_{19}$, $gO_{20}$. The output of the three-gate 177 is connected to the other inputs of two-gates $gO_1$, $gO_3$, $gO_5$, $gO_7$ and $gO_9$ and the output of the three-gate 179 is connected to the other inputs of gates $gO_2$, $gO_4$, $gO_6$, $gO_8$ and $gO_{10}$ and similarly for the three-gates 178 and 180, the outputs of these gates being connected to the inputs of the two groups respectively of gates $gO_{11}$, $gO_{13}$ . . . $gO_{19}$ and $gO_{12}$, $gO_{14}$ . . . $gO_{20}$. The outputs of the gates $gO_1$ to $gO_{20}$ are connected to output terminals $O_1$, $O_2$ . . . $O_{20}$ respectively, these outputs corresponding to those bearing like reference numerals in Figure 1.

The output of the six-gate 173 is connected to the input of a two-gate 181. The other input of the gate 181 is connected to the output of a slow-to-operate device 182 hereinafter to be described with reference to Figure 20. For the present description it will be sufficient to say that the device 182 in response to the application of an input voltage produces an output voltage which commences at least 100 $\mu$-secs. after the application of the input voltage and terminates when the input voltage is removed. The output of the gate 181 is connected to the input of a trailing-edge pulse former 183 hereinafter to be described with reference to Figure 21. For the present description, however, it will be sufficient to say that the pulse-former 183 in response to an input pulse applied thereto produces an output pulse which commences at the trailing edge of the input pulse and is of a duration of at least 100 $\mu$-secs. The output of the device 183 is connected to a 'reset' terminal on the counter device 166 and to reset terminals on the counters 167, 168, 169 and 170. A register release terminal 184 to which a register release control voltage is applied is connected to the inputs of the stages 0 in each of the counters and to the unit M.

The operation of the register store and translator shown in Figure 6 will now be described and for the purpose of the description it will be assumed that dialling signals representing the number 0123 are received at the terminal 160. It will be recalled that the cold cathode tube in the unit M is in a "switched-on" condition and that in this condition it produces an output voltage which appears at the input of the gate 161. The first dialling pulses to be received at the terminal 160 are a group of 10 successive pulses representing the number 0. These ten pulses pass through the gate 161 to the input of the counter device 167. The first of these pulses switches off the tube in the first stage 0 and switches on the tube in the second stage. The second pulse switches off the tube in the second stage and switches on the tube in the third stage, and so on, the fifth pulse switching off the tube in the fifth stage and switching on the tube in the first stage. The output voltage from the tube in the fifth stage when this tube is switched off by the fifth pulse, switches off the tube in the sixth stage and switches on the tube in the seventh stage. The sixth to ninth pulses operate the first five stages in the same manner as the first to the fourth pulses, and the tenth pulse switches off the tubes in the fifth and seventh stages and switches on the tubes in the first and sixth stages. Thus the application of the ten pulses causes the counter 167 to complete one cycle of operation and return to its initial condition. A D.C. output voltage thus appears at the output of the first and sixth stages of the counter. The voltage from the output of the first stage is applied to the gates $gO_1$, $gO_2$, and $gO_{11}$ and $gO_{12}$. The D.C. voltage from the sixth stage is applied to the gates 177 and 179. At the same time the ten pulses are applied to the slow-to-release device 165 hereinbefore referred to, which is operated by the first pulse and holds throughout the succeeding nine pulses. 250 milliseconds after the end of the last of the ten pulses the device 165 returns to its unoperated condition and delivers an output voltage to the input of the device 166 thereby switching off the cold cathode tube in the unit M and switching on the tube in the unit C. The voltage applied to the input of the gate 161 disappears and an output D.C. voltage from the unit C is applied to the two-gate 162. The second group of dialling pulses received comprises only one pulse representing the number 1 and this pulse passes through the gate 162, switching off the tube in the first stage of the counter 168 and switching on the tube in the second stage. An output voltage from the second stage appears at the input of the gate $c_1$, and an output voltage from the sixth stage remains at the inputs of gates 177 and 178. At the same time the dialling pulse representing the digit 1 operates the device 165 and this device returns to its unoperated condition 250 milliseconds after the pulse is applied. The device 165 produces an output D.C. voltage when it returns to its unoperated condition, which switches off the tube in the unit C and switches on the tube in the unit D. The voltage applied to the gate 162 disappears, and a D.C. voltage from the unit D appears at the input of the gate 163. The third group of two dialling pulses is passed through the gate 163 causing the tube in the first stage to become switched off and the tube in the third stage to become switched on. An output D.C. voltage from the third stage appears at the gate $d_2$. An output voltage from the sixth stage remains applied to the gate $d_0'$. The final group of 3 dialling pulses in like manner causes a D.C. voltage to appear at the input of the gate $g_3$ associated with the counter 170. The return of the device 165 following the final dialling pulses causes the tube in the unit U to switch off and the tube in the unit Z to become switched on.

To the terminals $TU_{0,5}$, $TU_{1,6}$ . . . $TD_{0,5}$, $TD_{1,6}$ . . . $TC_0$, $TC_1$ . . . $TC_4$ are applied pulse trains $U_0$ and $U_5$, $U_1$ and $U_6$ . . . $D_0$ and $D_5$, $D_1$ and $D_6$ . . . $C_0$, $C_1$ . . . $C_4$ respectively. To the terminals $TU_{0-4}$, $TU_{5-9}$, $TD_{0-4}$, $TD_{5-9}$ are applied pulse trains $U_0$ to $U_4$, $U_5$ to $U_9$, $D_0$ to $D_4$ and $D_5$ to $D_9$ respectively. The gates $g_3$, $g'_0$, $d_2$, $d'_0$, and $c_1$ to which D.C. voltages are applied pass the pulse trains which are applied thereto and the pulse trains passed by these gates are fed through gates 171, 172, 174, 175 and 176 to five inputs respectively of the six-gate 173. The sixth input of the gate 173 has a D.C. voltage applied to it from the unit Z. The gates $g_3$ and $g_0'$ pass pulse trains $U_3$ and $U_8$, and $U_0$ to $U_4$, the common pulse train at the two inputs of gate 173 being the pulse train $U_3$. The gates $d_2$ and $d_0'$ pass pulse trains $D_2$, $D_7$ and $D_0$ to $D_4$ and the common pulse train fed to the inputs of gate 173 from these gates is the pulse train $D_2$. The gate $c_1$ passes the pulse train $C_1$ to an input of the gate 173. A pulse appears at the output of the gate 173 when the pulses in the trains $C_1$, $D_2$ and $U_3$ coincide. This output pulse, hereinafter referred to as the pulse $C_1D_2U_3$, is fed to the inputs of the gates 177 to 180 and to the gate 181. The D.C. voltage applied to the slow-to-operate device 182 from the unit Z causes a pulse to appear at the input of the gate 181 and thus the pulse $C_1D_2U_3$ passes through the gate 181 to operate the trailing edge pulse former 183. The output pulse from the pulse former 183 causes the device 166 to revert to its initial condition, that is to say switches off the tube in the unit Z and switches on the tube in the unit M. The D.C. input voltage from the unit Z, necessary for the operation of the gate 173, disappears.

The pulse $C_1D_2U_3$ which appears at the inputs of the gates 177–180 passes through the gate 177 since this gate is the only one which has D.C. voltage applied to both its other inputs. The pulse $C_1D_2U_3$ passed through the gate 177 is fed to the inputs of gates $gO_1$, $gO_3$ . . . $gO_9$. The D.C. voltage appearing at the output of the first stage of the counter 167 indicating that the first digit of the dialled number is zero appears at the inputs of the gates $gO_1$, $gO_2$ and $gO_{11}$ and $gO_{12}$. The pulses $C_1D_2U_3$ therefore passes through the gate $gO_1$ to the output terminal $O_1$ of the translator.

An alternative arrangement for alotting free channels to a called subscriber will now be described with reference to Figs. 7, 8 and 9.

Figure 7 shows the apparatus shown in Figure 1, modified for operation with the alternative arrangement for subscriber identification. Only one of the 500 subscribers' line terminating units is shown, together with the modified tone unit 28'. The lead 33 from the hybrid unit 29 is connected direct to a two-gate 35' which replaces the gates 32 and 35 shown in Figure 1. It will be seen that the lead 92 and the input terminals $P_7Q_{20}$ are not connected to the modified unit 12. In operation, when the calling subscriber 10 lifts his receiver a D.C. voltage is applied to the lead 33 and appears at the input of the gate 35'. The first free channel pulse to appear at the other input of the gate 35' from the lead 38 passes through the gate 35' and sets the channel pulse repeater 39 into operation. When the subscriber 10 is being called a pulse indentifying this subscriber appears at the output $O_1$ of the translator 75 in Figure 1 and is fed in a manner previously described through the gate 91 on to the lead 92. For the present description it will be assumed that the subscriber 10 is identified by pulses in the pulse train ($C_1D_2U_3$) as produced by the translator shown in Figure 6. The pulse ($C_1D_2U_3$) appears on the lead 92 in Figure 7 and is fed to a two-gate 184' to the other input of which are applied free-channel pulses from the lead 38. The lead 92 is not connected to each line terminating unit as in Figure 1. The output of the gate 184' is connected direct to the gate 112 and the delay line 116 in the modified control unit 28'. Since the gate 184' serves the same purpose as the gate 110 in the tone unit 28 in Figure 1, the modified tone unit in Figure 7 operates in precisely the same way as that shown in Figure 1. The only other modifications to the tone unit are that input terminals $TP_x$, $TP_y$, $TP_{x+1}$ and $TP_{y+1}$ are substituted by terminals $TC_4$, $TD_8U_8$, $TC_5$ and $TD_9U_9$ respectively to which pulse-trains $C_4$, $D_8$ and $U_8$ together, $C_5$ and $D_9$ and $U_9$ together are applied.

The pulse $C_1D_2U_3$ is also fed, by lead 185, to the channel pulse store 144' now to be described with reference to Figure 8.

The channel pulse store shown in Figure 8 comprises 25 100 μ-sec. delay lines $Lc_0$–$Lc_4$, $Ld_0$–$Ld_9$, and $Lu_0$–$Lu_9$. These delay lines are associated with the subscribers' line terminating units in a manner hereafter to be described. The outputs of the delay lines are connected to one-gates $gC_0$–$gC_4$, $gD_0$–$gD_9$, and $gU_0$–$gU_9$ respectively. The 100 μ-sec. pulses ($C_1D_2U_3$ for example) from registers via the distribution units are applied to an input of a two-gate 186 and to an inhibiting terminal on a gate 187. To the other input of the two-gate 186 and to the input of the gate 187 are applied free-channel pulses from the control unit (23 in Figure 1). The output of the gate 186 is connected to an input of each of 25 two-gates $gc_0$ to $gc_4$, $gd_0$ to $gd_9$, and $gu_0$ to $gu_9$. The other inputs of these gates are connected to terminals $TC_0$–$TC_4$, $TD_0$–$TD_9$, and $TU_0$ to $TU_9$ respectively to which are applied pulse trains $C_0$ to $C_4$, $D_0$ to $D_9$ and $U_0$ to $U_9$ respectively. The outputs of the gates $gc_0$–$gc_4$, $gd_0$–$gd_9$ and $gu_0$–$gu_9$ are connected to inputs of one-gates $gC_0$–$gC_4$, $gD_0$–$gD_9$, and $gU_0$–$gU_9$ respectively.

In operation, on the assumption that the subscriber being called is identified by the 100 μ-sec. pulse $C_1D_2U_3$, this pulse appears at the input of the two-gate 186 and the free-channel pulse to occur during this period passes through the gate 186 and is fed to the two-gates $gc_0$–$gc_4$, $gd_0$–$gd_9$, and $gu_0$–$gu_9$. At the same time, a 100 μ-sec. pulse appears at the terminals $TC_1$, $TD_2$ and $TU_3$ and hence causes the gates $gc_1$, $gd_2$ and $gu_3$ simultaneously to transmit the free-channel pulse to the combining gates $gC_1$, $gD_2$ and $gU_3$. These three pulses then circulate in a repeater of the called subscriber and in the delay lines $Lc_1$, $Ld_2$ and $Lu_3$ in the store.

A repeater suitable for use in a subscriber's line terminating unit and its association with the delay lines of the channel pulse store shown in Figure 8 will now be described with reference to Figure 9. A repeater of only one of the 500 subscribers is shown at 190 in Figure 9, this repeater being associated with delay lines $Lc_1$, $Ld_2$ and $Lu_3$ and belonging to the line terminating unit of the subscriber whose number is 0123. The repeater 190 comprises a three-gate 191 whose output is connected to the input of a one-gate 192 and whose three inputs are connected to the output of a one-gate 193 and leads $k'd_2$ and $k'u_3$. The two inputs of the combining gate 193 are connected to an input terminal 153 which is also to be seen in the unit 12 in Figure 7 and to lead $k'c_1$. The gate 192 has four outputs, three of which are connected to leads $kc_1$, and $kd_2$ and $kd_3$ respectively and the fourth of which is connected to an output terminal 154 (also shown in Figure 7). The remainder of Figure 9 corresponds to parts of Figure 8 and will not be described again.

As previously described with reference to Figure 8 when the subscriber 0123 is called ½ μ-sec. pulses in the phase of a free channel are simultaneously applied to the combining gates $gC_1$, $gD_2$ and $gU_3$. These ½ μ-sec. pulses appear in the leads $k'c_1$, $k'd_2$ and $k'u_3$. The pulses in leads $k'd_2$ and $k'u_3$ appear at inputs respectively of the gate 191 and the pulse on the lead $k'c_1$ is fed through the combining gate 193 to the other input of the gate 191. A pulse therefore appears at the output of the gate 191, is fed to the gate 192 from which it is fed to leads $kc_1$, $kd_2$ and $ku_3$ and to the output terminal 154.

The ½ μ-sec. pulses appearing on the leads $kc_1$, $kd_2$ and $ku_3$ pass through the delay lines $Lc_1$, $Ld_2$ and $Lu_3$ and are then continuously circulated through the repeater 190 and these delay lines. A continuous train of ½ μ-sec. pulses of 100 μ-sec. pulse repetition period is produced at the terminal 154.

Auxiliary apparatus for reducing the risk of two subscribers being allotted the same free-channel pulse when they lift their receivers simultaneously is incorporated in the channel pulse store shown in Figure 8 and comprises the two 9 μ-sec. delay lines 188 and 189 and the gates $gd'_0$–$gd'_9$ and $gu'_0$–$gu'_9$. In addition, a further two-gate 194 is provided. This gate 194 is of a type which has five inputs and which will produce an output pulse whenever two input pulses appear simultaneously at any two of its five inputs. A circuit suitable for use as the two-gate 194 will hereinafter be described with reference to Fig. 22. The five inputs of the gate 194 are connected to the inputs respectively of the delay lines $Lc_0$ to $Lc_4$. The output of this gate 194 is connected to a 100 μ-sec. delay line 195 whose output is connected to one of two inputs of a one-gate 196. The output of the one-gate 196 is connected to inhibiting terminals on the one-gates $gC_0$ to $gC_4$. The other input of the one-gate 196 is connected to terminal 197 to which clearing pulses from the control unit 23 (Fig. 1) are applied.

In operation, when a subscriber lifts his receiver from its rest, the apparatus in his line terminating unit operates to allow the first free-channel pulse from the control unit 23 (Fig. 1) to pass to the input of the repeater in this line terminating unit. Referring first to Figure 9, the ½ μ-sec. pulse representing the first free channel is fed via terminal 153 to the one-gate 193 and through this gate to an input of the three-gate 191. This gate will not transmit this pulse unless pulses are simultaneously present at the other inputs of the gate, that is to say, are present in the leads $k'd_2$ and $k'u_3$. This latter condition is fulfilled only when pulses are simultaneously received on these leads from the outputs of the gates $gd'_2$ and $gu'_3$ in Figure 8.

As previously described with reference to Figure 8, the free-channel pulses are applied to an input of each of the two-gates $gd'_0$–$gd'_9$ and $gu'_0$ to $gu'_9$. The input of 9 μ-sec. delay line 188 is connected to a terminal 198 to which a continuous train of ½ μ-sec. pulses of 11 μ-sec. pulse repetition period is applied. The input of the delay line 188 and the nine tappings therein are connected to the other inputs respectively of gates $gd'_0$–$gd'_9$. The input of the delay line 189 is connected to a terminal 199 which is fed with a continuous train of ½ μ-sec. pulses recurring at intervals alternately of 10 and 11 μ-sec. The input of the delay line 189 and the nine tappings therein are connected to the remaining inputs of the gates $gu'_0$ to $gu'_9$. Thus, in operation, output pulses from the gates $gd'_2$ and $gu'_3$ are obtained only when an allotted free-channel pulse coincides at the gate $gd'_2$ with a ½ μ-sec. pulse from the second tapping of the delay line 188 and at the gate $gu'_3$ with a ½ μ-sec. pulse from the third tapping on the delay line 189. When the latter condition is fulfilled pulses appear on the leads $k'd_2$ and $k'u_3$ in Figure 9 and the free-channel pulse fed to the terminal 153 (Figure 9) is transmitted by the gate 191. The pulse thus transmitted is distributed by the gate 192 to the leads $kc_1$, $kd_2$ and $ku_3$ and to the output terminal 154, and the pulses on the leads $kc_1$, $kd_2$ and $ku_3$ are then continuously circulated in the delay lines $Lc_1$, $Ld_2$ and $Lu_3$ and the repeater 190.

It may be shown that with the present arrangement of 9 μ-sec. delay lines only two of every 231 free channel pulses may be seized by any one subscriber and that not more than four other subscribers who lift their receivers simultaneously can seize the same free-channel pulse.

When two subscribers connected to the same multiplex unit and having numbers differing only in the second digit, for example numbers 0123 and 0223, simultaneously lift their receivers, they will initially be allotted the same free-channel pulse. This channel pulse will however appear simultaneously at the inputs of two of the first five delay lines $Lc_0$ to $Lc_4$ in Figure 8 and will produce an output pulse from the gate 194. The output pulse from this gate 194 is delayed by 100 $\mu$-sec. in the delay line 195 and fed to inhibiting terminals on the gates $gC_0$ to $gC_4$. This delayed pulse coincides at the gates $gC_1$ and $gC_2$ with the free-channel pulse from the two delay lines (in the example given $LC_1$ and $LC_2$) and prevents further circulation of this free-channel pulse. Neither subscriber receives a free channel until one of them has replaced his receiver.

Twelve 100 $\mu$-sec. delay lines $T_1$ to $T_{12}$ are shown in Figure 8, these delay lines being assoicated with the channel pulse repeaters in the trunk terminating units in the same manner as the delay lines bearing the same references in Figure 3. Alternatively the 9 $\mu$-sec. delay lines 188 and 198 and associated terminals 198 and 199 may be omitted, and pulses $D_0$ to $D_9$ and $U_0$ to $U_9$ may be applied respectively to the gates $gd'_0$ to $gd'_9$ and $gu'_0$ to $gu'_9$ in place of the pulses from the delay lines. The operation is then substantially as already described.

A further arrangement for subscriber identification which may conveniently be employed in a PBX system requiring only one multiplex unit will now be described with reference to Figures 10 and 11. No pulse train R nor any of the pulse trains P and Q or C, D and U previously described are required. The master pulse generator which in a small exchange would constitute a relatively large proportion of the total equipment is replaced in the arrangement to be described by a 1 mc./s. constant-frequency oscillator.

A register store and translator according to the further arrangement is shown in Figure 10. Dialling signals consisting of three groups of dialling impulses representing the number of a called subscriber are received at an input treminal 201 and are fed to the inputs of gates 202, 203 and 204, and to the input of a slow-to-release device 205. The device 205 operates in response to the application of the first pulse in each group of dialling pulses received and returns to its unoperated condition 250 milliseconds after the last pulse in the group is received. A circuit suitable for use as the device 205 is hereinafter described with reference to Figure 19. In an unoperated condition the device 205 produces a D.C. output voltage and this voltage is applied to operate a digital chain counter device 206. The counter device 206 comprises units C, D, U and Z each of which includes a cold cathode tube. For the present description it will be sufficient to say that the tubes are connected together in such a way that only one of the tubes is in a "switched-on" condition at any time and that the applied voltage switches off the tube which is on and switches on the next tube in the group. The outputs of the units C, D and U are connected to inputs of the two-gates 202, 203 and 204 respectively. The outputs of the two-gates 202, 203 and 204 are connected to the inputs respectively of bi-quinary ring counters 207, 208 and 209. These ring counters are of the same construction as those shown in Figure 6 and operate in the same manner. Reference may be made to the foregoing description of the operation of the ring counters shown in Figure 6. The outputs of the stages of the counters 207 and 208 are connected to the inputs respectively of two-gates $gu_0$, $gu_1$, $gu_2$ . . . $gu_4$, $gu_0'$, $gu_1'$ and $gd_0$, $gd_1$ . . . $gd_4$, $gd_0'$, $gd_1'$. The other inputs of these gates are connected to the first 14 tappings respectively on a 100 $\mu$-sec. delay line 210. The outputs of the first five stages of the counter 209 are connected to the inputs respectively of five three-gates $gc_0$, $gc_1$ . . . $gc_4$. The output of the sixth stage in the counter 209 is connected to further inputs of the gates $gc_1$, $gc_2$, $gc_3$ and $gc_4$ and to the inputs of a three-gate 212. The output of the seventh stage in the counter 209 is connected to other inputs to the three-gates $gc_0$ and 211. The remaining inputs of the three-gates $gc_0$, $gc_1$, $gc_2$, $gc_3$ and $gc_4$ are connected to the last five tappings on the delay line 210. The outputs of the gates $gu_0$ to $gu_4$, $gu_0'$, $gu_1'$, $gd_0$ to $gu_4$, $gd_0'$, $gd_1'$, and $gc_0$ to $gc_4$ are connected through a one-gate 213 to an output terminal 215.

The output of the first stage in the counter 209 is further connected to another of the inputs of the three-gate 212 and the outputs of the second to fifth stages of the counter 209 are connected to the inputs respectively of a one-gate 214. The output of the one-gate 214 is connected to another input of the gate 211. The remaining inputs of the three-gates 211 and 212 are connected to the output of the unit D in the counter device 206.

The output of the unit Z in the counter device 206 is connected to one of the inputs of a two-gate 216, the other input of which is connected to terminal 217. The output of the two-gate 216 is connected to the input of the 100 $\mu$-sec. tapped delay line 210.

The operation of the store and translator shown in Figure 10 will now be described. It will be assumed that dialling signals representing the number 123 of a called subscriber are received at the terminal 201. These dialling signals are in the form of 3 groups of dialling pulses, the first group representing the digit 1 and in this case comprising one pulse, the second group representing the digit 2 and comprising two pulses one following the other in rapid succession and the third group representing the digit 3 and comprising three pulses in rapid succession. The cold cathode tube in the unit C is initially switched on and the tubes in the units D, U and Z are switched off. An output voltage from the unit C appears at the gate 202. The counters 207, 208 and 209 are initially set at zero, that is to say, the cold cathode tubes in the first and sixth stages in each counter are switched on and the others switched off. D.C. voltages appear at the outputs of the stages in the switched-on condition and are fed to the inputs of the gates associated with these stages.

The first of the dialling pulses received at the terminal 201 passes through the gate 202 and is fed to the counter 209 causing the tube in the first stage to switch off and the tube in the second stage to switch on. A D.C. output voltage is produced in the output of the second stage while the tube is in a switched-on condition and appears at the input of the three-gate $gc_1$. A D.C. output voltage produced by the sixth stage of the counter 209 remains and appears at the inputs of gates $gc_1$, $gc_2$, $gc_3$ and $gc_4$. The gate $gc_1$ is now in a condition to transmit a pulse from the 16th tapping on the delay line 210.

The first of the dialling pulses received at the terminal 201 also passes to the slow-to-release device 205 and causes this device to operate. After 250 milliseconds the device 205 returns to its unoperated condition and causes the tube in the unit C to switch off and the tube in the unit D to switch on. A D.C. voltage is produced at the output of the unit D and appears at the input of the two-gate 203.

The second group of two dialling pulses are then received and pass through the gate 203 to the ring counter 208, the first of these pulses switching off the tube in the first stage of the counter and switching on the tube in the second stage, and the second of the pulses switching off the tube in the second stage and switching on the tube in the third stage. A D.C. output voltage is produced at the output of the third stage and appears at the input of the two-gate $gd_2$. The tube in the sixth stage of the counter 208 remains switched on and a D.C. voltage appears at the input of the gate $gd_0'$. The second group of dialling pulses also cause the device 205 to operate. This device returns to its unoperated condition 250 milliseconds after the second of the pulses in the group is received, causing the tube in the unit D to switch off and the tube in the unit U to switch on.

The third group of three dialling pulses received passes through the gate 204 and operates the counter 207 causing a D.C. voltage to appear at the output of the fourth stage of the counter. This voltage appears at the input of the gate $gu_3$. The D.C. voltage from the output of the sixth stage of the counter 207 appears at the input of the gate $gu_0'$. The third group of dialling pulses similarly operate the device 205 which returns to its unoperated condition 250 milliseconds after the last pulse in the group is received, causing the tube in the unit U to switch off and the tube in the unit Z to switch on. A D.C. output voltage is produced at the output of the unit Z and appears at the input of the gate 216.

Free-channel pulses from the control unit 23 in Figure 1 are applied to the terminal 217 and the first pulse fed to the gate 216 during the application thereto of the voltage from the output of the unit Z passes through the gate 216 and is fed to the input of the delay line 210. The selected pulse from the gate 216 is also fed to an input of the gate 213, and to an output terminal 220. The pulse fed to the delay line 210 appears at the tappings on the delay line in turn. A pulse appears at the first tapping 5 $\mu$-secs. after the selected pulse is applied to the input of the delay line, but this pulse is not transmitted by the gate $gu_0$ since the latter has no voltage applied to it from the first stage of the counter 207.

After a further delay of 5 $\mu$-secs. a ½ $\mu$-sec. pulse appears at the second tapping on the delay line, but since the gate $gu_1$ has no voltage applied to its other input the gate $gu_1$ does not transmit this pulse. After a further delay of 5 $\mu$-secs. a ½ $\mu$-sec. pulse appears at the third tapping but this pulse is blocked by the gate $gu_2$ since this gate also has no voltage applied to its other input from the counter 207. After a further delay of 5 $\mu$-secs. a pulse appears at the fourth tapping. This pulse is transmitted by the gate $gu_3$ which it will be recalled has a D.C. voltage applied to it from the fourth stage of the counter 207. Thus the pulse from the fourth tapping is fed to the one-gate 213 and appears at the output terminal 215 20 $\mu$-secs. after the appearance at this terminal of the ½ $\mu$-sec. pulse fed direct from the gate 216. The pulse thus received at the terminal 215 is followed after an interval of 10 $\mu$-secs. by another ½ $\mu$-sec. pulse passed by the gate $gu_0'$ from the sixth tapping of the delay line. A fourth ½ $\mu$-sec. pulse appears at the terminal 215 20 $\mu$-secs. after the third, this fourth pulse being passed by the gate $gd_2$ from the 10th tapping on the delay line 210. The fourth ½ $\mu$-sec. pulse is followed after an interval of 15 $\mu$-secs. by a fifth ½ $\mu$-sec. pulse transmitted by the gate $gd_0'$ from the 13th tapping on the delay line 210. The fifth ½ $\mu$-sec. pulse received at the terminal 215 is followed after an interval of 15 $\mu$-secs. by a sixth pulse passed by the gate $gc_1$ from the 16th tapping on the delay line 210. The sixth pulse received at the terminal 215 has suffered a total delay in the delay line of 80 $\mu$-secs., and is followed after an interval of 20 $\mu$-secs. by a seventh and final pulse from the output of the delay line 210. This group of seven time-spaced pulses thus produced are fed to a channel pulse store hereinafter to be described with reference to Figure 11.

An auxiliary tapping on the delay line 210 is connected to the input of a bistable multivibrator 221 which is arranged to be switched over and switched back successively by successive pulses applied to its input and in the switched-over condition to deliver an output voltage to an inhibiting terminal on the gate 216. Since only one free-channel pulse appears in each 100 $\mu$-sec. interval as previously described the gate 216 is prevented from transmitting any further free-channel pulses.

The D.C. output voltage appearing at the output of the second stage of the counter 209 is also applied through the one-gate 214 to the three-gate 211. The D.C. output voltage from the seventh stage of the counter 209 is applied to another of the inputs of the gate 211. The output voltage at the output of the unit D of the counter device 206 is applied to the other input of the gate 211 and this gate delivers an output voltage via terminal 222 to set the forced release circuit, hereinbefore described with reference to Figure 1. This circuit it will be recalled forms part of the circuit 71 in the register 24 in Figure 1.

The D.C. output voltage from the first stage of the counter 209, which is applied to the gate $gc_0$, is also applied to one of the three inputs of the gate 212. The D.C. voltage from the sixth stage of the counter 209 is applied to another input of the gate 212. The output voltage from the unit D is applied to the remaining input of the gate 212. The output voltage from this gate 212 is applied to an input of a two-gate 223 to the other input of which are applied ½ $\mu$-sec. pulses from a terminal 224 connected to the outputs of the channel pulse generators 60 of the register terminating units 25 as shown in Fig. 1. Thus when dialling pulses representing the number 0 are received, a ½ $\mu$-sec. pulse corresponding in phase to that of the pulse train generated by the calling subscriber's line terminating unit is transmitted through the gate 223 to an input terminal 225 of an operator's line terminating unit (not shown). The pulse applied to the terminal 225 is applied through a one-gate 226 to switch over a bistable multivibrator 227 in which condition this multivibrator delivers an output voltage to an inhibiting terminal on the gate 223 and to an inhibiting terminal on a further two-gate 228.

The output of the unit Z is connected to an input of the gate 228. The ½ $\mu$-sec. pulses from the terminal 224 are applied to the other input of this gate. Thus, when a number has been stored and the counter device 206 is in its final condition, that is to say, the tube in the unit Z is switched on, the output voltage from this unit appears at theinput of the gate 228, and the first ½ $\mu$-sec. pulse from the terminal 224 is transmitted by the gate 228 and fed to an output terminal 229. This output terminal 229 is connected to the group of trunk terminating units as for example by lead 79 in Fig. 1. The ½ $\mu$-sec. pulse fed through the gate 228 in addition to being fed to the output terminal 229 is fed to an input of the gate 226. The output pulse from this gate 226 is, as previously described, applied to the multivibrator 227 to switch this multivibrator over. In the switched-over condition the multivibrator 227 delivers an output voltage to the inhibiting terminals on the gates 223 and 228 to prevent further applied pulses from the terminal 224 from being transmitted.

The output of the forced release circuit, which it will be recalled is set in operation by an output voltage at the terminal 222, is connected to an input terminal 230. The forced release circuit, it will be recalled delivers an output voltage after a predetermined interval from the time it is set in operation, and this output voltage appears at the input terminal 230 and is fed via a one-gate 231 to reset the counters 207, 208 and 209 and the counter device 206 to their initial conditions and if necessary to switch back the multivibrators 221 and 227.

If the called number is properly stored and a group of pulses appear at the output terminal 215, no voltage appears at the input terminal 230. The resetting of the counter device 206, and counters 207, 208 and 209 and if necessary the multivibrators 221 and 227 is effected by the output voltage from the unit Z of the counter device 206, which is applied via a one-gate 232 and a slow-to-operate device 233 to the one-gate 231. The slow-to-operate device 233 is such as to produce an output voltage in response to an input voltage applied thereto, the output voltage commencing at least 300 $\mu$-secs. after the application of the input voltage and terminating when the input voltage is removed. A circuit suitable for use as the device 233 is hereinafter described with reference to Fig. 21.

The voltage appearing at the output of the gate 231 for resetting counters is in addition applied to an output terminal 234 connected to the register release control circuit 71 in Fig. 1 and provides output control voltage on leads 69' and 98 in Fig. 1.

As previously described, when dialling signals representing the number 0 are received voltages appear at the inputs of the gate 212 from the first stage in the counter 209, from the unit D in the counter device 206 and from the sixth stage in the counter 209. The output voltage from this gate 212 is applied to the gate 223 which then transmits a ½ μ-sec. pulse from the terminal 224 to the terminal 225 connected to an operator's line terminating unit. The output voltage from the gate 212 is further applied to the one-gate 232, is delayed by 300 μ-secs. in the device 233 and in the same manner as previously described for the voltage applied to the terminal 230 is applied to reset the counters 207, 208 and 209 and the counter device 206 and if necessary the multivibrators 221 and 227.

A channel pulse store for use in the further arrangement for subscriber identification will now be described with reference to Fig. 11. The output terminal 215 of the register store and translator shown in Fig. 10 is shown at the top of Fig. 11. This output terminal 215 is connected to an input of a one-gate 234'. The output terminals of four other register stores identical to that shown in Fig. 10 are connected to four other inputs respectively of the gate 234'. The output of the gate 234' is connected to an input of a two-gate 235 to the other input of which is connected the output of the gate 86 in the last trunk terminating unit in the first group of trunk terminating units in the multiplex unit. It will be recalled that the first group of trunk terminating units are for allocation to a calling subscriber, and that the conditions are such that D.C. voltage appears at the output of this gate 86 in the last unit all the time there is at least one unit free.

The output of the gate 235 is connected to a one-gate 236 whose other input is connected to the output of a two-gate 237. One of the inputs of the gate 237 is connected via terminal 238 to the output of a gate 86 in the last unit in a group of trunk terminating units allotted to the operator. The other input of the gate 237 is connected to the output terminal of a register store and translator used by the operator.

The output of the gate 236 is connected to the input of a 100 μ-sec. delay line 239 and to an input of a two-gate 240. The output of the delay line 239 is connected to the other input of the gate 240. The delay line 239 is tapped at 19 points along its length corresponding in position relatively to the input of the line to the 19 tappings on the 100 μ-sec. delay line 210 in the register store shown in Fig. 10. The first five tappings of the delay line 239, counted from the input, are connected to the inputs respectively of five two-gates $gC_4$, $gC_3$, $gC_2$, $gC_1$ and $gC_5$. The other inputs of these gates $gC_1$ to $gC_5$ are connected to the output of the two-gate 240. The sixth and seventh tappings on the delay line 239 are connected to inputs respectively of two-gates 241 and 242 whose other inputs are connected to the output of the two-gate 240. The output of the gate 241 is connected to an input of each of five two-gates $gD_5$, $gD_6$, $gD_7$, $gD_8$, $gD_9$, and the output of the two-gate 242 is connected to an input in each of five two-gates $gD_0$, $gD_1$, $gD_2$, $gD_3$ and $gD_4$. The next five tappings 8 to 12 on the delay line 239 are connected to the other inputs respectively of the two-gates $gD_4$ to $gD_0$ and, in addition, to the other inputs respectively of the two-gates $gD_9$ to $gD_5$. The thirteenth and fourteenth tappings are connected to inputs respectively of two-gates 243 and 244 whose other inputs are connected to the output of gate 240. The output of the gate 243 is connected to an input of each of five two-gates $gU_5$, $gU_6$, $gU_7$, $gU_8$ and $gU_9$ and the output of the gate 244 is connected to an input of each of five two-gates $gU_0$, $gU_1$, $gU_2$, $gU_3$ and $gU_4$. The last five tappings in the delay line 239 are connected to the other inputs respectively of the gates $gU_9$ to $gU_5$ and in addition to the other inputs respectively of the gates $gU_4$ to $gU_0$.

Twenty-five 100 μ-sec. delay lines $Lc_1$, $Lc_2$ . . . $Lc_5$, $Ld_0$, $Ld_1$, . . . $Ld_9$, $Lu_0$, $Lu_1$, . . . $Lu_9$ are provided for re-generating ½ μ-sec. pulse trains at the channel pulse repeaters in the subscribers' line terminating units. Each repeater is associated with a combination of three delay lines, one delay line from each of the three groups, that is to say, a delay line from the group $Lc_1$–$Lc_5$, a delay line from the group $Ld_0$–$Ld_9$, and a delay line from the group $Lu_0$–$Lu_9$, and no two repeaters are associated with the same combination of delay lines.

A repeater for use with the channel pulse store shown in Fig. 11 will hereinafter be described with reference to Fig. 12. For the present description it will be convenient to assume that the repeaters are of the kind shown in Fig. 3 and are connected to the channel pulse store delay lines in the manner shown in Fig. 3.

The outputs of the delay lines $Lc_1$–$Lc_5$, $Ld_0$–$Ld_9$, and $Lu_0$–$Lu_9$ are connected to inputs respectively of one-gates $gLc_1$ to $gLc_5$, $gLd_0$ to $gLd_9$ and $gLu_0$ to $gLu_9$, and the outputs of the gates $gC_1$–$gC_5$, $gD_0$–$gD_9$ and $gU_0$–$gU_9$ are connected to the other inputs respectively of these one-gates. The outputs of these one-gates are connected as shown in Fig. 3 to the repeaters associated therewith.

The operation of the channel pulse store shown in Fig. 11 in finding a called subscriber will now be described. It will be assumed that a group of seven time-spaced ½ μ-sec. pulses representing the number 123 of the called subscriber are received at the terminal 215 in Fig. 11. This group of pulses is derived from the register store and translator shown in Fig. 10. The first ½ μ-sec. pulse is in a phase corresponding to that of a free channel in the multiplex unit and is hereinafter referred to as the marker pulse. The second pulse follows the first after an interval of 20 μ-secs., the third follows the second after 10 μ-secs., the fourth follows the third after 20 μ-secs., the fifth follows the fourth after 15 μ-secs., the sixth follows the fifth after 15 μ-secs., and the seventh pulse follows the sixth after 20 μ-secs. The seventh pulse follows the marker pulse after an interval of 100 μ-secs. The group of pulses are fed through the gate 234 to the input of the gate 235. On the assumption that there is at least one free pair of trunks terminating units for use by the calling and called subscriber a D.C. voltage is present at the other input of the gate 235 and the group of pulses pass through the gate 235 and through the gate 236 to the input of the delay line 239. After an interval of 100 μ-secs., the marker pulse appears at the output of the delay line 239 and is applied to the gate 240. At this instant the seventh pulse in the group appears at the other input of the gate 240 and the ½ μ-sec. marker pulse passes through the gate 240 and is fed to the inputs of gates 241 and 244. At the same time the second, third, fourth, fifth and sixth ½ μ-sec. pulses in the group appear at the sixteenth, fourteenth, tenth, seventh and fourth tappings respectively from the input end of the delay line 239. The ½ μ-sec. pulse from the fourth tapping appears at the input of the gate $gC_1$ and the ½ μ-sec. pulse from the output of the gate 240 is applied to the other input of this gate $gC_1$. A ½ μ-sec. pulse therefore passes through the gate $gC_1$ and is fed by way of the one-gate $gLc_1$ to the circuit of the delay line $Lc_1$. The ½ μ-sec. pulse from the seventh tapping appears at the input of gate 242, which is opened by a pulse from the gate 240. The ½ μ-sec. pulse therefore passes through the gate 242 and appears at the inputs of gates $gD_0$–$gD_4$. The ½ μ-sec. pulse from the tenth tapping appears at the other input of the gate $gD_2$ and is passed by this gate to the one-gate $gLd_2$ from which it passes into the circuit of the delay line $Ld_2$.

The ½ μ-sec. pulse from the fourteenth tapping passes through the gate 244 which is opened by the ½ μ-sec. pulse from the output of the gate 240 and is passed to the inputs of gates $gU_0$ to $gU_4$. The ½ μ-sec. pulse from the sixteenth tapping appears at another input of the gate $gU_3$. The gate $gU_3$ therefore passes a ½ μ-sec. pulse to an input of the one-gate $gLu_3$ from which the pulse is passed to the circuit of the delay line $Lu_3$. The ½ μ-sec. pulses thus fed into the circuits of the delay lines $Lc_1$, $Ld_2$ and $Lu_3$ are in the same phase as that of the marker pulse in the group and hence represents the phase of the allotted free channel. These pulses appear simultaneously at three inputs respectively of the line terminating unit of the subscriber whose number is 123.

A repeater suitable for use in a subscriber's line terminating unit, and its association with the delay lines of the channel pulse store shown in Fig. 11 will now be described with reference to Fig. 12. One of the 500 subscribers' repeaters is shown at 246 in Fig. 12, this repeater being associated with delay lines $Ld_1$, $Ld_2$ and $Lu_3$ and belonging to the line terminating unit of the subscriber whose number is 123. The repeater 246 comprises a two-gate 247 whose two inputs are connected to leads $k'c_1$ and $k'd_2$ respectively. The output of the two-gate 247 is connected to an input of a one-gate 248 whose other input is connected to terminal 153 which as shown in Fig. 7, in the subscriber's line terminating unit 12, is connected to the output of the gate 35' which is fed with ½ μ-sec. free-channel pulses and which is opened when the subscriber lifts his receiver off its rest. The output of the gate 248 is connected to an input of a two-gate 249 whose other input is connected to lead $k'u_3$. The output of the gate 249 is connected to a one-gate 250 having four outputs three of which are connected to leads $kc_1$, $kd_2$ and $ku_3$ respectively and the fourth of which is connected to an output terminal 154. The remainder of Fig. 12 corresponds to a part of Fig. 11 and will not be described.

As previously described when the subscriber 123 is called ½ μ-sec. free channel pulses are simultaneously applied to the combining gates $gLc_1$, $gLd_2$ and $gLu_3$. These ½ μ-sec. pulses appear on the leads $k'c_1$, $k'd_2$ and $k'u_3$. The two pulses on the leads $k'c_1$ and $k'd_2$ appear at the inputs of the gate 247 and pass therethrough and through the gate 248 to the input of the two-gate 249. The pulse on the lead $k'd_3$ simultaneously appears at the other input of the gate 249 and a ½ μ-sec. pulse is passed by this gate to the gate 250 where it is distributed to the leads $kc_1$, $kd_2$ and $ku_3$ and fed to the output terminal 154. The ½ μ-sec. pulses are then continuously circulated through the delay lines $Lc_1$, $Ld_2$ and $Lu_3$ respectively and the repeater 246, and a continuous train of pulses appears at the output terminal 154.

Clearing pulses for stopping circulation of pulses in given phases are fed from the control unit 23 in Fig. 1 to the terminal 245 shown in Fig. 11, from which they are applied to inhibiting terminals on the gates $gLd_0$–$gLd_9$ and $gLu_0$–$gLu_9$, and through a one-gate 255 to inhibiting terminals on the gates $gLc_1$–$gLc_5$.

Auxiliary apparatus for reducing the risk of two subscribers being allotted the same free channel when they lift their receivers simultaneously is incorporated in the channel pulse store shown in Fig. 11 and will now be described with reference to that figure. The inputs of the delay lines $Lc_1$–$Lc_5$ are connected to five inputs respectively of a two-gate 251 which delivers an output pulse when two pulses appear simultaneously at two of its inputs respectively. A circuit suitable for use as the gate 251 is described with reference to Fig. 22. The inputs of the delay lines $Ld_0$–$Ld_9$ are connected to nine inputs respectively of a further gate 252 which delivers an output pulse when two pulses appear simultaneously at two of its inputs respectively. A circuit suitable for use as the gate 252 may be of the type shown in Fig. 22. The outputs of these two gates 251 and 252 are connected to two inputs of a one-gate 253, the output of which is connected to a 100 μ-sec. delay line 254. The output of this delay line 254 is connected to a one-gate 255 whose output is connected to an inhibiting terminal on each of the gates $gLc_1$ to $gLc_5$. It will be recalled that the other input of the gate 255 is connected to the terminal 245 to which clearing pulses are applied.

Free-channel pulses from the control unit 23 shown in Fig. 1 are applied to an input terminal 256 in Fig. 11. The terminal 256 is connected to an input of a two-gate 257 whose other input is connected to an output of a monostable multivibrator 258. In the normal condition the multivibrator produces a D.C. voltage at the output which is connected to the gate 257. The multivibrator 258 is adapted to be switched over by a pulse from the output of the gate 236 and to revert to its normal condition approximately 200 μ-secs. later.

The output of the gate 257 is connected to an input of each of ten gates $gM_0$ to $gM_9$. The other inputs of these gates $gM_0$ to $gM_9$ are connected to nine tappings and the output respectively of an 11 μ-sec. delay line 260 which forms part of a circuit in which a ½ μ-sec. pulse is caused to circulate. The circulating pulse may be in any one of the given phases.

The operation of the apparatus shown in Figs. 11 and 12 in allocating a free channel to the subscriber who desires to make a call will now be described. It will be remembered that when the calling subscriber lifts his receiver off its rest the apparatus in this line terminating unit operates to allow the first free channel pulse from the control unit 23 (Fig. 1) to pass to the input of the repeater in the unit. Referring first to Fig. 12 the first free-channel pulse is fed to the one-gate 248 and through this gate to an input of the gate 249. This gate 249 will not transmit a pulse unless a pulse is simultaneously present at the other input thereof, that is to say, is present on the lead $k'u_3$. This latter condition is fulfilled only when the gate $gLu_3$ receives a pulse from the output of the gate $gM_3$ (Fig. 11) and an output pulse from the gate $gM_3$ is obtained only when the free-channel pulse fed from the gate 257 coincides with a pulse from the fourth trapping on the delay line 260. This latter condition is fulfilled by one free channel pulse in every eleven received. The first free-channel pulse to coincide with the pulse from the fourth tapping of the delay line 260 passes through the gate $gM_3$ and the gate $gLu_3$ and on to the lead $k'u_3$ and appears at the input of gate 249. A free-channel pulse also appears at the other input of the gate 249 and this gate then transmits a pulse to the gate 250 from which the pulse is fed to the circuits of the delay lines $Lc_1$, $Ld_2$ and $Lu_3$ and there circulated. After a 100 μ-sec. delay, the ½ μ-sec. pulses appear on the leads $k'c_1$, $k'd_2$ and $k'u_3$, those on the leads $k'c_1$ and $k'd_2$ passing through the two-gate 247 and gate 248 to the gate 249 and the pulse in the lead $k'u_3$ passing to the other input of the gate 249. This gate 249 then transmits a ½ μ-sec. pulse which is circulated in the delay lines and back to the repeater as aforesaid.

It will be apparent from the above description that if the subscriber whose number is 124 lifts his receiver at the same time as the subscriber 123, the first free channel pulse will be allocated to only one of these subscribers and the next free-channel pulse to the other.

If, however, a subscriber whose number is say 223 lifts his receiver from its rest at the same time as the subscriber 123, the same free-channel pulse will be distributed to the delay lines $Lc_1$, $Ld_2$ and $Lu_3$ and $Lc_2$, $Ld_2$ and $Lu_3$. The appearance of pulses in the same phase in the circuits of delay lines $Lc_1$ and $Lc_2$ is detected by the gate 251 which delivers an output pulse to the gate 253. The pulse passes through the gate 253, through the 100 μ-sec. delay line 254 and through the gate 255 to prevent continued circulation of pulses in this phase. One of the subscribers must therefore replace his receiver before a free-channel pulse can be allocated to the other. Similar considerations apply for subscribers having numbers say 123 and 113.

Eleven 100 μ-sec. delay lines $T_1, T_2 \ldots T_{11}$ are shown in Fig. 11, these delay lines corresponding to the delay lines bearing the same references in Fig. 3 and being connected to the channel pulse repeaters in the same manner as described with reference to Fig. 3.

The 100 μ-sec. pulses $P_x$ and $Q_y$ employed in the apparatus shown in Fig. 1 are replaced in this alternative arrangement by ½ μ-sec. pulse trains. Each pulse train may be derived from an output of a delay line connected in a circuit around which a ½ μ-sec. pulse in a given phase is caused to circulate continuously. The delay lines may for example produce delays of 31 and 33 μ-secs. The pulse trains then have pulse repetition periods of 31 and 33 μ-secs. respectively, their pulses coinciding every 102.3 milliseconds with any one particular channel pulse. The tone unit 28 in Fig. 1 may then be adapted for operation with the alternative arrangement by applying these pulse trains to terminals $TP_x$ and $TQ_y$ and, in addition, connecting the output of the gate 131 to a 100 μ-sec. delay line, the output of which is connected to terminals $TP_{x+1}$ and $TQ_{y+1}$.

The control unit 23 in Fig. 1 may be adapted for use in the alternative arrangement by replacing the pulse trains $P_x$ and $Q_y$ as aforesaid, removing the input lead 47 to the gate 41, and extending the delay line 48 by a few μ-secs. and connecting the output of the added portion to the input of the multivibrator 43.

The pulse trains $P_z$ used for cyclically operating the five register terminating units, the third of which is shown in Fig. 1, may be replaced by pulse trains from the 11 μ-sec. delay line 260 in the channel pulse store shown in Fig. 11.

Since there is only one multiplex unit in the alternative arrangement, the distribution unit 26 in Fig. 1 may be greatly simplified. The gates such as 148, 149 and 150 are not required. The output terminal 215 in the register store shown in Fig. 10 is connected direct to the gate 234′ in Fig. 11, the gate 234′ corresponding to the gate 88 in Fig. 1. The output pulses from the register shown in Fig. 10 are applied to open a gate such as 76 in the register shown in Fig. 1, to allow transmission of the ½ μ-sec. pulse from the register terminating unit to the first group of trunk terminating units.

The alternative method of subscriber identification hereinbefore described, in which a group of ½ μ-sec. pulses from the registers are applied to the channel pulse stores may be extended to exchange systems employing more than one multiplex unit.

A 10,000 line exchange system according to the present invention and incorporating yet another system of subscriber identification will now be described with reference to Figs. 13 to 18.

A pulse generator hereinafter to be described with reference to Fig. 18 is arranged to generate the oscillation and pulse trains shown in Fig. 13 (*a–h*), that is to say, a 1 mc./s. sine-wave oscillation (Fig. 13*a*) used in deriving ½ μ-sec. square wave oscillation (Fig. 13*b*), a square wave having a pulse duration of 218/μ-secs. (Fig. 13*c*), two opposed phase 2.18 millisecond square wave oscillations (Fig. 13*d* and 13*e*), a first series of pulse trains $f_1 f_2 \ldots f_{20}$ each of which a pulse repetition period of 2.18 milliseconds and a pulse duration of 218 μ-secs., a second series of pulse trains $g_1$ to $g_{11}$ each of which has a pulse repetition period of 2.398 milli-seconds and a pulse duration of 218 μ-secs., and a train of ½ μ-sec. pulses (Fig. 13*h*) with a pulse repetition period of 1.199 miliseconds.

The 10,000 line exchange system now to be described comprises 20 multiplex units each serving 500 subscribers. Each multiplex unit has 21 groups of ten trunk terminating units the trunk terminating units in the first and second groups being connected together in pair as previously described with reference to Fig. 1 and serving to link speech paths of calling and called subscribers in the same multiplex unit and the other nineteen groups being similarly connected with groups respectively in the other nineteen multiplex units of the system and serving to link the speech path of a calling suscriber in the first multiplex unit with the speech path of a called subscriber in another multiplex unit. Each multiplex unit is provided with five identical register, one of which will now be described with reference to Fig. 14.

A register terminating unit 261 is provided as in the apparatus described in Fig. 1 for selectively transmitting dialling tone signals via the "Return" section of the link to a calling subscriber and selectively receiving dialling signals from the "Go" section of the link. The register terminating unit 261 incorporates a modulator 262 and demodulator 263, the output of the modulator being connected via terminal 264 to the input end of the "Return" section of the link and the input of the demodulator 263 being connected via terminal 265 to the output end of the "Go" section of the link.

The link and the control unit of the multiplex unit may be substantially as described with reference to Fig. 1. As previously described the train of ½ μ-sec. pulses representing the channel seized by a calling subscriber's line terminating unit appears at the output of the channel pulse generator 55 in the control unit 23 in Fig. 1 and is fed to each of the five register terminating units in the multiplex unit. This ½ μ-sec. pulse train appears at input terminal 266 of the register terminating unit 261 and is applied to a two-gate 267. To the other input of the gate 267 is connected terminal 268 to which is applied one of the pulse train (*f*) shown in Fig. 13, say $f_1$. To corresponding inputs in the other four register terminating units in the multiplex unit are applied pulse train $f_2 f_3 f_4$ and $f_5$ respectively. In this way, the register terminating units are rendered operative in succession to avoid the allocation of more than one register terminating unit to a calling subscriber. On the assumption that the register shown in Fig. 14 is the first free register, the first ½ μ-sec. pulse to appear at the input of the gate 267 during the application of a 218 μ-sec. pulse to the other input passes through the gate and is fed to a one-gate 269. The ½ μ-sec. pulse from the gate 269 is fed to a 100 μ-sec. delay line 270 to the modulator 262 and demodulator 263 and to a bistable multivibrator 271 in the register. The modulator 262 and demodulator 263 are then set in operation in the phase of the calling subscriber's allotted channel. The multivibrator 271 is switched over by the first pulse from the gate 269 and delivers an output control voltage on lead 272 to inhibit the operation of the gate 268 and to allow a two-gate 273 to transmit ½ μ-sec. pulses from the output of the delay line 270. The ½ μ-sec. pulse from the gate 273 passes through the gate 269 and is recirculated in the delay line 270. Dialling tone signals are permanently applied to a terminal 274 and are fed to the modulator 262 through gate 275 for transmission over the link to the calling subscriber's line terminating unit. The gate 275 is initially open to pass the dialling tone signals, the control voltage for the gate being derived from the output of a bistable multivibrator 276 which delivers an output voltage when in the switched back condition. A D.C. voltage is normally present at the output of the demodulator 263 and this D.C. voltage appears at the input of the multivibrator 276. The dialling signals when received and demodulated give rise to negative-going pulses at the output of the demodulator 263 and the multivibrator 276 is such as to be switched over by the first negative-going pulse received. The output voltage from the multivibrator 276 disappears and dialling tone signals are blocked by the gate 275.

The dialling signals appearing at the output of the demodulator 263 are fed to inputs of two-gates 277, 278, 279 and 280 and also to operate a slow-to-release device 281. The device 281 is operated by the first pulse in the first group of dialling pulses and applies a control voltage to the unit M of a counter device 282. The slow-to-release device 281 and the counter device 282 operate in substantially the same manner as the slow-to-release device 165 and the counter device 166 shown in and described with reference to Fig. 6. Furthermore, the group of bi-quinary counters 283, 284, 285 and 286 operate in substantially the same manner as the counters 167, 168, 169 and 170 in Fig. 6. The operation of these parts of the register will not therefore be described further and it will be assumed that the calling subscriber has dialled the number 1234 and this number has been stored in the bi-quinary counters 283 to 286. The stages which are switched over are the second and sixth in the counter 286, the third and sixth in the counter 285, the fourth and sixth in the counter 284 and the fifth and sixth in the counter 283, and these stages deliver output voltages to gates $G_4$, $G_8$ and $G_9$, $G_{12}$, $G_7$ and $G_9$, $G_{18}$, $G_{16}$, $G_{24}$, $G_{23}$ respectively in the series of gates $G_1$ to $G_{28}$. When the final digit of the number being called has been stored, the unit Z in the counter device 282 becomes switched over and delivers an output voltage to a three-gate 287. To a first of the other two inputs of this gate 287 there is applied one of the pulse trains $f$, and to the second of these inputs, one of the pulse trains $g$. These pulse trains will be assumed to be the pulse trains $f_1$ and $g_2$. As will be seen from Fig. 12 the pulses in these trains have a duration of 218 $\mu$-secs. and their repetition periods are 2.18 milliseconds and 2.398 milliseconds, respectively.

On the coincidence of $f_1$ and $g_2$ pulses (which occurs every 23.98 milliseconds) during the application to the gate 287 of the control voltage from the unit Z, a pulse having a duration of 218 $\mu$-sec. is passed through the gate 287 and is fed to a three stage chain counter 288 which is switched to its second condition thereby. In this condition, the counter 288 delivers a control voltage to an input of a three-gate 289, the other inputs of which are fed with pulse trains $f_1$ and $g_1$ say. The output pulse from the gate 289 is a pulse having a duration of 218 $\mu$-sec. which occurs at a time less than 23.98 milliseconds after the coincidence of the $f_1$ and $g_2$ pulses, and it is this pulse, hereinafter referred to as the pulse ($f_1g_1$) which is fed to the remaining inputs of the gates $G_1$ to $G_{28}$. Coincidence between the $f_1$ and $g_2$ pulses as applied to the gate 287 occurs every 23.98 milliseconds, and thus 23.98 milliseconds after the counter 288 has been set to its second condition a further input pulse from gate 287 switches the counter 288 to its third condition and a control voltage from another output of counter 288 is applied to a one-gate 290 and through the gate to switch back the multivibrator 271 which it will be recalled was switched over when the register was seized. The switching back of the multivibrator 271 causes the control voltage fed to the line 272 to disappear. The gate 273 then prevents further circulation of the ½ $\mu$-sec. pulses in the delay line 270. In the "switched-back" condition the multivibrator 271 delivers an output control voltage in a lead 291, and this voltage, as will be seen from Fig. 14, serves to reset the counter devices 282 and 288 and the biquinary counters 283–286 as well as switching back the multivibrator 276 to enable dialling tone signals from terminal 274 to be fed to the modulator 262.

The 218 $\mu$-sec. pulse ($f_1g_1$) from the gate 289 is fed to a three-gate 292 the other two inputs of which are fed with a 218 $\mu$-sec. square wave as shown in Fig. 13c and ½ $\mu$-sec. pulses from the output of the delay line 270 in the register terminating unit 261. The ½ $\mu$-sec. pulse appearing at the input of the gate 292 during the occurrence of the pulse ($f_1g_1$) passes through the gate and is fed along lead 293 to an output terminal 294 which is connected to the trunk selector hereinafter to be described with reference to Fig. 16.

A slow-to-operate device 295 which is operated by the control voltage from the multivibrator 271 when the latter is initially switched over is arranged to operate after a delay of about 20 secs. and in the operated condition to apply a control through a one-gate 296 to an input of a two-gate 297 and to the one-gate 290. If after a delay of 20 secs. the multivibrator has not been switched back the control voltage from the device 295 effects this operation. The control voltage from the device 295 is also fed to an input of a two-gate 297 whose other input is fed with ½ $\mu$-sec. pulses from the delay line 270 in the register terminating unit 261. The ½ $\mu$-sec. pulse are then transmitted by the gate 297 and are fed to an output terminal 298 connected to the N.U. section of a tone unit such as tone unit 27 in Fig. 1.

The input terminal 299 is for use when whole blocks of numbers are not used (e.g. if no subscribers have numbers 9000–9999). Signals fed to this terminal come from the register store.

The resetting control voltage from the multivibrator 271 is fed to switch back the counter 288, to its initial condition.

The 218 $\mu$-sec. pulse from the gate 289 is fed to each of the gates $G_1$ to $G_{28}$ and passes through gates $G_4$, $G_9$, $G_{12}$, $G_{16}$, $G_{18}$, $G_{23}$ and $G_{24}$ and their associated rectifiers and appears simultaneously at terminals $Tr_4$, $Tr_9$, $Tr_{12}$, $Tr_{16}$, $Tr_{18}$, $Tr_{23}$ and $Tr_{24}$.

A combined amplifier and recorder to which the terminals $Tr_1$–$Tr_{28}$ are connected will now be described with reference to Fig. 15. The terminals $Tr_1$–$Tr_{28}$ constitute input terminals of the amplifiers in Fig. 15. Terminals $Tr_1$ to $Tr_7$ are connected to inputs respectively of one-gates $gw_1$ to $gw_7$. The outputs of the gates $gw_1$ to $gw_7$ are connected to seven amplifiers $A_1$ to $A_7$ respectively, the outputs of which are connected to terminals $Ts_1$ to $Ts_7$. The terminal $Tr_8$ is connected to an input of each of five two-gates $gx_1$ to $gx_5$ the other inputs to which are connected to terminals $Tr_5$, and $Tr_1$ to $Tr_4$ respectively. The outputs of the gates $gx_1$ to $gx_5$ are connected to inputs respectively of gates $gw_1$ to $gw_5$. The terminal $Tr_9$ is connected to an input of each of five two-gates $gy_1$ to $gy_5$, whose other inputs are connected to terminals $Tr_5$ and $Tr_1$ to $Tr_4$ respectively and whose outputs are connected to one-gates $gw_2$ to $gw_5$ and $gw_1$ respectively.

Terminals $Tr_{10}$ to $Tr_{14}$ are connected direct to amplifier stages $A_8$ to $A_{12}$ respectively whose outputs are connected to terminals $Ts_8$ to $Ts_{12}$ respectively.

Terminals $Tr_{17}$ to $Tr_{21}$ are connected through one-gates $gw_{13}$ to $gw_{17}$ and amplifier stages $A_{13}$ to $A_{17}$ to terminals $Ts_{13}$ to $Ts_{17}$ respectively. Terminal $Tr_{15}$ is connected to an input of each of five two-gates $gx_{13}$ to $gx_{17}$, the other inputs of which are connected to terminals $Tr_{21}$ and $Tr_{17}$ to $Tr_{20}$ respectively, and whose outputs are connected to gates $gw_{13}$ to $gw_{17}$ respectively. Terminal $Tr_{16}$ is connected to an input of each of five two-gates $gy_{13}$ to $gy_{17}$, the other inputs of which are connected to terminals $Tr_{21}$ and $Tr_{17}$ to $Tr_{20}$ respectively and whose outputs are connected to one-gates $gw_{14}$ to $gw_{17}$ and $gw_{13}$.

Terminals $Tr_{22}$ to $Tr_{28}$ are connected to terminals $Ts_{18}$ to $Ts_{22}$ in the same manner as terminals $Tr_{15}$ to $Tr_{21}$ are connected to $Ts_{13}$ to $Ts_{17}$.

The operation of the apparatus shown in Fig. 15 will now be described and it will be assumed that the number of the called subscriber is 1234. As previously described once the number 1234 has been stored in the register shown in Fig. 14 pulses of 218 $\mu$-sec. duration appear simultaneously at the outputs of gates $G_4$, $G_9$, $G_{12}$, $G_{16}$, $G_{18}$, $G_{23}$, and $G_{24}$ of the register and are fed to terminals $Tr_4$, $Tr_9$, $Tr_{12}$, $Tr_{16}$, $Tr_{18}$, $Tr_{23}$ and $Tr_{24}$ shown also in Fig. 15.

The pulse appearing at terminal $Tr_4$ passes through the one-gate $gw_4$ is amplified and appears at terminal $Ts_4$. The pulse appearing at terminal $Tr_9$ is fed to each of the gates $gy_1$ to $gy_5$ and passes through the gate $gy_5$ since this gate also receives a pulse from $Tr_4$. The pulse from the gate $gy_5$ is fed to one-gate $gw_1$, is amplified by amplifier stage $A_1$ and appears at terminal $Ts_1$. The pulse appearing at the terminal $Tr_{12}$ is amplified in the amplifier stage $A_{10}$ and appears at the terminal $Ts_{10}$. The pulse appearing at the terminal $Tr_{16}$ is fed to each of the gates $gy_{13}$ to $gy_{17}$ and passes through the gate $gy_{15}$ since this gate is simultaneously fed with a pulse from the terminal $Tr_{18}$. From the gate $gy_{15}$ the pulse is fed to one-gate $gw_{16}$, is amplified in the amplifier stage $A_{16}$ and appears at the terminal $Ts_{16}$. The pulse appearing at terminal $Tr_{18}$ passes through the one-gate $gw_{14}$ and appears at terminal $Ts_{14}$.

The pulse fed to terminal $Tr_{23}$ is applied to gates $gy_{18}$ to $gy_{22}$ and passes through the gate $gy_{19}$ since this gate also receives a pulse from the terminal $Tr_{24}$. From the gate $gy_{19}$ the pulse is fed to the one-gate $gw_{20}$ and appears at the terminal $Ts_{20}$. The pulse appearing at the terminal $Tr_{24}$ is fed through the one-gate $gw_{18}$ and after amplification appears at the terminal $Ts_{18}$.

Thus, pulses of 218 $\mu$-sec. duration appear simultaneously at terminals $Ts_1$, $Ts_4$, $Ts_{10}$, $Ts_{14}$, $Ts_{16}$, $Ts_{18}$ and $Ts_{20}$. The first seven terminals $Ts_1$ to $Ts_7$ are connected to a trunk group selector now to be described with reference to Fig. 16 and the remaining terminals $Ts_8$ and $Ts_{22}$ are connected to a channel pulse store hereinafter to be described with reference to Fig. 17. It will be appreciated that the first seven terminals $Ts_1$ to $Ts_7$ carry pairs of pulses which are derived from pairs of pulses on the first nine terminals $Tr_1$ to $Tr_9$ in register (Fig. 14) and that these pairs of pulses determine the multiplex unit by which the called subscriber is served. It will be remembered that each multiplex unit has 21 groups of trunk terminating units, the first and second for linking subscribers in the same multiplex unit and the nineteen other groups for linking the multiplex unit with the nineteen other multiplex units. In the case where the number 1234 is called the trunk group selector is required to select the second trunk group in the nineteen above referred to.

Referring now to Fig. 16, terminals $Ts_1$ to $Ts_7$ from the amplifier and recoder shown in Fig. 15 appear in the top left hand corner of Fig. 16. A series of 20 three-gates $gv_1$ to $gv_{20}$ are provided. One input of each of these gates is connected to the output of a one-gate 300 which has five inputs to which channel pulses are applied from the five registers in the system. The other inputs of the gates $gv_1$ to $gv_{20}$ are connected in the manner shown to the terminals $Ts_1$ to $Ts_7$ each pair of inputs of a gate being connected to a pair of terminals which is different for each gate. The outputs of the gates $gv_1$ to $gv_{20}$ are connected to one-gates $gz_1$ to $gz_{20}$ whose outputs are connected to terminals $Tz_2$ to $Tz_{21}$.

To terminals $Tg_1$ to $Tg_{10}$ are applied pulse trains $g_1$ to $g_{10}$ respectively hereinbefore referred to. It will be remembered that pulse trains $g_1$ to $g_{10}$ are ten time-interlaced pulse trains of a pulse duration of 218 $\mu$-secs. and of pulse repetition period of 2.398 milliseconds. These pulse trains are shown in Fig. 13. The terminals $Tg_1$ to $Tg_{10}$ in Fig. 16 are connected to inputs respectively of 10 two-gates $gt_1$ to $gt_{10}$ and to inputs respectively of ten two-gates $gt_{11}$ to $gt_{20}$. The other inputs of gates $gt_1$ to $gt_{10}$ are connected to the output of a two-gate 301 and the other inputs of gates $gt_{11}$ to $gt_{20}$ are connected to the output of a two-gate 302.

A 218 $\mu$-sec. square wave from the generator yet to be described is applied between terminals 303 and 304 and allotted free channel pulses from the control unit (such as unit 23 in Fig. 1) are applied to terminal 305.

The outputs of the gates $gt_2$ to $gt_{20}$ are connected to inputs respectively of the one-gates $gz_2$ to $gz_{20}$ and the output of the gate $gt_1$ is connected to terminal $Tz_1$.

In operation, when the number 1234 is being called, pulses of 218 $\mu$-sec. duration appear simultaneously at terminals $Ts_1$ and $Ts_4$ in Fig. 16. At the same time, a free-channel pulse from the terminal 294 in the register shown in Fig. 14 is applied to the one-gate 300 through which it passes to gates $gv_1$ to $gv_{20}$. The pulses from terminals $Ts_1$ and $Ts_4$ appear simultaneously at the inputs of the gate $gv_{20}$ and allow this gate to pass the free-channel pulse from the gate 300. The free-channel pulse transmitted by the gate $gv_{20}$ is fed to the one-gate $gz_{20}$ and appears at the terminal $Tz_{21}$ and from this terminal is fed to the pair of groups of trunk terminating units linking the multiplex unit of the calling subscriber to that of the called subscriber, that is to say the multiplex unit serving subscribers having numbers between 1000 and 1499. In a manner previously described with reference to Fig. 1 the free-channel pulse from terminal $Tz_{21}$ finds the first free pair of trunk terminating units in the two groups to which it is fed and sets in operation the one which is connected to the calling subscriber's multiplex unit, and renders the other which is connected in the called subscriber's multiplex unit responsive to receive a further channel pulse.

Free-channel pulses from the control unit in the multiplex unit of the called subscriber are applied to terminal 305 (top right-hand circuit of Fig. 16) and pass either through gate 301 or through gate 302 depending upon the phase of the 2.18 millisecond square wave applied to terminals 303 and 304 and thus a free-channel pulse first appears at inputs of the gates $gt_1$ to $gt_{10}$ and then at inputs of the gates $gt_{11}$ to $gt_{20}$. The pulse trains $g_1$ to $g_{10}$ are applied to terminals $Tg_1$ to $Tg_{10}$ respectively and allow the gates $gt_1$ to $gt_{20}$ successively to pass a free-channel pulse once every 4.796 milliseconds. When one of a pair of trunk terminating units in the group connected to terminal $Tz_{21}$ has been seized by the channel pulse from the gate $gv_{20}$, the next free-channel pulse to pass through the gate $gt_{20}$ passes to the other trunk terminating unit of the pair and sets the latter in operation to generate the ½ $\mu$-sec. pulse train in the channel to be allotted to the called subscriber.

Terminals $Ts_8$ to $Ts_{22}$ in the common amplifier and recoder shown in Fig. 15, to which are applied pulses which determine the second, third and fourth digits of the called number are connected to a channel pulse store in each multiplex unit. One such channel pulse store will now be described with reference to Fig. 17.

Terminals $Ts_8$ to $Ts_{12}$ (Fig. 17) are connected to inputs of gates $gc_0$ to $gc_4$ respectively. Terminals $Ts_{13}$ to $Ts_{17}$ are connected in the manner shown to inputs of gates $gd_0$ to $gd_9$ and the terminals $Ts_{18}$ to $Ts_{22}$ are connected in the manner shown to inputs of gates $gu_0$ to $gu_9$. The remaining inputs of gates $gd_0$–$gd_9$, and $gu_0$–$gu_9$ are connected to terminal 306 which is fed with free-channel pulses from the control unit 23 (Fig. 1). The remaining inputs of gates $gc_0$–$gc_4$ are connected to the output of a three-gate 307. This gate 307 is fed with pulses from terminal 306, but is opened only when pulses are simultaneously received at its other two inputs. These two inputs are connected to the two terminals of the first seven output terminals $Ts_1$ to $Ts_7$ in the amplifier and recoder in Fig. 15 which determine the multiplex to which the called subscriber belongs. Thus, on the assumption that the channel pulse store shown in Figure 17 is in the multiplex unit serving the called subscriber, 218 $\mu$-sec. pulses appear simultaneously at the two inputs of the gate 307 and the free-channel pulse fed to the other input passes through the gate to the inputs of gates $gc_0$ to $gc_4$. The outputs of the gates $gc_0$–$gc_4$, $gd_0$–$gd_9$ and $gu_0$–$gu_9$ are connected to one-gates $gC_0$–$gC_4$, $gD_0$–$gD_9$ and $gU_0$–$gU_9$ respectively. The outputs of these one-gates are connected to 100 $\mu$-sec. delay lines $Lc_0$–$Lc_4$, $Ld_0$–$Ld_9$, and $Lu_0$–$Lu_9$ respectively.

For the present description it will be assumed that the number being called is 1234 and the multiplex unit incorporating this channel pulse store serves this subscriber. As previously described, when the number 1234 is dialled 218 $\mu$-sec. pulses appear simultaneously at output terminals $Ts_1$, $Ts_4$, $Ts_{10}$, $Ts_{14}$, $Ts_{16}$, $Ts_{18}$ and $Ts_{20}$ of the recoder shown in Figure 15. The pulse appearing at terminals $Ts_{10}$ (Figure 17) is fed to the two-gate $gc_2$ and allows this gate to transmit a free-channel pulse to the one-gate $gC_2$. The pulses appearing at the terminals $Ts_{14}$ and $Ts_{16}$ appear simultaneously at the inputs to the gate $gd_6$ and allow the gate to transmit the free-channel pulse to the one-gate $gD_6$. The pulses appearing at the terminals $Ts_{18}$ and $Ts_{20}$ appear simultaneously at the inputs to the gate $gu_7$ and allow this gate to pass the free-channel pulse to the one-gate $gU_7$. The circulation of these channel pulses in the three delay lines $Lc_2$, $Ld_6$ and $Lu_7$ and through the repeater in the line terminating unit of the called subscriber (1234) is effected in the same manner as previously described with reference to Figure 9 and Figure 11.

Other apparatus shown in Figure 17 operates in substantially the same manner as that shown in Figure 9 and bearing the same reference numerals.

A pulse generator for use in generating the pulse trains shown in Figure 13 will now be described with reference to Figure 18. A 1 mc./s. oscillator 308 generates the 1 mc./s. sine wave oscillation shown schematically in Figure 13*a*. The output of the oscillator 308 is connected through an amplifier 309 to an output terminal 310 from which the sine wave oscillation is distributed to the various points of the system where 1 mc./s. clock pulses are required. The output of the oscillator 308 is connected to a squarer 311 whose output is connected to one of the inputs of a two-gate 312, a two-gate 313 and a two-gate 314. The output of the two-gate 312 is connected to the input of a 109 $\mu$-sec. delay line 315 whose output is connected to the other input of the two-gate 312. A tapping is provided on the delay line 315 and this tapping is connected direct to one of the two inputs of a bistable multivibrator 316 and through a gate 317 to the other input thereof. The 1 mc./s. square wave from the squarer 311 causes the continual circulation of a ½ $\mu$-sec. pulse in the circuit comprising the gate 312 and the delay line 315. As a result of this circulation, a train of ½ $\mu$-sec. pulses of 109 $\mu$-sec. repetition period appears at the tapping on the delay line 315 and this train of pulses is fed to the inputs of the multivibrator 316 causing the latter to operate and deliver to output terminal 318 a 218 $\mu$-sec. square wave (shown in Figure 13*c*). The output of the gate 313 is connected to the input of a 20 $\mu$-sec. delay line 319 whose output is connected to the other input of the gate 313. Nine tappings are provided on the delay line 319 at points which give delays of 2, 4, 6, 8, 10, 12, 14, 16 and 18 $\mu$-secs. The nine tappings and the output of the delay line 319 are connected to inputs respectively of a series of two-gates $gf_1$, $gf_2$ . . . $gf_{10}$. The input of the delay line 315 is connected to the remaining inputs of the ten gates $gf_1$–$gf_{10}$. The outputs of these gates are connected as shown to the inputs of ten bistable mulivibrators $F_1$, $F_2$ . . . $F_{10}$.

In operation, a ½ $\mu$-sec. pulse is caused to circulate in the circuit comprising the delay line 319 and the gate 313. It will be assumed that initially a ½ $\mu$-sec. pulse appears at the input of the gate $gf_1$ simultaneously with a ½ $\mu$-sec. pulse at its other input from the input side of the delay line 315, and that the multivibrator $F_1$ is the only one in the group to be in a "switched over" condition. The gate $gf_1$ transmits the ½ $\mu$-sec. pulse and this pulse causes the multivibrator $F_1$ to be switched back and the multivibrator $F_2$ to switch over. In the switched-over condition the multivibrators produce a positive-going output voltage. After 218 $\mu$-sec. ½ $\mu$-sec. pulses coincide at the gate $gf_2$ and a pulse is transmitted to switch back the multivibrator $F_2$ and switch over the multivibrator $F_3$. This operation is repeated for the other multivibrators in succession and the initial conditions are reached again after 2.18 milliseconds. Thus, the multivibrators produce a series of ten time-interlaced pulse trains of 218 $\mu$-sec. pulse duration and 2.18 millisecond repetition period hereinbefore referred to as the pulse trains $f_1$ to $f_{10}$.

The output of the gate $gf_5$ and the output of the gate $gf_{10}$ are applied to the two inputs respectively of a further bistable multivibrator 320. This multivibrator is switched back by a pulse from the gate $gf_{10}$ and switched over by a pulse from the gate $gf_5$ and is adapted to produce between its two output terminals 321 and 322 a 2.18 millsecond square wave as shown in Figure 13(*d*) and (*e*).

The output of the gate 314 is connected to the input of a 22 $\mu$-sec. delay line 323 whose output is connected to the other input of the gate 314. Ten tappings are provided on the delay line 323 to give delays of 2, 4, 6 . . . 20 $\mu$-secs. respectively. The ten tappings and the output of the delay line 323 are connected to inputs respectively of eleven two-gates $gg_1$, $gg_2$ . . . $gg_{11}$. The other inputs of these gates are connected to the output of the gate 312. The outputs of the gates $gg_1$ . . . $gg_{11}$ are conneced in the manner shown to the inputs of 11 bistable multivibrators $G_1$ to $G_{11}$.

In operation, a ½ $\mu$-sec. pulse is caused to circulate in the circuit comprising the delay line 323 and the gate 314. It will be assumed that initially a ½ $\mu$-sec. pulse appears at the input of the gate $gg_1$ simultaneously with a ½ $\mu$-sec. pulse at the other input of the gate $gg_1$ from the output of the gate 312 and that the multivibrator $G_1$ is the only one in the group in a "switched over" condition. The gate $gg_1$ transmits the ½ $\mu$-sec. pulse and this pulse causes the multivibrator $G_1$ to be switched back and switches over the multivibrator $G_2$. In the "switched over" condition the multivibrators produce a positive-going voltage at an output terminal. After 218 $\mu$-secs. ½ $\mu$-sec. pulses coincide at the gate $gg_2$ and a pulse is transmitted to switch back the multivibrator $G_2$ and switch over the multivibrator $G_3$. This operation is repeated for the other multivibrators in the group in succession and the initial conditions are reached again after 2.398 milliseconds. Thus, the multivibrators $G_1$ to $G_{11}$ produce at their output terminals a series of eleven time-interlaced pulse trains of 218 $\mu$-sec. pulse duration and 2.398 millisecond pulse repetition period, hereinbefore referred to as the pulse trains $g_1$ to $g_{11}$ (see Figure 13).

A centre tapping on the delay line 323 is connected to an input of a one-gate 324 whose other input is connected to the output of the gate 314 and whose output is connected to one of the inputs of a two-gate 325. The other input of the gate 325 is connected to the common connection to gates $gg_1$ to $gg_{11}$, which is connected to the output of the gate 312. The output of the gate 325 is connected through an amplifier 326 to an output terminal 327. In operation, ½ $\mu$-sec. pulses of 22 $\mu$-sec. pulse repetition period are fed to the gate 324 from the centre tapping on the delay line 323 and ½ $\mu$-sec. pulses from the output of the gate 314 are interlaced with these pulses to produce a pulse train of 11 $\mu$-sec. pulse repetition period. The pulse train is fed to gate 325 which receives at its other input a pulse train with a pulse repetition period of 109 $\mu$-secs. from the output of the gate 312. Thus, there is a coincidence of pulses at the gate 325 every 1.199 milliseconds and a pulse train of 1.199 milliseconds is developed in the output of the gate 325 and is fed through the amplifier 326 to the output terminal 327.

A circuit suitable for use as the slow-to-release device hereinbefore referred to will now be described with reference to Figure 19. The circuit comprises three gaseous discharge triode valves 328, 329 and 330 connected together in the manner shown. It is arranged by suitable choice of circuit components that in the absence of applied pulses only one of the valves 328, 329 and 330 can remain conducting. In the unoperated condition the valve 330 is conducting and the valves 328 and 329 non-conducting. In operation, positive-going pulses are applied at terminal 331. The operation of the circuit will first be described on the assumption that only one pulse arrives at the terminal 331. This one pulse is fed to the trigger electrode of the valve 328 causing the latter to become conducting and the valve 330 non-conducting. With the valve 328 conducting, the capacitor 332 charges up and causes the valve 329 to become conducting, the valve 328 being thereby rendered non-conducting. With the valve 329 conducting, the capacitor 333 charges up and causes the valve 330 to become conducting, the valve 329 being thereby rendered non-conducting. Thus, a negative going pulse appears at output terminal 334, commencing when the valve 330 is rendered non-conducting, that is to say, when the input pulse appears at the input terminal 331 and terminating after a time determined by the time constants of charge of the capacitors 332 and 333. The circuit components are so chosen that the negative-going output pulse terminates 250 milliseconds after the application of the input pulse. The circuit may thus be said to become operated by an input pulse and return to its unoperated condition 250 milliseconds after the application of the input pulse.

It will however be remembered that groups of dialling pulses are received at the input of the slow-to-release device 165 shown in Figure 6 and that the device is to become operated by the first in the group and return to its unoperated condition 250 milliseconds after the application of the last pulse in the group. When, for example, a group of three pulses in rapid succession are fed to the input terminal 331 in Figure 19, the first pulse as before causes the valve 328 to become conducting, the valve 330 being thereby rendered non-conducting. The capacitor 332 charges up and it is arranged that the valve 329 becomes conducting and the valve 328 non-conducting before the second pulse in the group arrives. With the valve 329 conducting capacitor 333 charges up but it is arranged that this capacitor does not charge up sufficiently to cause the valve 330 to conduct before the second pulse arrives. The second pulse arrives at the input terminal 331 and is fed to the trigger electrode of the valve 328. This pulse causes the valve 328 to become conducting, the valve 329 being thereby rendered non-conducting. The same mode of operation of the circuit then follows up to the time when the valve 329 is conducting and the capacitor 333 is charging up. The third pulse in the group then arrives at the input terminal 331, and causes the valve 328 to become conducting and the valve 329 non-conducting. If no further pulses appear at the input terminal 331, the mode of operation of the circuit is the same as that hereinbefore described for the case when only an input pulse is applied. The valve 330 finally becomes conducting 250 milliseconds after the application of the last applied pulse. Thus, the circuit becomes operated by the first applied pulse and returns to its unoperated condition 250 milliseconds after the application of the last applied pulse.

A circuit suitable for use as the slow-to-operate device hereinbefore referred to is shown in Figure 20. The circuit comprises two gas discharge triode valves 335 and 336, of which tube 335 is normally non-conducting and the tube 336 conducting. Pulses from the section Z of the device 166 (Figure 6) are applied through rectifiers 352 and 353 to the trigger electrode of the tube 335, the trigger-cathode circuits of which also include condensers 354 and 355, resistance 356 and 357 and a rectifier 358. It is arranged that the input from Z in the device 166 has a relatively low resistance to HT— in order that the rectifier 352 is normally conducting.

Similarly pulses from the section M of the device 166 (Figure 6) are applied through a rectifier 359 to the trigger of the normally conducting tube 336, the trigger-cathode circuit of which includes resistances 360, 361 and 362 and a condenser 363.

The anodes of the tubes 335 and 336 are connected together and through a common resistance 364 to the positive side of the supply. The resistances are of such value that when tube 336 is conducting, tube 335 is extinguished and vice-versa.

The output from this "slow-to-operate" circuit is taken from output terminal 365 connected to the cathode of the tube 335 and is applied to the gate 181 (see Figure 6).

As previously mentioned the tube 336 is normally conducting: the arrival of a positive pulse from the section Z of the device 166 causes the tube 335 to strike (after a delay determined by the time-constant of the resistances and capacity in the trigger-cathode circuit thereof) and when struck to apply an output to the gate 181 and to cause the tube 336 to be extinguished.

The subsequent arrival of a positive pulse from the M section of device 166 on the trigger of tube 336 causes this tube to restrike and extinguish tube 335. Thus, a positive-going output pulse is produced at output terminal 365, which commences at a predetermined interval after the commencement of the pulse from section Z and which terminates when an incoming pulse arrives from section M of device 166.

A circuit suitable for use as the trailing edge pulse former hereinbefore referred to is shown in Figure 21. The circuit comprises a pair of gaseous discharge triode valves 339 and 340 coupled together in the manner shown. It is arranged that in the absence of an applied voltage the valve 340 is conducting. An input pulse is applied to terminal 341 in the form of a negative-going pulse. The negative-going pulse is differentiated by the differentiating circuit comprising capacitor 342 and resistor 343 and the positive-going pulse produced by the trailing edge of the input pulse causes the valve 339 to conduct. The fall in potential of the anode of the valve 339 is impressed in the anode and trigger electrode of the valve 340 through capacitors 344 and 345 respectively, and causes the latter valve to become non-conducting. After an interval determined by the time constants of the circuit the potential of the trigger electrode of the valve 340 rises to a value at which the valve 340 again conducts. The fall in potential of the anode of the valve 340 is impressed upon the anode of the valve 339 and causes the latter to become non-conducting. The cathode of the valve 340 falls when the latter becomes non-conducting, that is to say, when the trailing edge of the input pulse appears and rises again to its initial value when the valve 340 again becomes conducting, that is to say, a predetermined time after the end of the input pulse. A negative-going output pulse appears at output terminal 346. Thus, it may be said that the circuit in response to an input pulse produces an output pulse of predetermined duration which commences at the trailing edge of the input pulse. It is arranged by suitable choice of circuit component values that the duration of the output pulse exceeds 100 $\mu$-secs.

A circuit suitable for use as the two-gate 194 in Figure 8 and the two-gate 251 in Figure 11 is shown in Figure 22. The circuit comprises five triode valves 347, 348, 349, 350 and 351. The control electrode of each of these valves is connected through a resistor to the common connection of a group of four parallel-connected input rectifiers. The other sides of the input rectifiers are connected in the manner shown to five input terminals $TC_0$, $TC_1$, $TC_2$, $TC_3$ and $TC_4$. The cathode of each valve is connected through a capacitor and an output rectifier to an output terminal 352. For the purpose of the description of the operation of the circuit shown it will be assumed that a positive-going pulse appears at input terminal $TC_2$. The pulse appearing at this terminal is fed through the third input rectifier in the first group to the control electrode of the valve 347, which in response thereto produces a positive pulse at its cathode. The same positive pulse at terminal $TC_2$ in like manner appears at the control electrodes of the valves 348, 350 and 351, causing positive pulses to appear at the cathodes of these valves also. The positive bias applied to the anodes of the output rectifiers is such that in the absence of any input pulses at the input terminals $TC_0$, $TC_1$, $TC_2$, $TC_3$ and $TC_4$, the output rectifiers are all conducting. The positive pulse appearing at the cathode of each of the valves 347, 348, 350 and 351 due to the input pulse at terminal $TC_2$ renders the output rectifiers associated with these four valves non-conducting. The output rectifier associated with the valve 349, however, remains conducting and no output pulse is produced at the output terminal 352. When however two input pulses appear simultaneously at two of the input terminals $TC_0$–$TC_4$ all five output rectifiers are rendered non-conducting for the period of coincidence of the input pulses and a positive-going output pulse is produced at the output terminal 352. For example, when two pulses appear simultaneously at the input terminals $TC_2$ and $TC_3$, the pulse fed to the terminal $TC_2$ causes the output rectifiers associated with the valves 347, 348, 350 and 351 to become non-conducting as hereinbefore described and the pulse appearing at the input terminal $TC_3$ causes the output rectifier associated with the valve 349 also to become non-conducting. Thus, an output pulse appears at the output terminal 352.

We claim:

1. In an automatic telephone system of the character including a plurality of subscribers' lines each terminating at an individual one of a plurality of subscribers' line terminating units, a lesser plurality of trunk terminating units, a multiplex signal transmission link, a plurality of communication channels for the multiplex transmission of signals through said link between said line terminating units and said trunk terminating units, and a plurality of registers: means for transmitting calling signals from a calling subscriber's line terminating unit over said link in any free channel of said channels for reception by a free register, and means controlled by said free register for establishing a speech signal path between the calling and called subscribers, said speech signal path extending between the calling subscriber's line terminating unit and one of a pair of trunk terminating units which are not otherwise engaged through said link in the same channel as that used to transmit said calling signals, and between the called subscriber's line terminating unit and the other of said pair of trunk terminating units through said link in another free channel of said channels.

2. In an automatic telephone system of the character including a plurality of subscribers' lines each terminating at an individual one of a plurality of subscribers' line terminating units, a lesser plurality of trunk terminating units, a common signal transmission link, a plurality of pulse communication channels combined in time division multiplex for the transmission of signals through said link between said line terminating units and said trunk terminating units, and a plurality of registers: means for transmitting calling signals from a calling subscriber's line terminating unit over said link in any free channel of said channels for reception by a free register, and means controlled by said free register for establishing a speech signal path between the calling and called subscribers, said speech signal path extending between the calling subscriber's line terminating unit and one of a pair of trunk terminating units which are not otherwise engaged through said link in the same channel as that used to transmit said calling signals, and between the called subscriber's line terminating unit and the other of said pair of trunk terminating units through said link in another free channel of said channels.

3. A control apparatus for an automatic telephone system which includes a common transmission link, a plurality of subscribers' line terminating units each including a modulator and a receiver connected to one end of said link, a lesser plurality of trunk terminating units each including a modulator and a receiver connected to the other end of said link, and a plurality of communication channels for the transmission of signals through said link: said control apparatus including at least one register, a register terminating unit for said register, the register terminating unit including a receiver which is connected to said other end of said link and which is selectably adjustable to receive signals from said link in any one of said channels, means responsive to an initial calling signal from any one of the subscribers' lines to seize a free channel of said channels and to adjust the modulator and receiver in the calling subscriber's line terminating unit to transmit signals through and to receive signals from said link in the seized channel, means responsive to this seizure of a channel to adjust the receiver in the register terminating unit of a register which is not otherwise engaged to receive signals from said link in said seized channel whereby further calling signals subsequently transmitted through said link from the calling subscriber's line are received by that register, this register including means responsive to the received calling signals to generate a control signal identifying the called subscriber, and means responsive to said control signal to adjust the modulators and receivers in the called subscriber's line terminating unit and in a pair of trunk terminating units which are not otherwise engaged so as to establish a speech signal path between the calling and called subscribers, said speech signal path extending between the called subscriber's line terminating unit and one of said pair of trunk terminating units through said link in said seized channel, and between the called subscriber's line terminating unit and the other of said pair of trunk terminating units through said link in another free channel of said channels, the last-named means upon establishing said speech signal path rendering the register and the register terminating unit of that register free for the establishment of further speech signal paths.

4. A control apparatus according to claim 3 wherein said register terminating unit includes a modulator which is connected to said other end of said link and which is selectably adjustable to transmit signals through said link in any one of said channels, wherein said means responsive to said seizure of a channel to adjust the receiver in said register terminating unit is means to also adjust the modulator in that register terminating unit to transmit a signal in said seized channel through said link, and wherein there is means responsive to the signal transmitted by the modulator in said register terminating unit as received by the receiver in the calling subscriber's line terminating unit to indicate that the seized register is ready to receive said further calling signals.

5. A control apparatus according to claim 3 including means to apply a channel identifying pulse to said subscribers' line terminating units during respective periods of a recurrent period, the position in time of this pulse within that recurrent period being characteristic of the identity of a free channel of said channels, and there being within said recurrent period a plurality of possible positions in time of that pulse each of which is characteristic of the identity of an individual one of said communication channels, and wherein said means responsive to said initial calling signal is means to seize the channel identified as being free by the channel identifying pulse applied to the calling subscriber's line terminating unit during one of the periods of said recurrent period.

References Cited in the file of this patent

UNITED STATES PATENTS

| | | |
|---|---|---|
| 2,582,959 | Bruce et al. | Jan. 22, 1952 |
| 2,773,934 | Trousdale | Dec. 11, 1956 |